(12) United States Patent
Morris et al.

(10) Patent No.: US 7,033,736 B2
(45) Date of Patent: Apr. 25, 2006

(54) STRUCTURED SCREENS FOR CONTROLLED SPREADING OF LIGHT

(75) Inventors: G. Michael Morris, Fairport, NY (US); Tasso R. M. Sales, Rochester, NY (US)

(73) Assignee: Corning Incorporated, Corning, NY (US)

( * ) Notice: Subject to any disclaimer, the term of this patent is extended or adjusted under 35 U.S.C. 154(b) by 377 days.

(21) Appl. No.: 09/918,408

(22) Filed: Jul. 30, 2001

(65) Prior Publication Data

US 2002/0034710 A1 Mar. 21, 2002

Related U.S. Application Data

(60) Provisional application No. 60/222,033, filed on Jul. 31, 2000.

(51) Int. Cl.
*G02B 5/02* (2006.01)

(52) U.S. Cl. .................. 430/321; 430/945; 359/599; 359/707; 359/619; 359/628

(58) Field of Classification Search ............... 430/321, 430/945; 359/599, 707, 619, 628
See application file for complete search history.

(56) References Cited

U.S. PATENT DOCUMENTS

| | | |
|---|---|---|
| 1,942,841 A | 1/1934 | Shimizu |
| 2,338,654 A | 1/1944 | Mac Neille |
| 2,358,070 A | 9/1944 | Holmes et al. |
| 2,362,573 A | 11/1944 | Mac Neille |
| 2,618,198 A | 11/1952 | Luboshez |
| 2,804,801 A | 9/1957 | Mihalakis |
| 2,984,152 A | 5/1961 | Mihalakis |
| 3,063,339 A | 11/1962 | Mihalakis et al. |
| 3,619,022 A | 11/1971 | Hirsch et al. |
| 3,994,562 A | 11/1976 | Holzel |
| 4,172,219 A | 10/1979 | Deml et al. |
| 4,241,980 A | 12/1980 | Mihalakis, deceased et al. |
| 4,372,649 A | 2/1983 | Kellie |
| 4,427,265 A | 1/1984 | Suzuki et al. |
| 4,464,030 A | 8/1984 | Gale et al. |
| 4,490,010 A | 12/1984 | Honda et al. |
| 4,536,056 A | 8/1985 | Oguino |
| 4,666,248 A | 5/1987 | van de Ven |
| 4,668,080 A | 5/1987 | Gale et al. |
| 4,689,291 A | 8/1987 | Popovic et al. |
| 4,767,186 A | 8/1988 | Bradley, Jr. et al. |
| 4,826,292 A | 5/1989 | Spohr et al. |
| 4,882,262 A | 11/1989 | Wilwerding |
| 5,080,706 A | 1/1992 | Snyder et al. |
| 5,081,545 A | 1/1992 | Sugawara et al. |
| 5,085,977 A | 2/1992 | Sugawara et al. |
| 5,104,435 A | 4/1992 | Oikawa et al. |
| 5,119,235 A | 6/1992 | Umeda et al. |
| 5,148,322 A | 9/1992 | Aoyama et al. |
| 5,155,631 A | 10/1992 | Snyder et al. |
| 5,177,637 A | 1/1993 | Tsukada |
| 5,298,366 A | 3/1994 | Iwasaki et al. |
| 5,300,263 A | 4/1994 | Hoopman et al. |
| 5,324,623 A | 6/1994 | Tsumori |
| 5,401,968 A | 3/1995 | Cox |
| 5,439,621 A | 8/1995 | Hoopman |
| 5,442,482 A | 8/1995 | Johnson et al. |
| 5,453,876 A | 9/1995 | Hamada |
| 5,471,327 A | 11/1995 | Tedesco et al. |
| 5,504,602 A | 4/1996 | Farmer |
| 5,534,386 A | 7/1996 | Petersen et al. |
| 5,536,455 A | 7/1996 | Aoyama et al. |
| 5,609,939 A | 3/1997 | Petersen et al. |
| 5,631,754 A | 5/1997 | Jannson et al. |
| 5,695,895 A | 12/1997 | Johnson et al. |
| 5,715,022 A | 2/1998 | Takamatsu et al. |
| 5,718,830 A | 2/1998 | Hlinka et al. |
| 5,728,509 A | 3/1998 | Eda et al. |
| 5,731,857 A | 3/1998 | Neijzen |
| 5,733,710 A | 3/1998 | Kuboya et al. |
| 5,764,310 A | 6/1998 | Yamagishi |
| 5,808,657 A | 9/1998 | Kurtz et al. |
| 5,861,990 A | 1/1999 | Tedesco |
| 5,867,307 A | 2/1999 | Myers et al. |
| 5,867,321 A | 2/1999 | Nakama et al. |
| 5,871,653 A | 2/1999 | Ling |
| 5,886,760 A | 3/1999 | Ueda et al. |
| 5,982,552 A | 11/1999 | Nakama et al. |
| 6,034,817 A | 3/2000 | Mihalakis |
| 6,285,503 B1 * | 9/2001 | Chao et al. .......... 359/569 |

FOREIGN PATENT DOCUMENTS

| | | |
|---|---|---|
| EP | 0 311 189 | 4/1989 |
| JP | 54-083846 | 4/1979 |
| JP | 63-221329 | 9/1988 |
| JP | 03-122614 | 5/1991 |
| JP | 3-192232 | 8/1991 |
| JP | 03-214101 | 9/1991 |
| JP | 4-119339 | 4/1992 |
| JP | 4-220631 | 8/1992 |
| JP | 5-053174 | 3/1993 |
| JP | 06-160606 | 6/1994 |
| JP | 8-190135 | 7/1996 |
| JP | 8-248403 | 9/1996 |
| JP | 11-142609 | 5/1999 |
| JP | 11-344602 | 12/1999 |
| JP | 2000-035616 | 2/2000 |
| WO | WO 99/64929 | 12/1999 |

OTHER PUBLICATIONS

U.S patent application Ser. No. 09/918,257, Gretton et al., filed Jul. 30, 2001.

*Micro-Optics: Elements, systems and applications*, Hans P. Herzig, ed., Taylor & Francis, Bristol, PA, 1997, pp. 53–152.

* cited by examiner

*Primary Examiner*—John A. McPherson
(74) *Attorney, Agent, or Firm*—Maurice M. Klee; Ronald J. Paglierani

(57) ABSTRACT

Structured screens for the controlled spreading, diffusion, or scattering of an incident beam are provided. The screens are composed of microstructures (1,2) whose configurations and distribution on the surfaces of the screen are precisely determined. In certain embodiments, the configurations and/ or their distribution is randomized. The structured screens can be used as diffusing screens or display screens.

96 Claims, 49 Drawing Sheets

Fresnel lens and array on opposite surfaces

STRUCTURED SCREENS FOR CONTROLLED SPREADING OF LIGHT

CROSS REFERENCE TO RELATED PROVISIONAL APPLICATION

This application claims the benefit under 35 USC §119(e) of U.S. Provisional Application No. 60/222,033 filed Jul. 31, 2000, the content of which in its entirety is hereby incorporated by reference.

I. FIELD OF THE INVENTION

The present invention discloses an optical device composed of a substrate whose surface or surfaces, which may be flat or curved, contain a distribution of microstructures capable of spreading (also referred to herein as "diffusing" or "scattering") an incident beam over a controlled range of angles and with controllable intensity variation across the useful field. The said device is referred to herein as a "structured screen" or simply a "screen."

The structured screens of the invention have a plurality of applications which generally fall into two major categories, namely, diffusive screens and display screens. More particularly, applications of the structured screens include, but are not limited to, homogenization of illumination, in conjunction with or as a focusing screen for photographic cameras, to provide uniform illumination over specific viewing angles, and applications in back-lit displays, liquid crystal flat panel displays, and other types of displays either as a standalone device or in conjunction with other necessary hardware.

Examples of instruments where the structured screens can be used include, but are not limited to, photographic cameras, computer screens, television sets, projection screens, cellular phones, and general image display equipment.

II. BACKGROUND OF THE INVENTION

A. Diffusive Screens

In many applications there is the need for devices whose purpose is to spread an illumination beam over a certain field of interest with a desired intensity variation. Such devices are generally referred to in the art as diffusive screens, diffusion plates, or diffusers.

In its simplest version, a diffusive screen is made of a rough surface with a relief pattern that can be typically described by Gaussian statistics. To fabricate such diffusive screens several methods have been proposed. Among these one can distinguish three basic categories.

First, there are diffusive screens based on a random surface structure (ground glass). Such diffusive screens are commercially available at low cost. However, because there is little control over their diffusing characteristics, the performance of such screens is very limited and only of interest in applications with very flexible and loose requirements.

A second class of diffusive screens is obtained by holographic recording of a speckle pattern. This class offers more flexibility than ground glass screens in tailoring the diffusion pattern. However, such holographic diffusive screens tend to generate images with a grainy appearance, which may be unpleasant for viewing purposes. Also, the sudden intensity variations associated with speckles lead to non-uniform illumination over restricted viewing angles.

The third class of diffusive screens include those where a certain substrate has its surface modified according to some relief pattern. An example includes arrays of microlenses which provide light diffusion. This third class offers better control of the relief pattern than either ground glass screens or holographic screens.

There has been considerable effort to address the problem of light diffusion as briefly summarized by the following U.S. patents.

U.S. Pat. No. 4,427,265 discloses a diffusive screen with an irregular arrangement of curved surfaces superposed on a periodic microlens array. The goal is to maintain the light diffusing properties while avoiding some of the artifacts associated with the underlying periodic array. The curvature of each microlens is controlled on average.

U.S. Pat. No. 5,733,710 describes various arrangements of microlenses generated by mask exposure with microlens location being varied through mask rotation. It also discloses the combination of a diffusive screen structure and a Fresnel lens on opposite sides of the same substrate.

U.S. Pat. No. 4,826,292 discloses a diffusion plate with a relief structure composed of cones created by ion bombardment and etching.

U.S. Pat. No. 5,871,653 discloses fabrication methods to obtain a diffusive screen structure based on microlens arrays for use in flat panel displays.

Some of the issues that must be addressed when designing a diffusive screen include controllable viewing angles, controllable intensity variation over the useful viewing field, resolution, absence of visual artifacts, and efficient use of the incident illumination. To achieve full control of design capabilities and obtain the best possible diffusing performance for a given application one must be able to control the surface-relief pattern with adequate precision.

The relief control achieved in the prior art is limited to simple arrangements where individual structures might have some curvature or optical power. In particular, existing art in the fabrication of microlens arrays includes, among others, the techniques disclosed in U.S. Pat. Nos. 5,871,653, 5,536,455, 5,324,623, and 5,300,263. Current methods are based on polymer melting, thermal relaxation, ion exchange diffusion, surface tension effects, and etch smoothing. These methods offer little control over the microlens shape, except that it is nearly spherical.

The quality obtained in the prior art is a largely statistical process because there has been no strict control of the positioning and/or shaping of the structures used to achieve diffusion. The elementary structures that compose the arrays are conventionally nearly spherical shapes. As often found in the patent literature, the elementary structures that compose a diffusive screen are loosely described as "curved" simply because there is little control over their shape. For other types of relief structures not described by curved microlenses, the surface is obtained by random means of only statistical control, such as surface bombardment.

It is therefore clear that there exists a need for well-controlled diffusing surfaces with elementary microstructures that are well defined and chosen to meet specific diffusion requirements.

B. Display Screens

Applications that involve the display of information require appropriate means of delivery to allow the user some form of interaction with the information, be it access to a database or simply watching a movie. Such systems are usually composed of (1) a light engine which provides illumination, (2) optics to transfer the optical information, and (3) a display screen which provides the immediate delivery of the visual information to the user. The light engine and optics are, for all practical purposes, invisible to the user.

The display screen, however, represents the element of direct contact with the user and, for this reason, needs to embody in the best possible way the performance of the system. In other words, the display screen provides the immediate impression to the user and the quality of the image it can provide determines, to a great extent, the acceptance or not of a particular system.

Some of the issues relevant to the performance of display screens are efficiency (brightness), resolution (ability to resolve features and avoid aliasing effects), gain (scattering over specified angular range), low speckle (graininess of image associated with random structures of some screen surface designs), contrast (clear distinction between colors), and ambient light rejection (screen looks black when light engine is turned off). These are just some of the issues that must be taken into account in the design of the light engine, optics, and display screen, since these all work together.

Traditionally, the approaches used to design display screens have been the same as those used for diffusing screens. Thus, display screens have incorporated random elements in the screen surface without, however, being able to closely control the shape of the micro-scatterers or the scattering pattern. The simplest screens have been in the form of classical ground glass diffusers. Other devices have included holographic diffusers and microlens arrays. In most of these cases, some element of randomness has been introduced by the recording of a speckle pattern or by superposing and distributing microlens shapes in a random fashion.

Thus, as with diffusing screens, there exists a need in the art for well-controlled display screens with elementary microstructures that are well defined and chosen to meet specific diffusion requirements.

III. SUMMARY OF THE INVENTION

In view of the foregoing, it is an object of the present invention to provide a structured screen surface that addresses the drawbacks mentioned above by allowing control of the elementary structures (microstructures) that define the surface as well as their relative distribution across the surface of the device. The control of surface shape and relative spatial arrangement is completely deterministic, in contrast with the prior art which relies on statistical control and placement of microstructures. With the approach of the invention it is possible to modify the quality of the light spreading process so as to make it appropriate and useful in a wide range of applications.

A key distinction of the invention in relation to the prior art is its ability to finely shape the form of the screen surface and arbitrarily distribute it to within, for example, fractions of a micron as well as position the elementary units relative to each other in a precise and general fashion. Methods based on statistical processes are unable to attain such accuracy and, for that reason, can control the spreading pattern only to a limited degree. Put simply, the precise definition of the light spreading (scattering) pattern produced by a screen depends on the features of the screen. If only limited control is possible over the screen structure, only limited shaping is possible over the resulting scattering.

The structured relief surface according to the invention is composed of two main aspects, which are the shape of the elementary units and the spatial distribution of such units. The particular shape of the elementary units is defined by the required properties of the light spreading. The specific shapes can assume many forms including, but not limited to, spherical, parabolic, hyperbolic, piecewise linear, piecewise polynomial, pyramidal, conical or combinations thereof. Specific shapes affect the spreading differently and specific choices can be made that are suitable to the spreading required for any particular application. Combinations of different shapes at different locations on a screen surface can be used if desired.

In addition to the shape of the elementary units, the relative spatial arrangement of those units can be defined arbitrarily. For this purpose, we introduce two distinct coordinate systems that completely define the surface relief of the screen. In relation to these frames of reference, it is possible to define an arbitrary spatial distribution of microstructures relative to a global frame but also relative to its local reference coordinate system. In the present inventive process, the arrangement of units follows any specified pattern with a precision of, for example, only a fraction of a micron. A key distinction of the present invention in relation to the prior art is its ability to distribute elementary units according to patterns where not only shapes and sizes but also relative locations are distinct.

In accordance one of its aspects, the invention provides a method for making a structured screen that provides a desired spread of incident light, said structured screen comprising a substrate and a plurality of microstructures distributed over at least one surface of said substrate, said method comprising:

(a) selecting a location on said at least one surface of the substrate for each of said plurality of microstructures;

(b) selecting a configuration for each of said plurality of microstructures;

(c) calculating the spread of the incident light for the selected locations and the selected configurations of steps (a) and (b);

(d) comparing the calculated spread of step (c) with the desired spread and, if necessary, repeating at least one of steps (a) and (b), and step (c) until the comparison between the calculated spread and desired spread satisfies a specified criterion (e.g., angular spread, homogeneity, etc.); and (e) producing a plurality of microstructures having, to an accuracy of better than $10 \cdot \lambda_n$, the locations and the configurations which, in step (d), resulted in the satisfaction of the specified criterion, where $10 \cdot \lambda_n$ is the nominal operating wavelength for the screen.

In accordance with another of its aspects, the invention provides apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus.

The nominal operating wavelength $\lambda_n$ can be, for example, the midpoint of the wavelength range over which the screen (apparatus) will be used or a particular wavelength of interest within such a range. Preferably, the accuracy of the microstructures and their locations is better than $5 \cdot \lambda_n$, and most preferably better than $\lambda_n$ or fractions thereof. For a screen that is to be used in the visible range, this corresponds to a preferred accuracy on the order of a few microns and a most preferred accuracy on a sub-micron (fraction of a micron) level. To simplify the presentation, the most preferred level of accuracy for the visible range is referred to at various points in the specification, it being understood that these references are only for the purpose of facilitating the discussion of the invention and are not intended in any way to limit the invention to this level of accuracy.

In certain embodiments, at least a portion of at least some of the microstructures is selected to have a configuration given by:

$$s(x, y) = \frac{c[(x-x_c)^2 + (y-y_c)^2]}{1 + \sqrt{1 - (\kappa+1)c^2[(x-x_c)^2 + (y-y_c)^2]}} + \sum_p A_p[(x-x_c)^2 + (y-y_c)^2]^{p/2}$$

where s(x,y) is the sag of said portion, c is its curvature, ($x_c$, $y_c$) is its center point, $\kappa$ is a conic constant, and $A_p$ are aspheric coefficients. In certain aspects of these embodiments, $A_p \neq 0$ for at least one p, or $\kappa \neq 0$, or $\kappa = -1$ and $A_p = 0$ for all p. Microstructures having at least one of these three properties (i.e., $A_p \neq 0$ for at least one p, or $\kappa \neq 0$, or $\kappa = -1$ and $A_p = 0$ for all p) are themselves an aspect of the invention.

In other embodiments, at least a portion of at least some of the microstructures is selected to have a configuration given by:

$$s(x, y) = \sum_{p=1}^{\infty} B_p(x-x_c)^p + C_p(y-y_c)^p$$

where s(x,y) is the sag of said portion, ($x_c$, $y_c$) is its center point, and $B_p$ and $C_p$ are power series coefficients.

In further embodiments, at least some of the microstructures comprise an anamorphic microlens. In connection with these embodiments, at least a portion of at least some of the microstructures can be selected to have a configuration given by:

$$s(x, y) = \frac{(c_x(x-x_c))^2 + (c_y(y-y_c))^2}{1 + \sqrt{1 - (1+\kappa_x)(c_x(x-x_c))^2 + (1+\kappa_y)(c_y(y-y_c))^2}}$$

where s(x,y) is the sag of said portion, ($x_c$, $y_c$) is its center point, $c_x$ and $c_y$ are curvatures along x and y, respectively, and $\kappa_x$ and $\kappa_y$ are conic constants along x and y, respectively.

Alternatively, for these embodiments, the configuration can be given by:

$$s(x, y) = \frac{(c_x(x-x_c))^2}{1 + \sqrt{1 - (1+\kappa_x)(x-x_c)^2}} + \frac{(c_y(y-y_c))^2}{1 + \sqrt{1 - (1+\kappa_y)(y-y_c)^2}} + \sum_p (A_{xp}(x-x_c))^p + (A_{yp}(y-y_c))^p$$

where s(x,y) is the sag of said portion, ($x_c$, $y_c$) is its center point, $c_x$ and $c_y$ are curvatures along x and y, respectively, $\kappa_x$ and $\kappa_y$ are conic constants along x and y, respectively, and $A_{xp}$ and $A_{yp}$ are higher order aspheric coefficients along x and y, respectively.

The first form is generally not used with aspheric coefficients since it couples curvatures and conic constants in x and y.

In still further embodiments, at least some of the microstructures comprise a curved, microlens portion and a straight-sided, piston (cylindrical) portion. Microstructures having this microlens-piston structure are themselves an aspect of the invention.

FIG. 1 schematically illustrates two microstructures constructed in this way, where microstructure 1 has a spherical microlens portion of maximum sag $s_1$ and a piston portion of diameter $d_1$ and height (offset) $p_1$, and microstructure 2 has a parabolic microlens portion of maximum sag $s_2$ and a piston portion of diameter $d_2$ and height (offset) $p_2$, with the apices of the two microstructures being separated by a depth D. For ease of illustration, this drawing shows convex microstructures and only two microlens configurations, it being understood that the invention also applies to concave microstructures, combinations of convex and concave microstructures, and microlens configurations of any and all types.

In other embodiments, at least a portion of at least some of the microstructures is selected to have a configuration characterized by at least one parameter with the at least one parameter being randomly distributed in accordance with a predetermined probability density function (e.g., a uniform probability density function over a predetermined range for the parameter). Screens having microstructures having such randomized configurations are themselves an aspect of the invention.

Examples of parameters which can be randomly distributed include:

radius of curvature; maximum surface sag; a parameter characteristic of the transverse size of a microstructure (e.g., diameter); for microstructures which comprise a curved, microlens portion and a straight-sided, piston portion (see FIG. 1), the heights of the straight-sided, piston portions; and for microstructures having apices, the distances of the apices from the screen's substrate or, alternatively, where the distances have a maximum value, the differences between the distances and said maximum value.

More than one parameter (e.g., two parameters) can be randomized, if desired, with the randomization (e.g., probability density function) being the same or different for the parameters. For example, in the case of a microstructure which comprises a curved, microlens portion and a straight-sided, piston portion, one randomly-distributed parameter can characterize the curved, microlens portion and a second randomly-distributed parameter can characterize the straight-sided, piston portion.

In additional embodiments, the locations of the microstructures form a regular array (e.g., a hexagonal array). In other embodiments, the locations are based on a set of unit cells which form a mosaic (e.g., a random mosaic). In connection with these embodiments, the screen can have internal microstructures and edge microstructures, with the mosaic providing at least some junctions between internal microstructures that correspond, in terms of light spreading, to at least some junctions between edge microstructures resulting from the tiling of two screens to one another.

In further embodiments, the locations of the microstructures are randomly distributed in accordance with a predetermined probability density function. For example, the locations of the microstructures can be based on a random set of polygonal shaped boundaries.

In accordance with still further embodiments, the substrate of the screen comprises two spaced-apart (e.g., major) surfaces and the microstructures are distributed over both surfaces. In other embodiments, microstructures are distributed over one of the surfaces, with the other surface comprising a Fresnel lens.

In additional embodiments, the screen's substrate defines a first optical axis and the configuration of at least some of the microstructures comprises a microlens which defines a second optical axis which is not parallel to the first optical axis. Screens having such a configuration are themselves an aspect of the invention.

In accordance with another of its aspects, the invention provides a structured screen comprising a plurality of predetermined microstructures, wherein:

(a) said microstructures comprise a curved, microlens portion and a straight-sided, piston portion which has a predetermined height which can be zero:

(b) said curved, microlens portions have predetermined diameters and predetermined maximum sags; and (c) for at least some of said microlenses, the sum of the predetermined maximum sag and the predetermined height is greater than the predetermined diameter.

In accordance with this aspect of the invention, at least one of the predetermined diameters, the predetermined maximum sags, and the predetermined heights can be randomly distributed in accordance with a predetermined probability density function (e.g., a uniform probability density function over a predetermined range for said diameters, maximum sags, and/or heights).

In accordance with a further of its aspects, the invention provides a structured screen comprising a plurality of predetermined aspherical microlenses (e.g. parabolic microlenses), wherein said microlenses:

(a) have predetermined diameters and predetermined maximum sags; and (b) produce a spread of incident light which has a flatter intensity distribution than that produced by a plurality of spherical microlenses having the same predetermined diameters and predetermined sags.

In accordance with this aspect of the invention, at least one of the predetermined diameters and the predetermined maximum sags can be randomly distributed in accordance with a predetermined probability density function (e.g., a uniform probability density function over a predetermined range for said diameters and/or maximum sags).

In accordance with another of its aspects, the invention provides a structured screen comprising:

(a) a Fresnel lens which comprises a plurality of surfaces in the form of concentric rings; and (b) a plurality of microstructures distributed over at least some of said plurality of surfaces, said plurality of microstructures serving to control the spread of light incident on the structured screen.

In accordance with a further aspect, the invention provides a structured screen comprising a plurality of unit cells and a plurality of microstructures, one microstructure associated with each unit cell, wherein the perimeters of the unit cells are non-regular polygons. In certain embodiments of this aspect of the invention, the perimeters can be defined by a predetermined probability density function.

In accordance with an additional aspect, the invention provides a structured screen comprising a plurality of microstructures at least some of which comprise a microlens having a first curvature in a first direction and a second curvature in a second direction orthogonal to the first direction, at least one of said first and second curvatures being randomly distributed in accordance with a predetermined probability density function. In certain embodiments of this aspect of the invention, both the first and second curvatures are randomly distributed in accordance with a predetermined probability density function which may be the same or different for the two curvatures.

In accordance with a further aspect, the invention provides a structured screen comprising:

(a) a first sub-screen comprising a plurality of internal microstructures and a plurality of edge microstructures, each microstructure being located at a predetermined location with respect to all other microstructures, said predetermined locations being based on a first set of unit cells which form a first mosaic; and (b) a second sub-screen comprising a plurality of internal microstructures and a plurality of edge microstructures, each microstructure being located at a predetermined location with respect to all other microstructures, said predetermined locations being based on a second set of unit cells which form a second mosaic;

wherein:

(i) the first and second sub-screens are tiled to one another, said tiling producing edge junctions between edge microstructures of the first sub-screen and edge microstructures of the second sub-screen; and (ii) each of the first and second mosaics provides at least some internal junctions between internal microstructures that correspond, in terms of light spreading, to at least some of the edge junctions.

In certain embodiments of this aspect of the invention, each of the first and second mosaics can be random. In other embodiments, the first and second sub-screens are identical.

The advantages of the various aspects and embodiments of the invention referred to above will become apparent in the drawings and detailed description of the invention which follow.

IV. BRIEF DESCRIPTION OF THE DRAWINGS

FIG. 1 is a schematic drawing illustrating representative microstructures of the invention.

FIG. 2 shows diffraction patterns due to two periodic arrays of microlenses of depth equal to 24 μm, calculated using Eq. (2). The nominal operating wavelength is $\lambda_n$=0.6328 μm and the period is $\Lambda$=200 μm. The dashed line is due to a spherical microlens with curvature equal to 0.0157 μm$^{-1}$ while the solid line employs the following parameters (see Eq. (4)): c=0.0118 μm$^{-1}$ and κ=−1.09, without the inclusion of aspheric coefficients.

Figure 14:
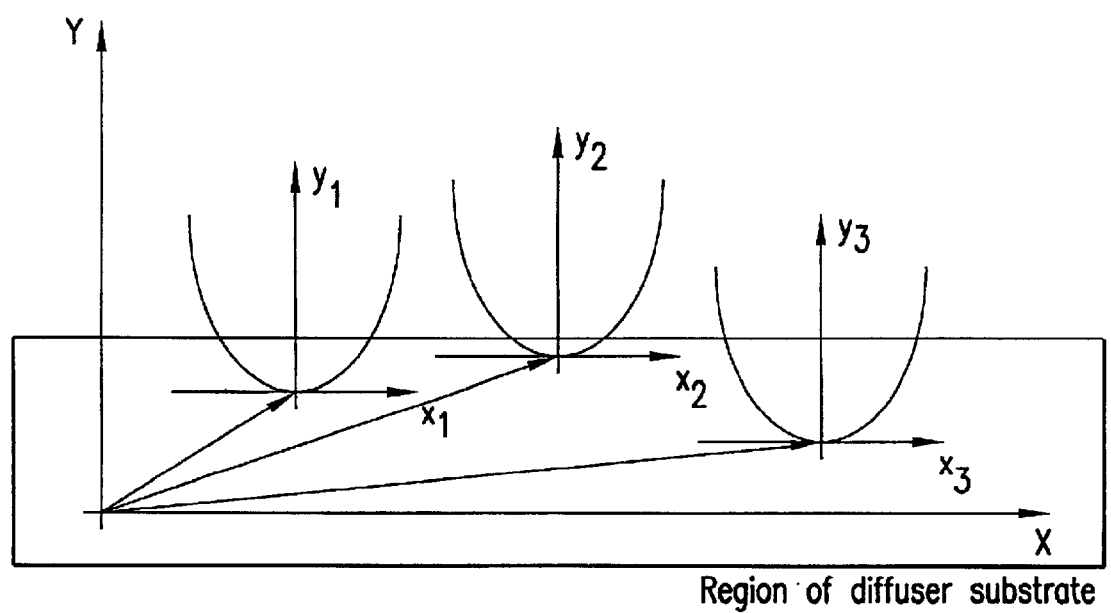

FIG. 14 is a schematic diagram of coordinate systems that can be used to define the spatial localization of elementary structures (microstructures) on one or more surfaces of a screen. For simplicity only a two-dimensional plot is shown. The (X,Y) frame denotes a global coordinate system, while the (x,y) frames denote local coordinates associated with individual microstructures.

Figure 15:
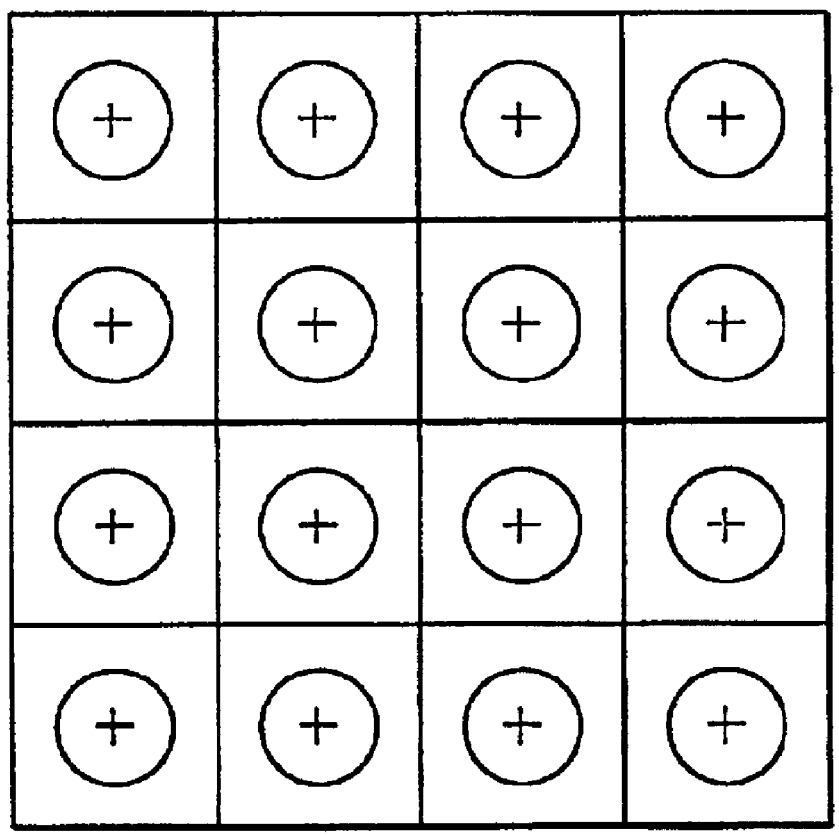

FIG. 15 illustrates elementary units arranged on a regular square lattice with each unit (represented by circles) centered on a unit cell (square regions containing circles) and having a size that is no greater than the cell itself. The center of a cell is represented by the cross mark.

Figure 16:
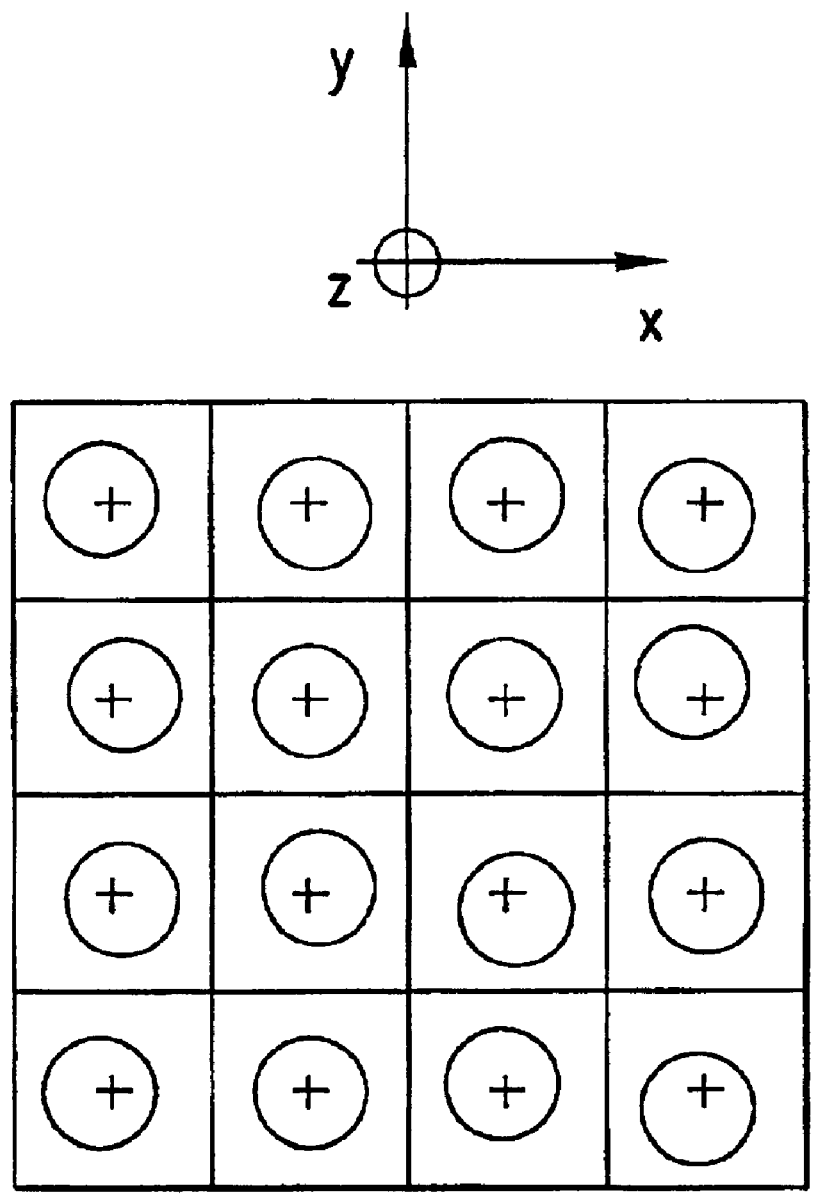

FIG. 16 illustrates an arrangement of elementary units on a square lattice of constant fill factor but with centers of individual units displaced with respect to the centers of the unit cells.

Figure 17:
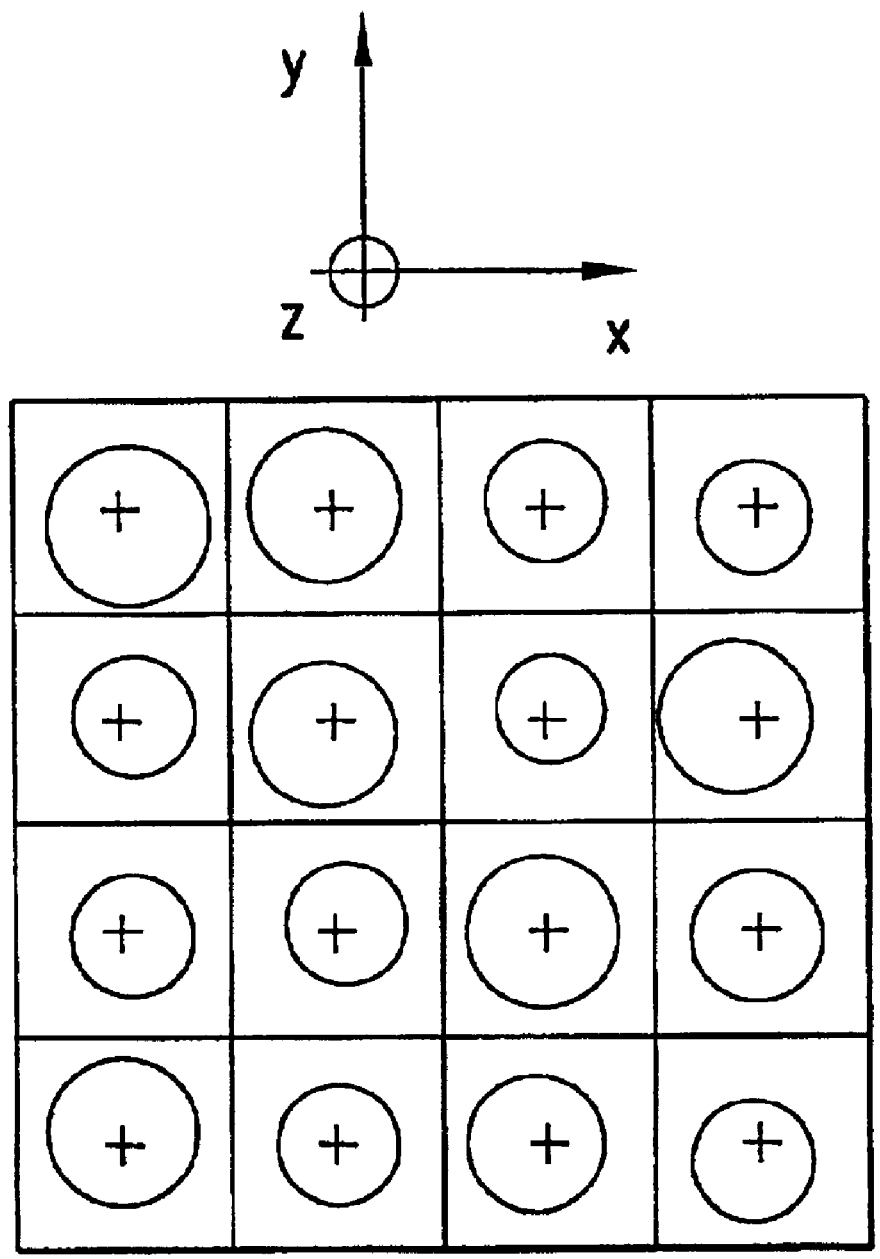

FIG. 17 illustrates an arrangement of elementary units on a square lattice of variable fill factor and with centers of individual units displaced with respect to the centers of the unit cells.

Figure 18:
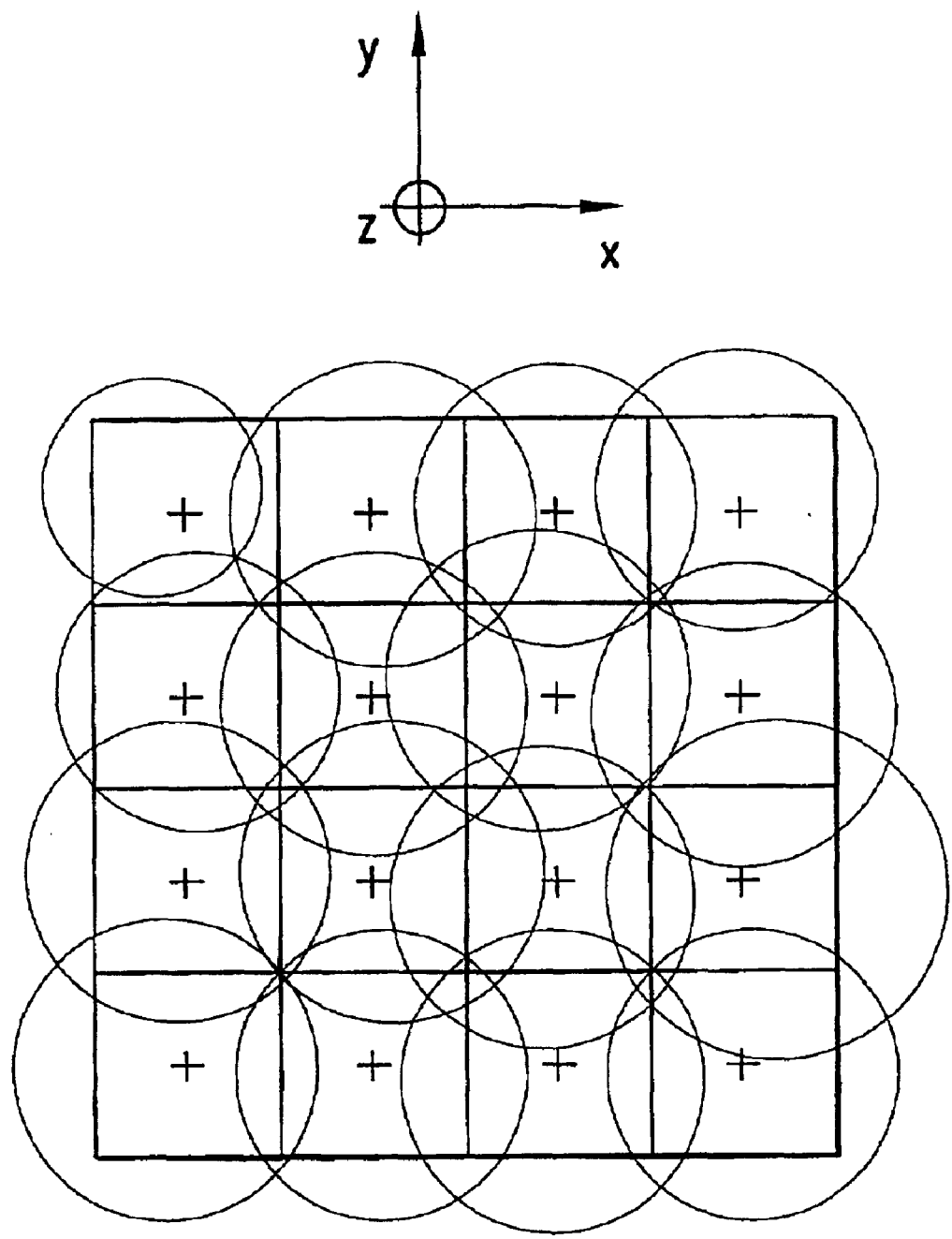

FIG. 18 illustrates an arrangement of elementary units on a square lattice with 100% fill factor. The boundary of each elementary unit is denoted by the dotted line but the unit itself is only defined within the square unit cell. The center of individual units may be displaced with respect to the center of the cell.

Figure 19:
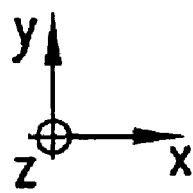
Figure 19:
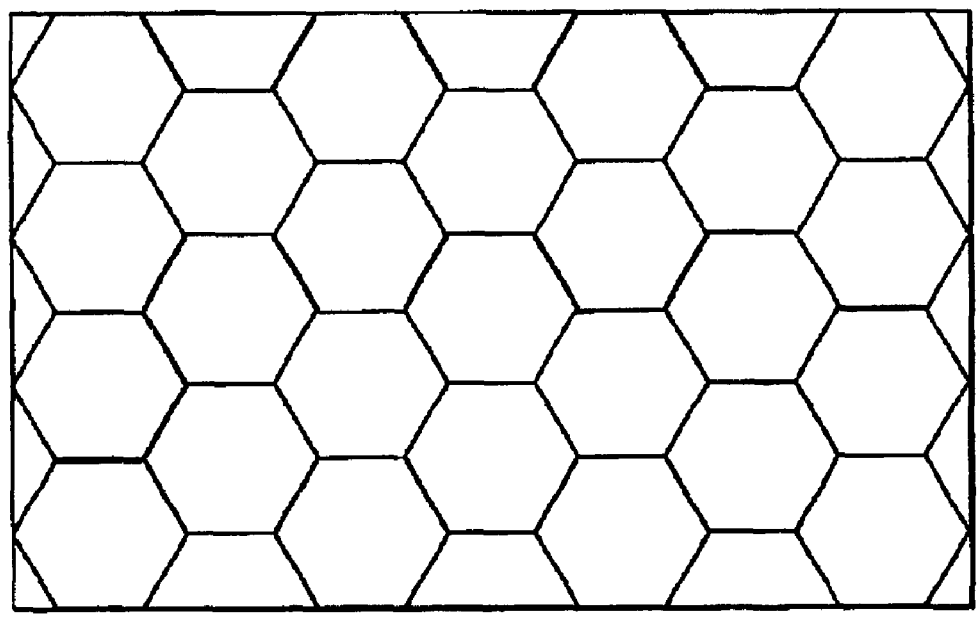

FIG. 19 illustrates elementary units arranged on a regular hexagonal lattice with 100% fill factor.

Figure 20:
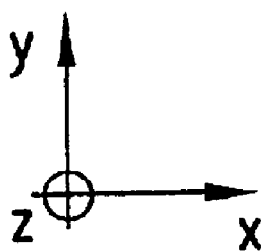
Figure 20:
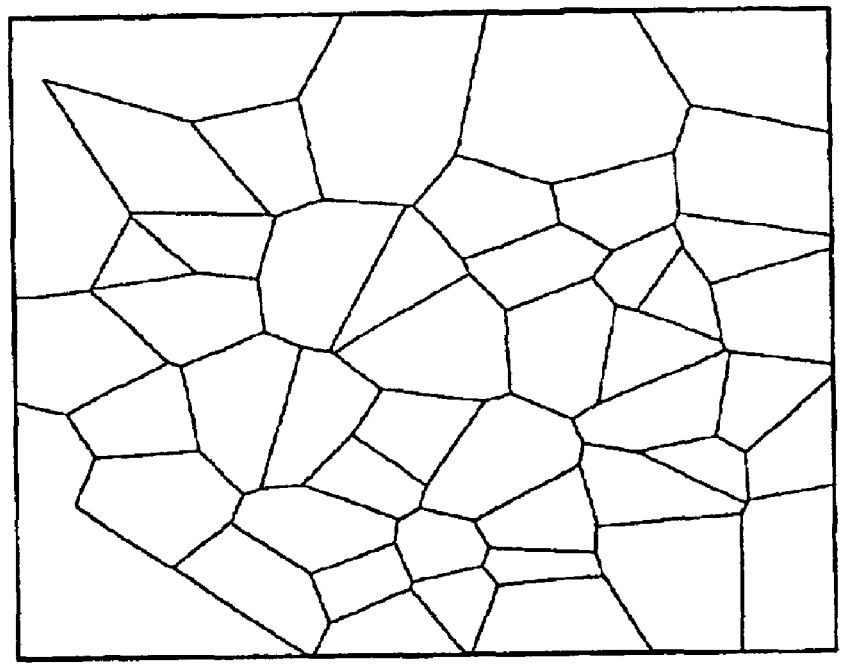

FIG. 20 illustrates elementary units distributed over a random set of polygonal shaped unit boundaries. In this figure, only a view of the contours of the boundaries is shown, in the form of a Voronoi diagram (see *Lectures on Random Voronoi Tessellations*, Jesper Møller, New York: Springer-Verlag, 1994).

Figure 21:
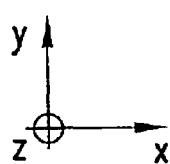
Figure 21:
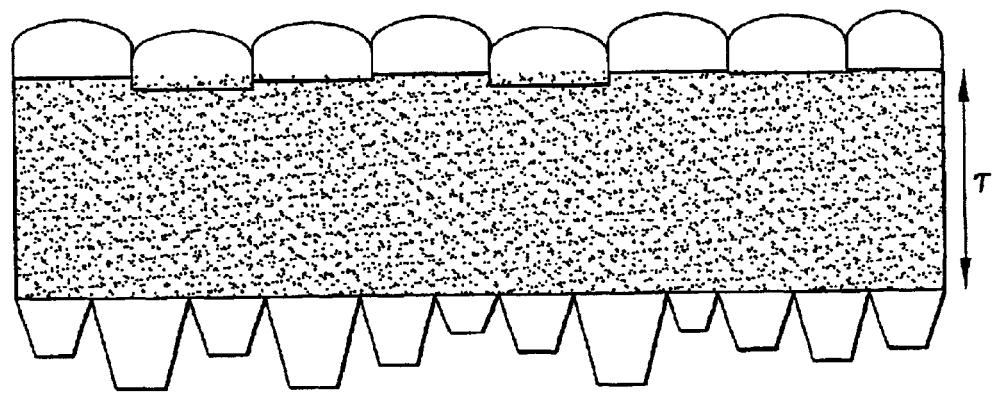

FIG. 21 illustrates a structured screen where both surfaces of a substrate of thickness τ are structured with an array of individual elementary units, according to some of the embodiments of the present invention.

Figure 22:
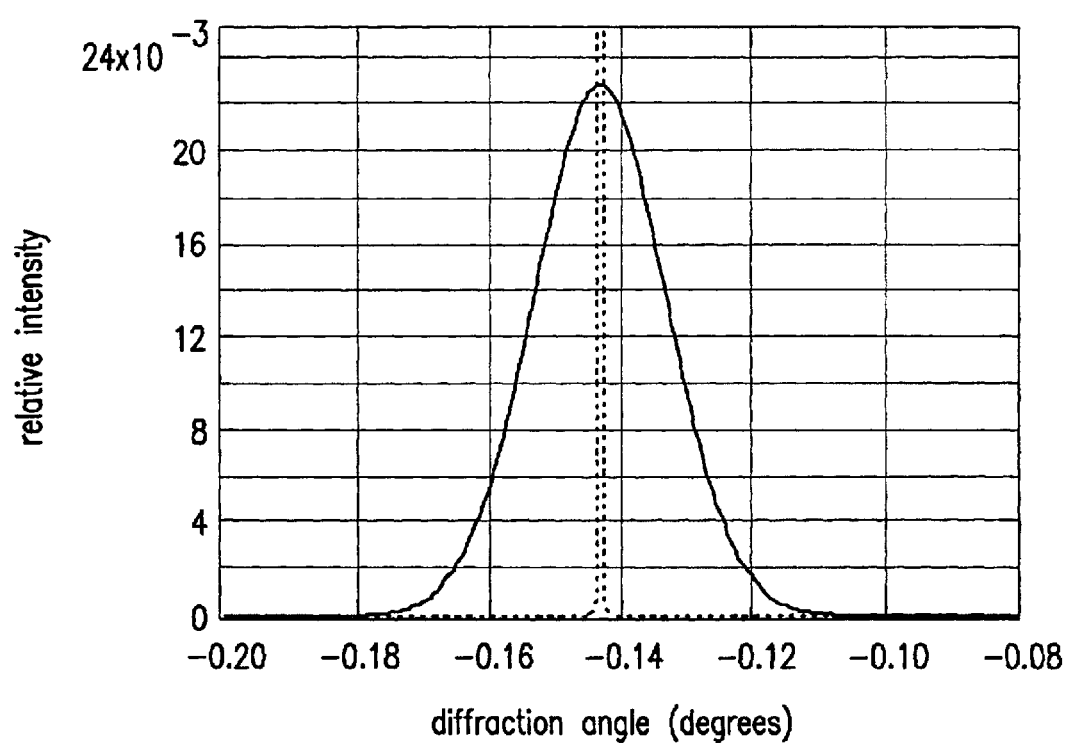

FIG. 22 shows calculated diffraction patterns for diffusive screen arrays composed of triangular elementary units with a vertical offset (solid line) compared to a regular array (dashed line) without such an offset.

Figure 23:
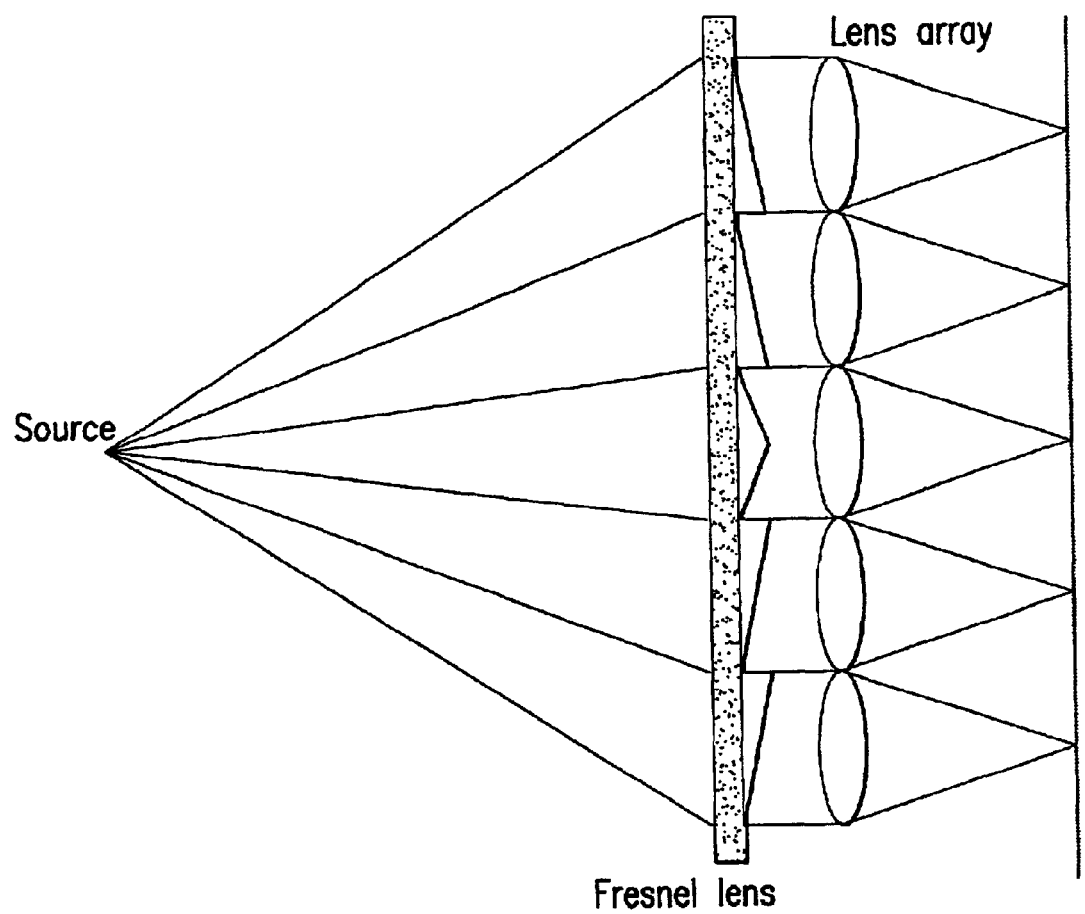

FIG. 23 is a schematic drawing showing an illumination source, a Fresnel lens, and microlens array.

Figure 24:
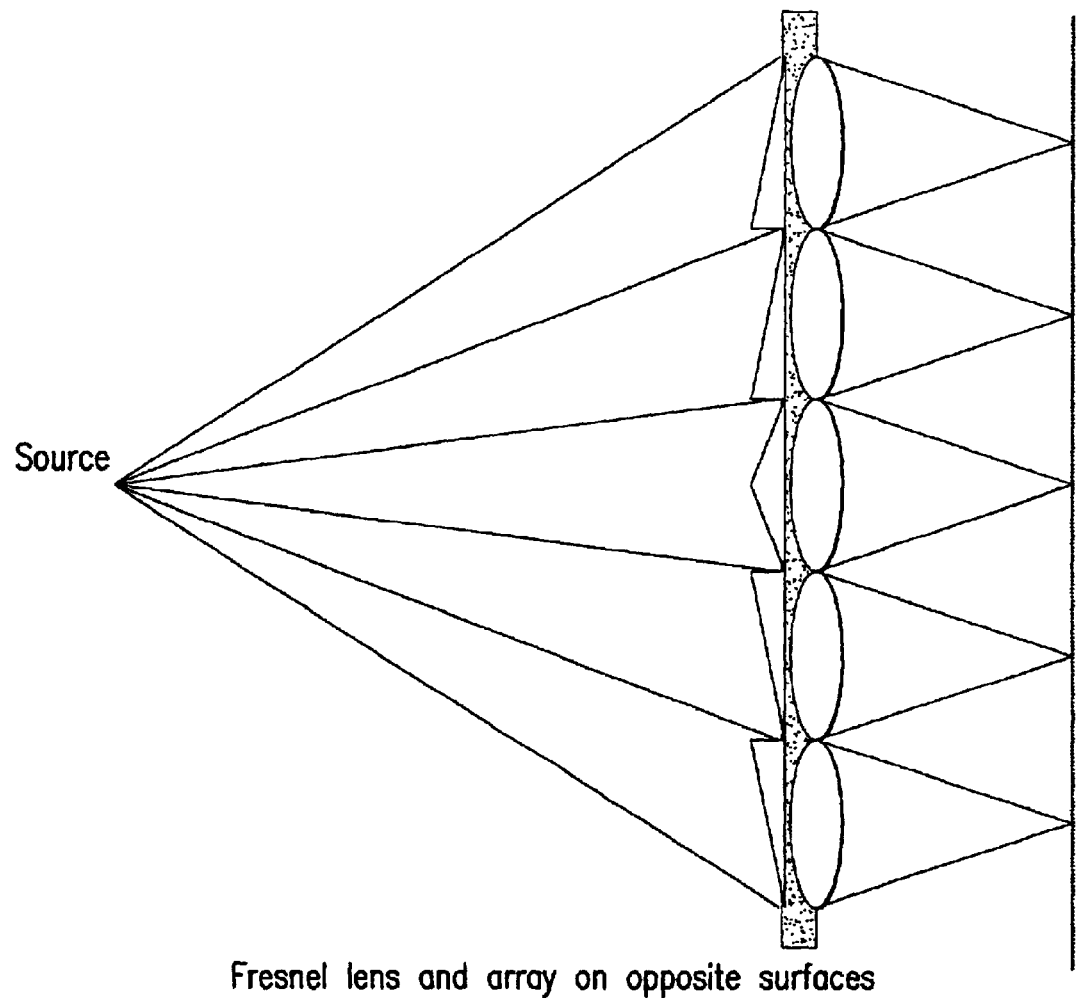

FIG. 24 is a schematic drawing showing a prior art integration of a screen and a Fresnel lens.

Figure 25:
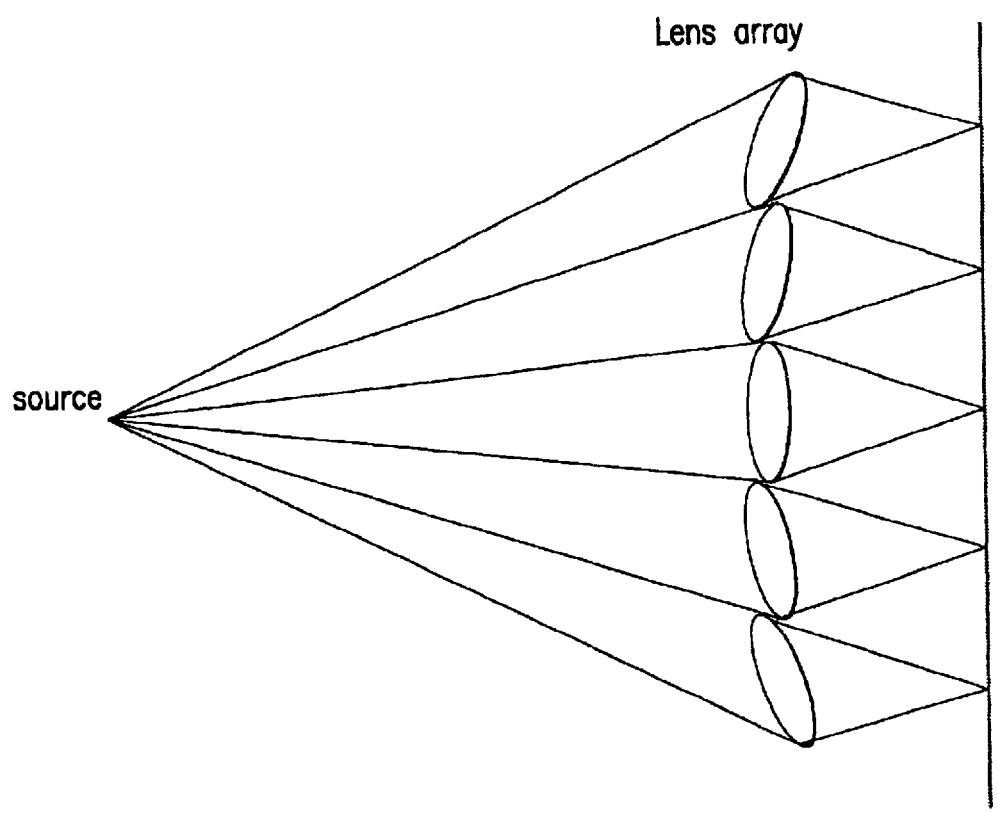

FIG. 25 is a schematic drawing showing the combination of diffusion and Fresnel collimation on a single surface.

Figure 26:
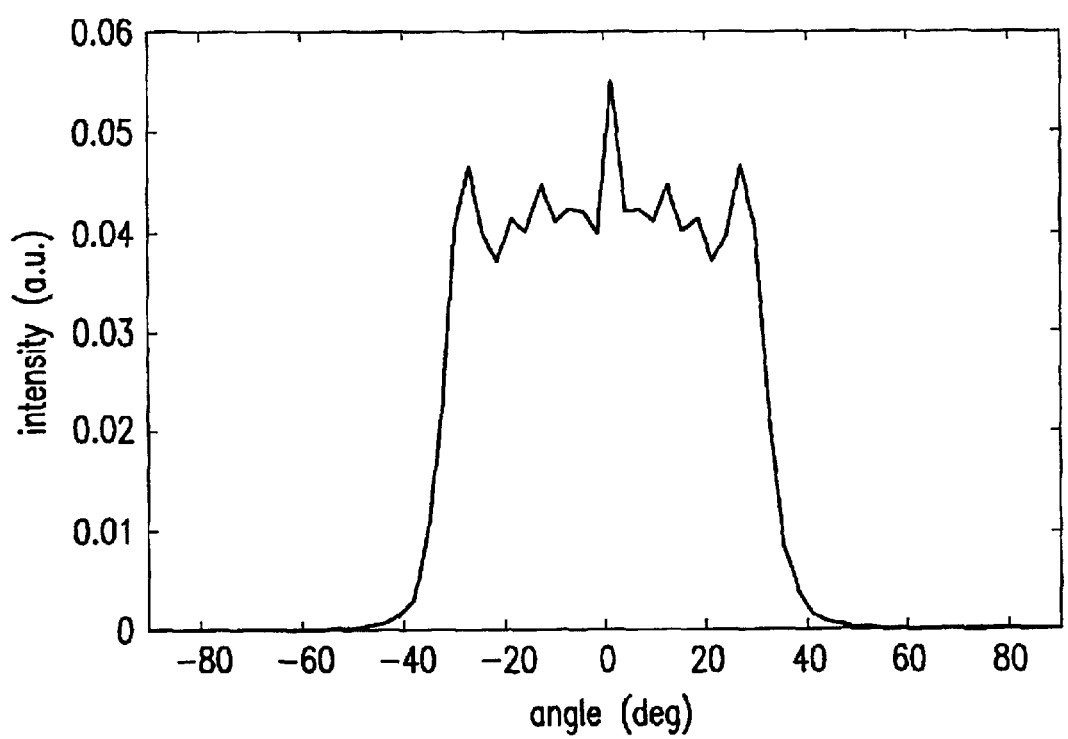

FIG. 26 shows a calculated scattering pattern for a regular array of spherical microlenses 10-μm deep for operation in the infrared.

Figure 27:
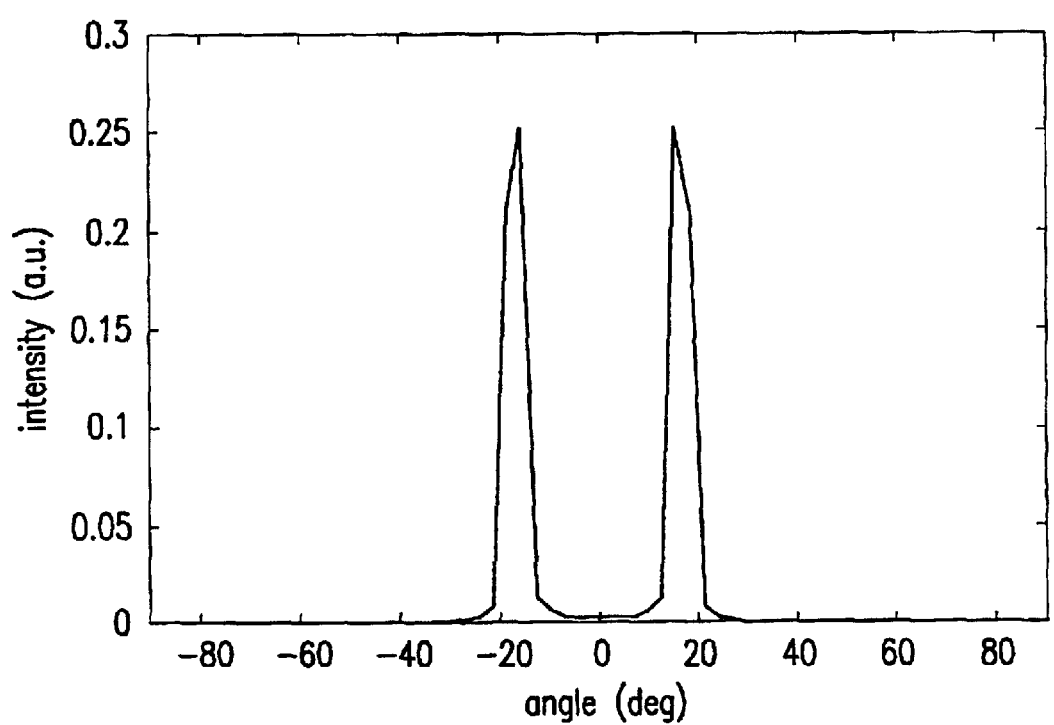

FIG. 27 shows a calculated scattering pattern for a regular array of triangular microstructures 10-μm deep for operation in the infrared.

Figure 28:
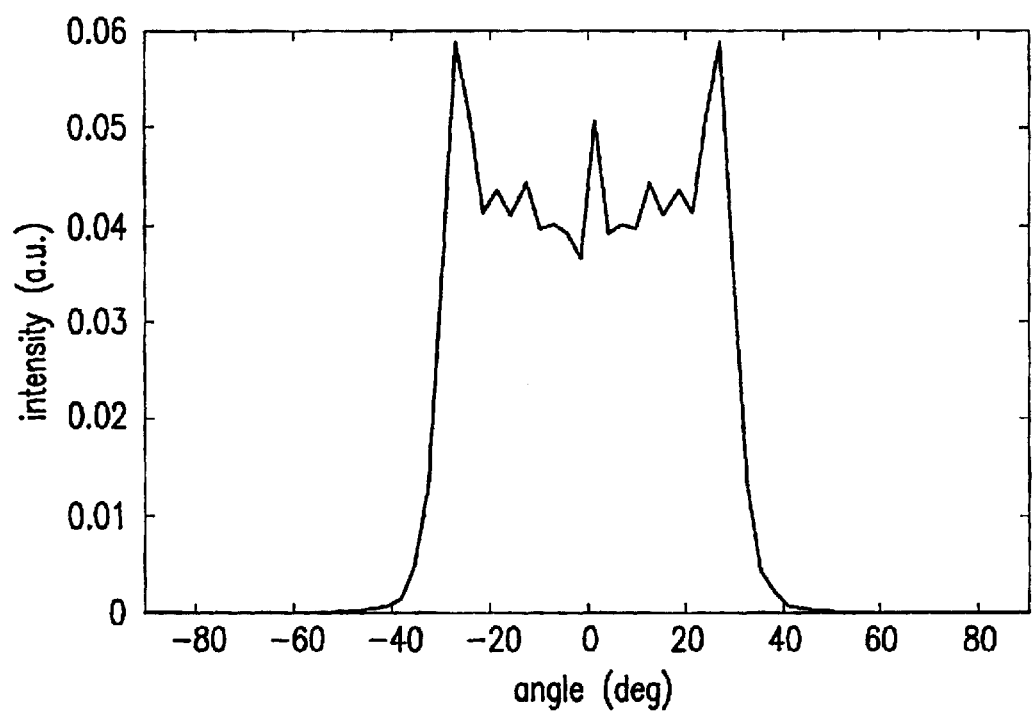

FIG. 28 shows a calculated scattering pattern for a regular array of hyperbolic microstructures 10-μm deep for operation in the infrared.

Figure 29:
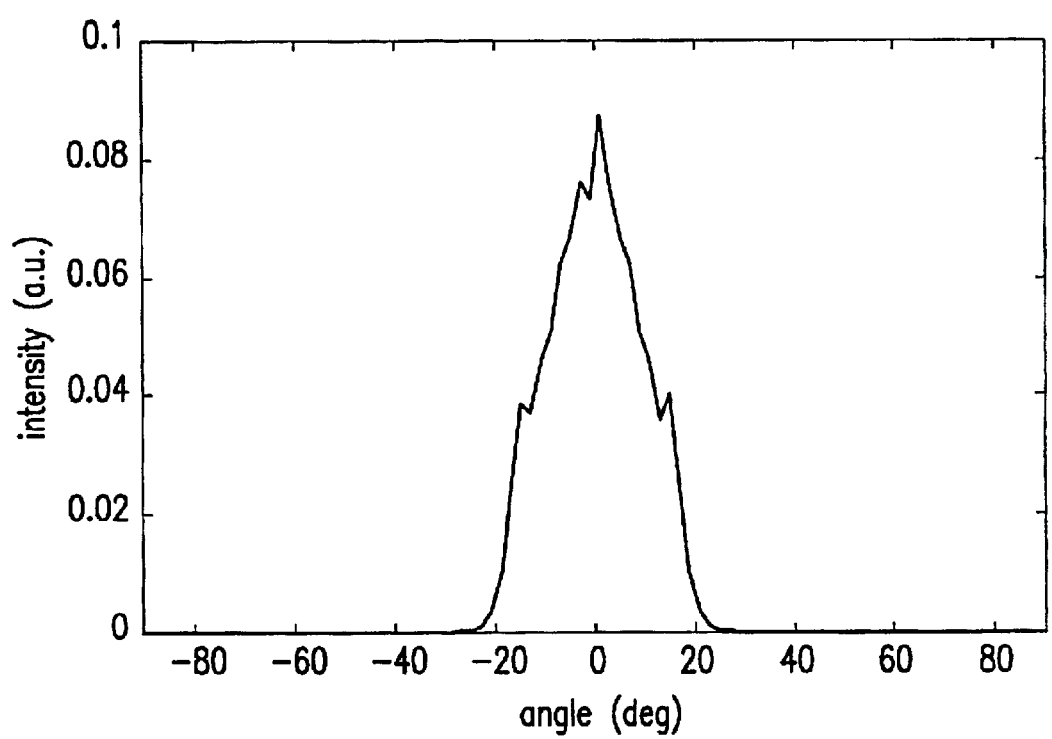

FIG. 29 shows a calculated scattering pattern for a regular array of spherical microstructures 12-μm deep for operation in the visible.

Figure 30:
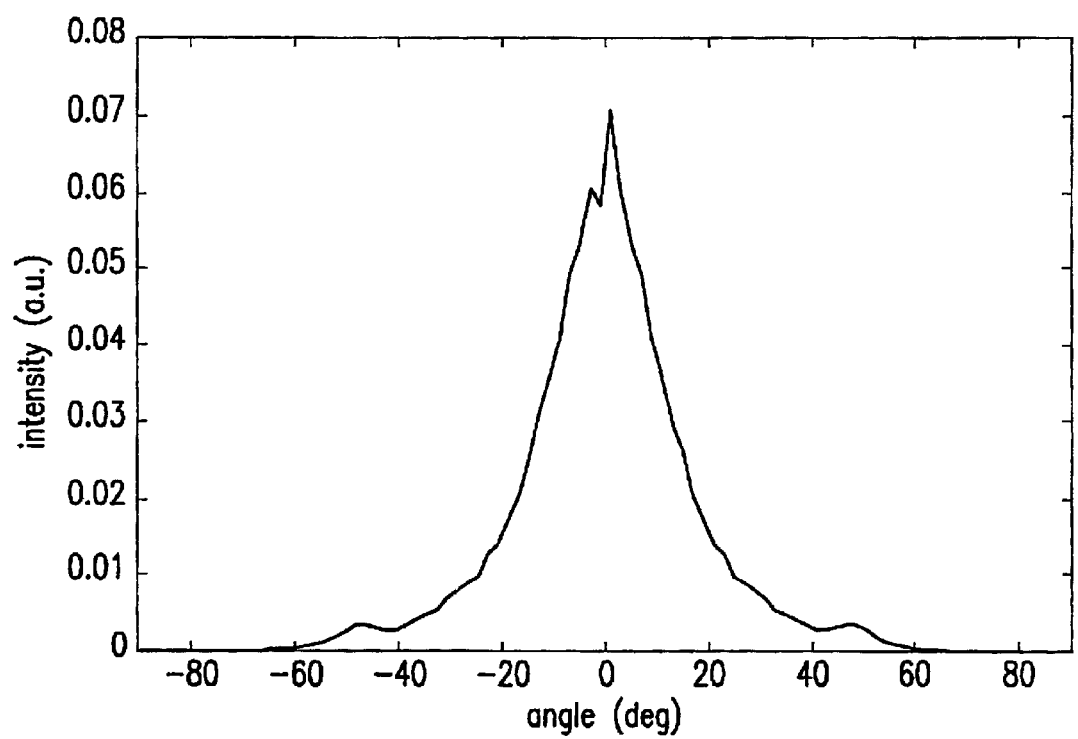

FIG. 30 shows a calculated scattering pattern for a regular array of spherical microstructures 20-μm deep for operation in the visible.

Figure 31:
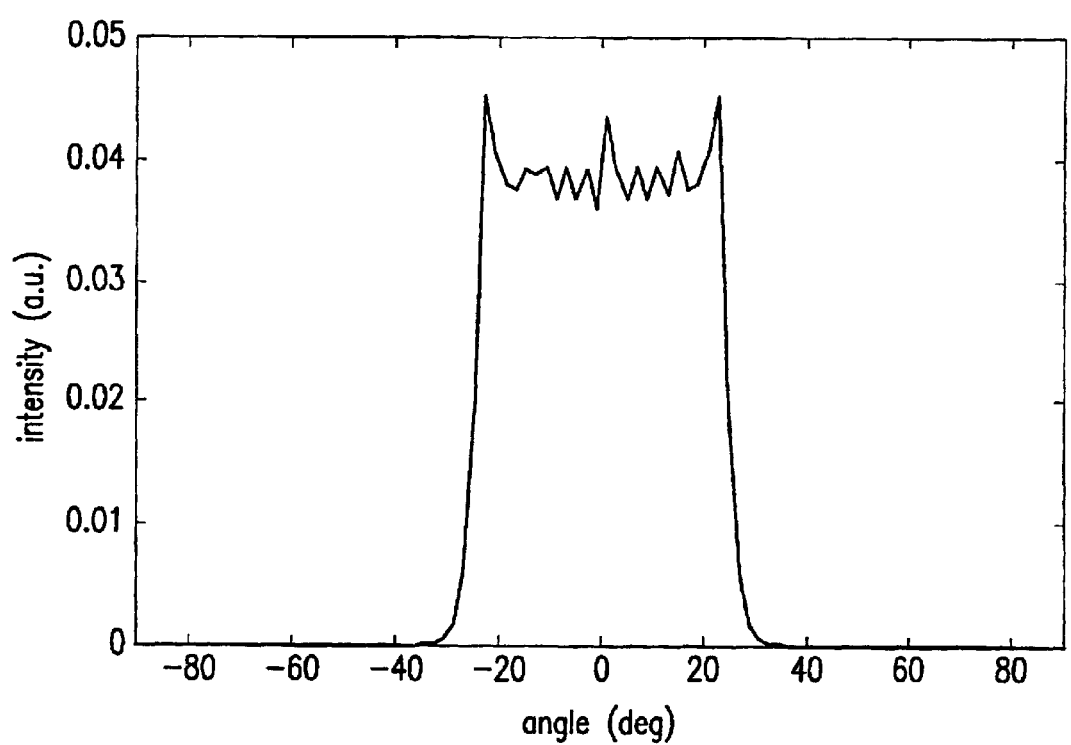

FIG. 31 shows a calculated scattering pattern for a regular array of parabolic microstructures 20-μm deep for operation in the visible.

Figure 32:
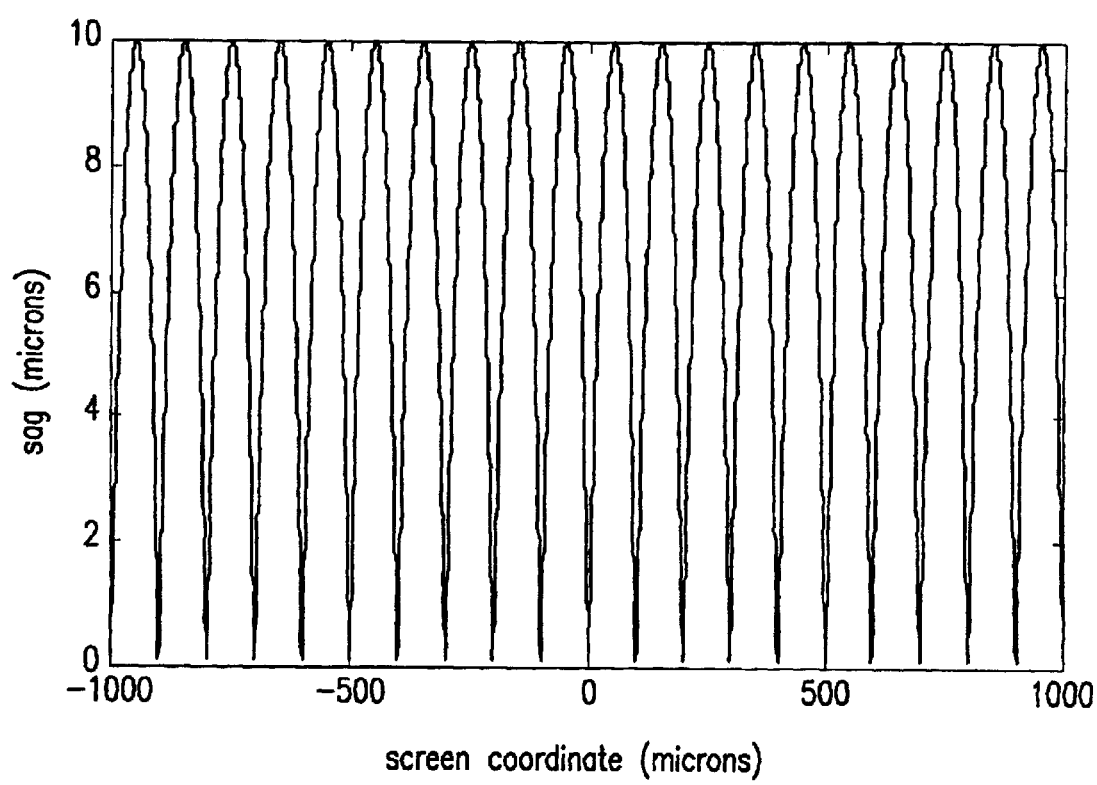

FIG. 32 shows a regular array of spherical microlenses (diameter: 100 microns, maximum sag: 10 microns).

Figure 33:
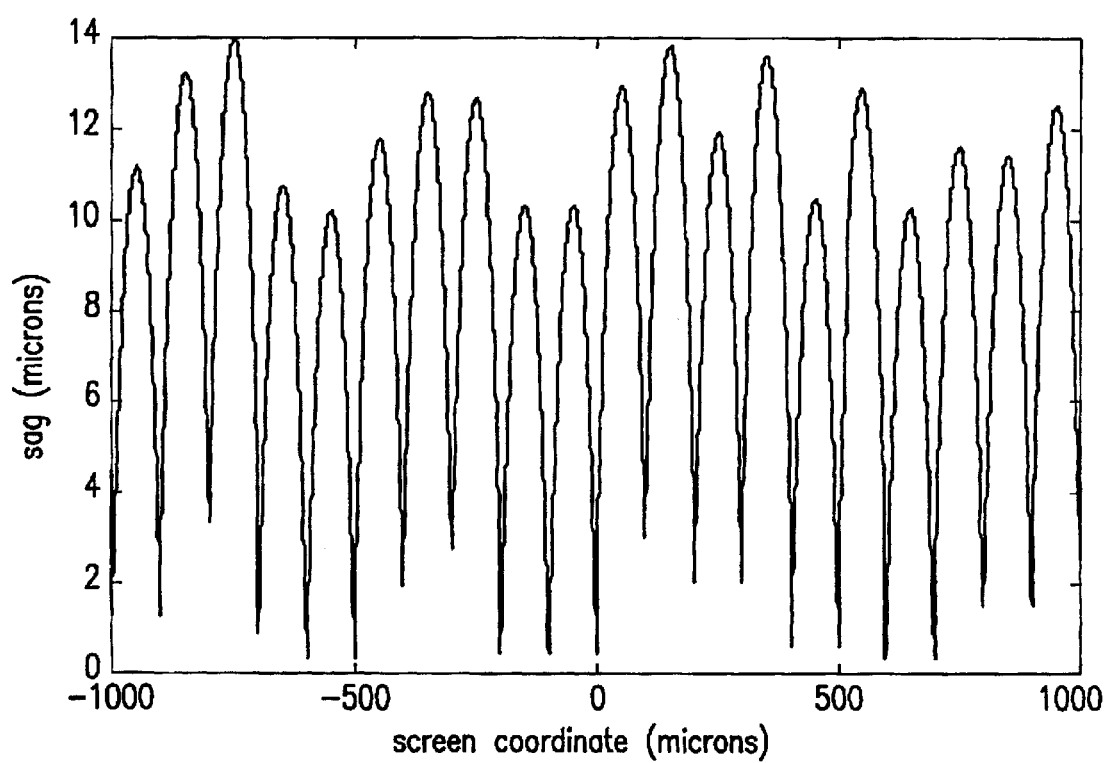

FIG. 33 shows an array of identical spherical microlenses (diameter: 100 microns, maximum sag: 10 microns), with random vertical offset equal to ±2 microns.

Figure 34:
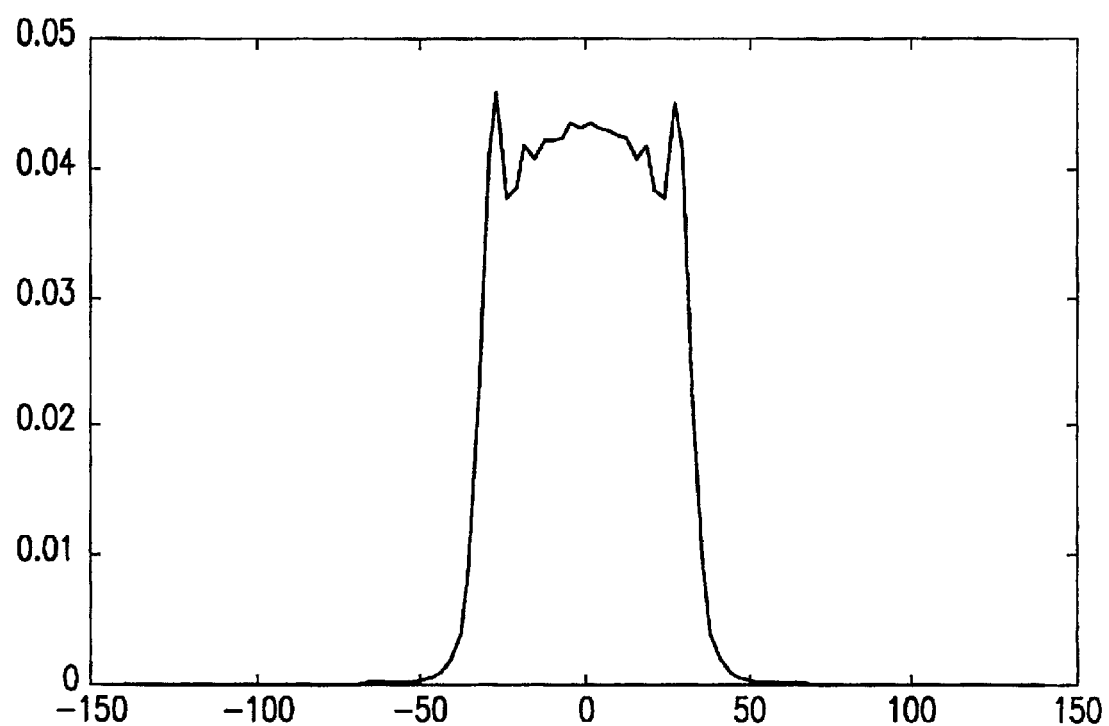

FIG. 34 shows a calculated scattering profile for an array of identical spherical microlenses of 100 microns diameter and 10 microns maximum sag. Vertical microlens positioning includes a maximum vertical offset of ±2 microns.

Figure 35:
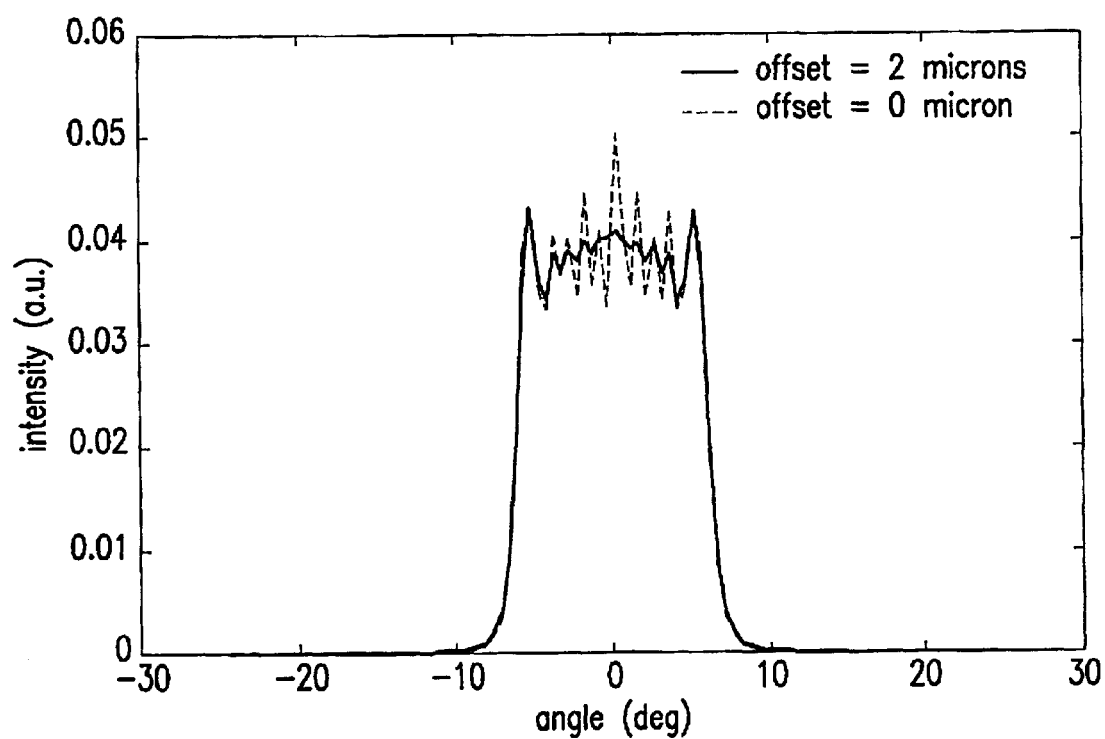

FIG. 35 shows calculated scattering patterns for arrays of identical spherical microlenses of diameter 100 microns and maximum sag 10 microns for operation in the visible, with and without a vertical offset of ±2 microns.

Figure 36:
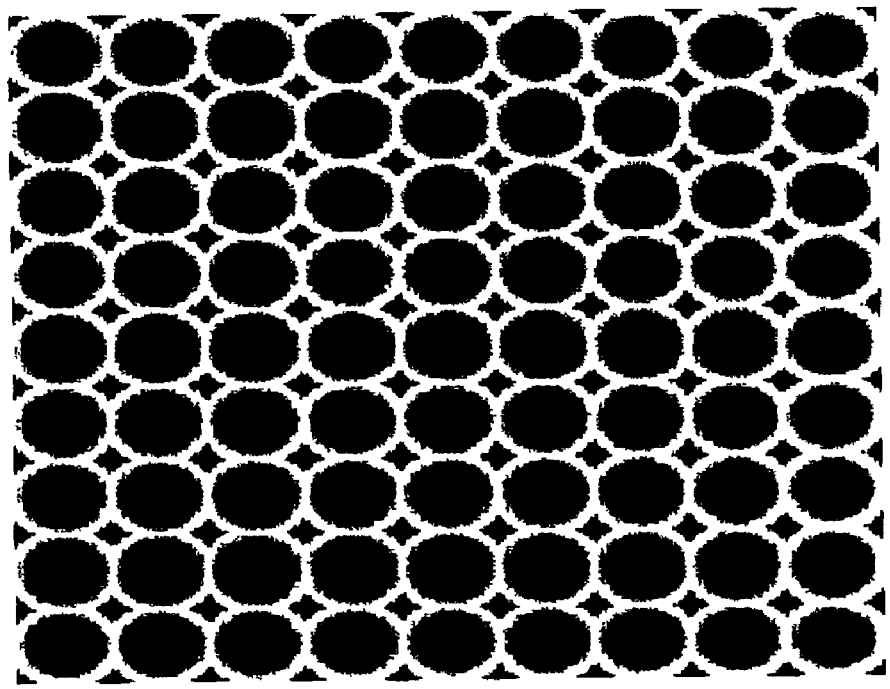

FIG. 36 illustrates a square arrangement of microstructures.

Figure 37:
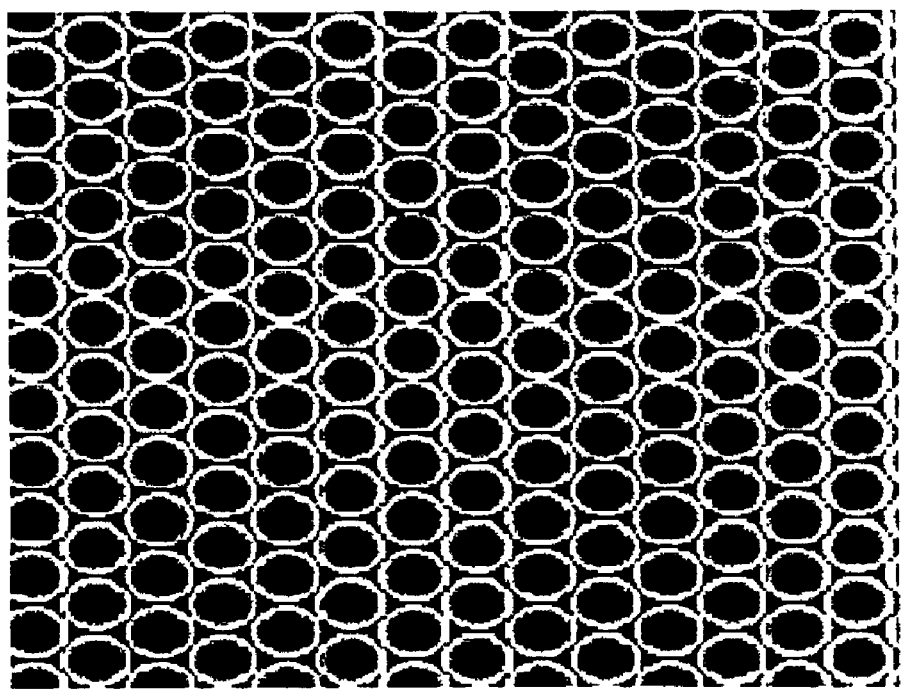

FIG. 37 illustrates a hexagonal arrangement of microstructures.

Figure 38:
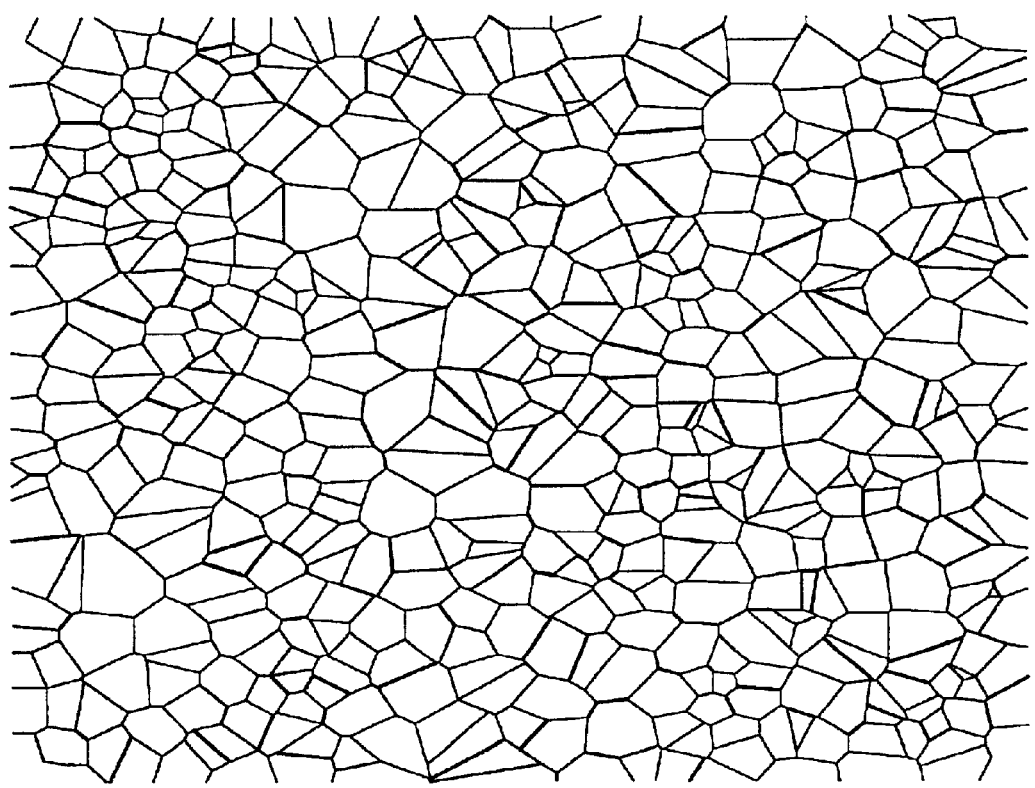

FIG. 38 illustrates a random arrangement of microstructures delimited by random polygonal boundaries.

Figure 39:
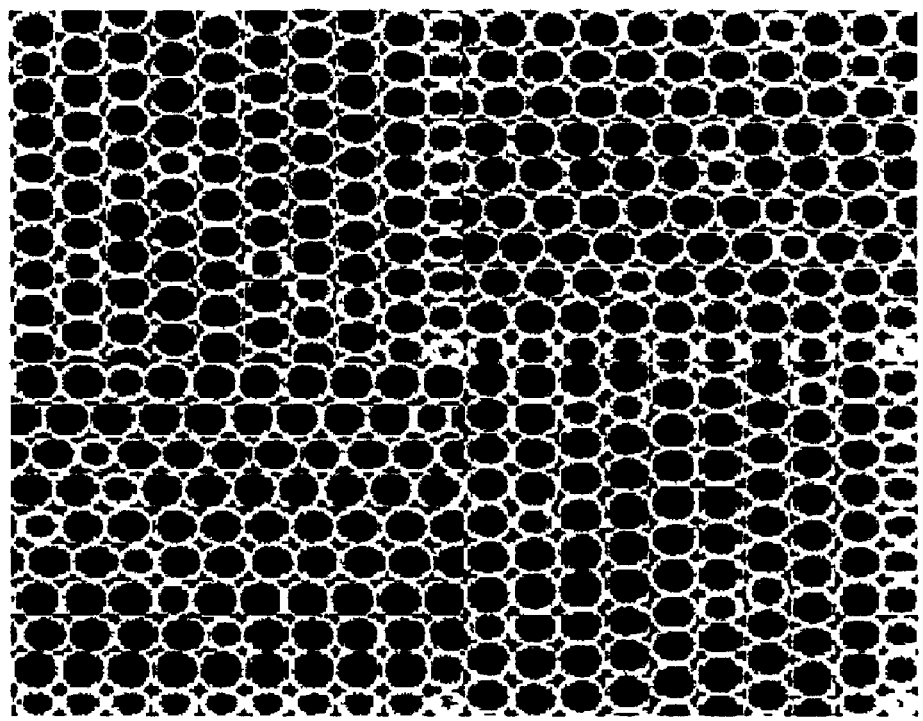

FIG. 39 illustrates a screen with a mosaic spatial arrangement. Note the relative displacement of microlenses and the tiling naturally exhibited by this configuration, i.e., the mosaic has at least some junctions between internal microstructures that correspond, in terms of light spreading, to at least some junctions between edge microstructures which would result from the tiling of two screens to one another.

Figure 40:
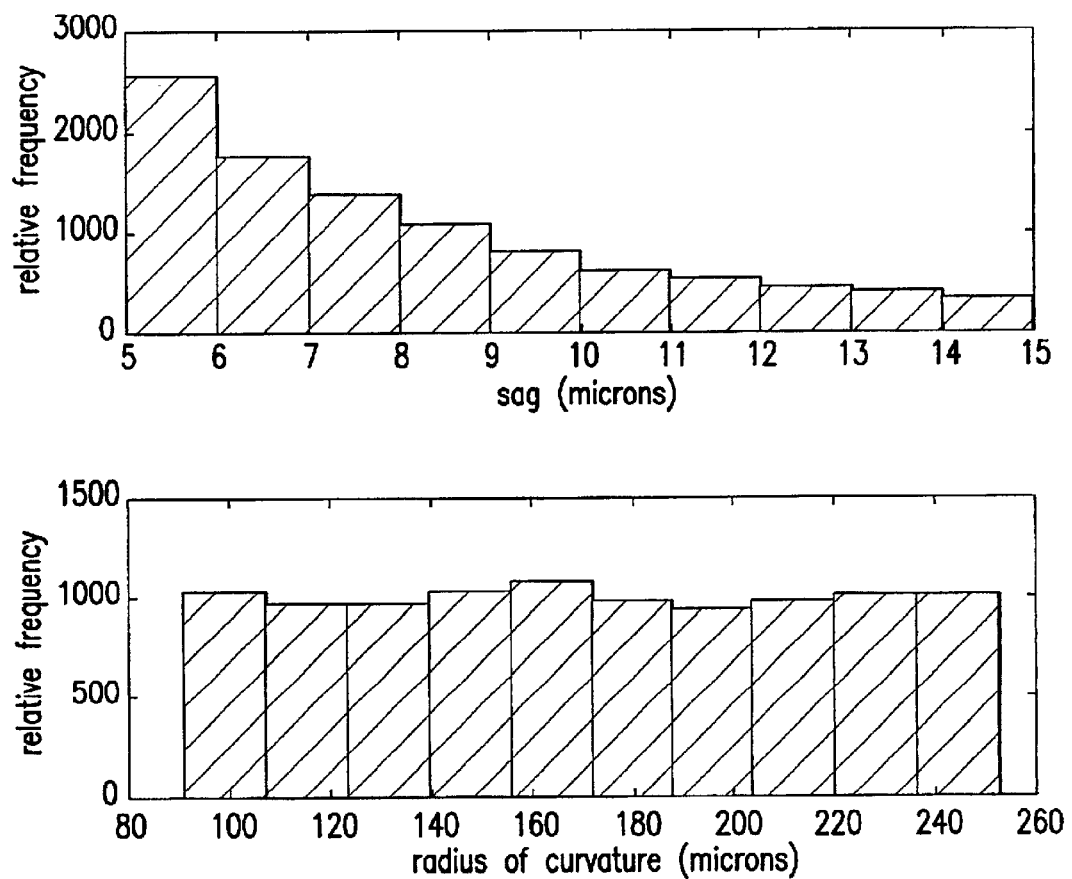

FIG. 40 shows frequency of sag and frequency of radius of curvature (PDF uniform in radius of curvature) for a sag range of 5–15 μm and 100-micron diameter spherical microlenses.

Figure 41:
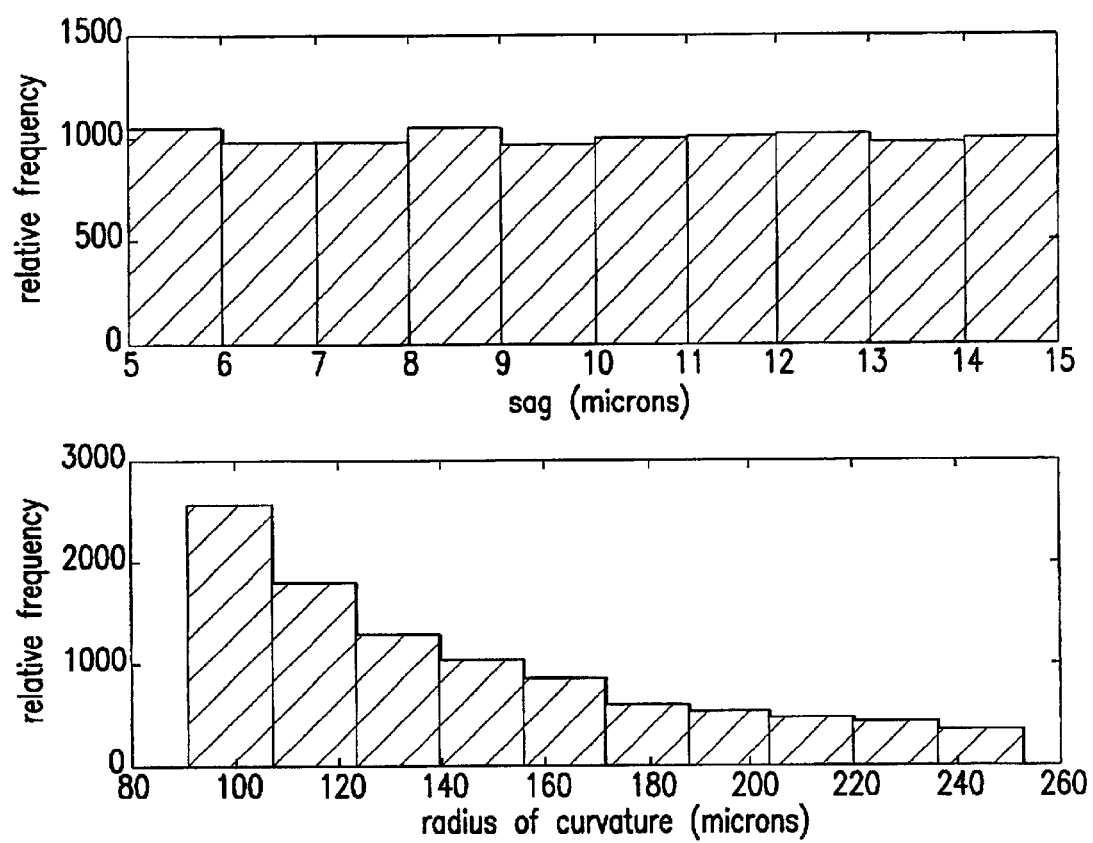

FIG. 41 shows frequency of sag and frequency of radius of curvature (PDF uniform in sag) for a sag range of 5–15 μm and 100-micron diameter spherical microlenses.

Figure 42:
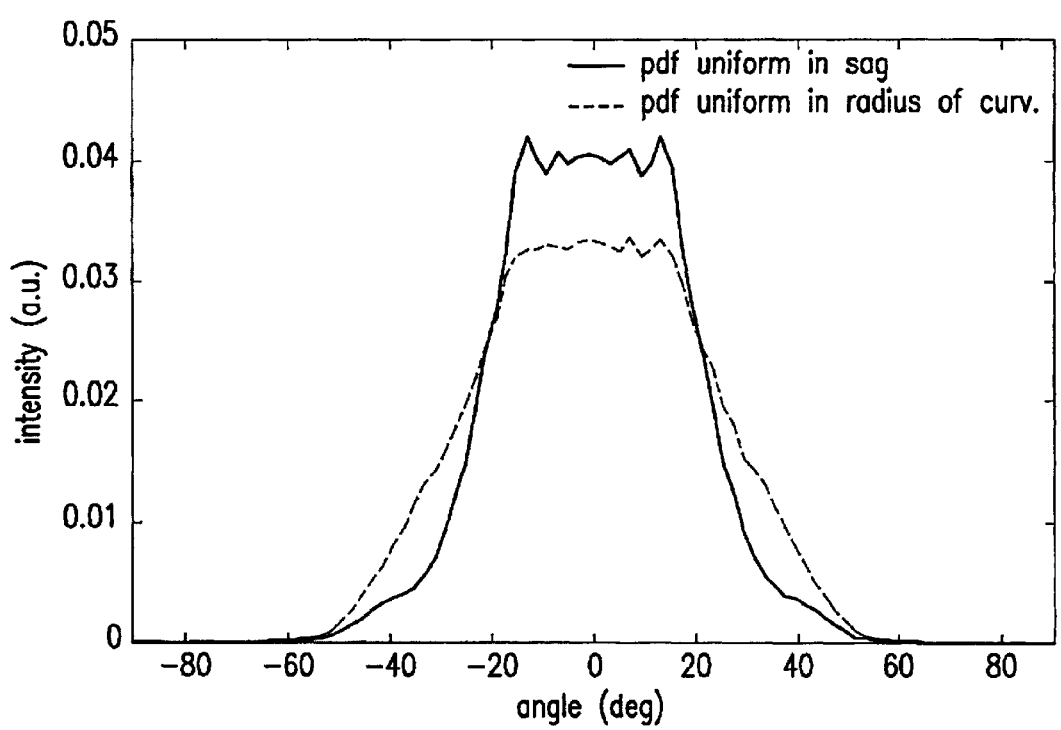

FIG. 42 shows calculated scattering patterns which illustrate the effect of a probability distribution function on scattering pattern for an array of random spherical microlenses with a sag range between 5 μm and 15 μm. The lens diameter is 100 microns and the vertical offset is ±2 μm.

Figure 43:

FIG. 43 shows an array of spherical microlenses with a hexagonal arrangement. Each microlens is 0.5 mm in diameter and has a maximum sag in the range 2 to 8 μm. There is also a vertical offset of ±2 μm.

Figure 44:
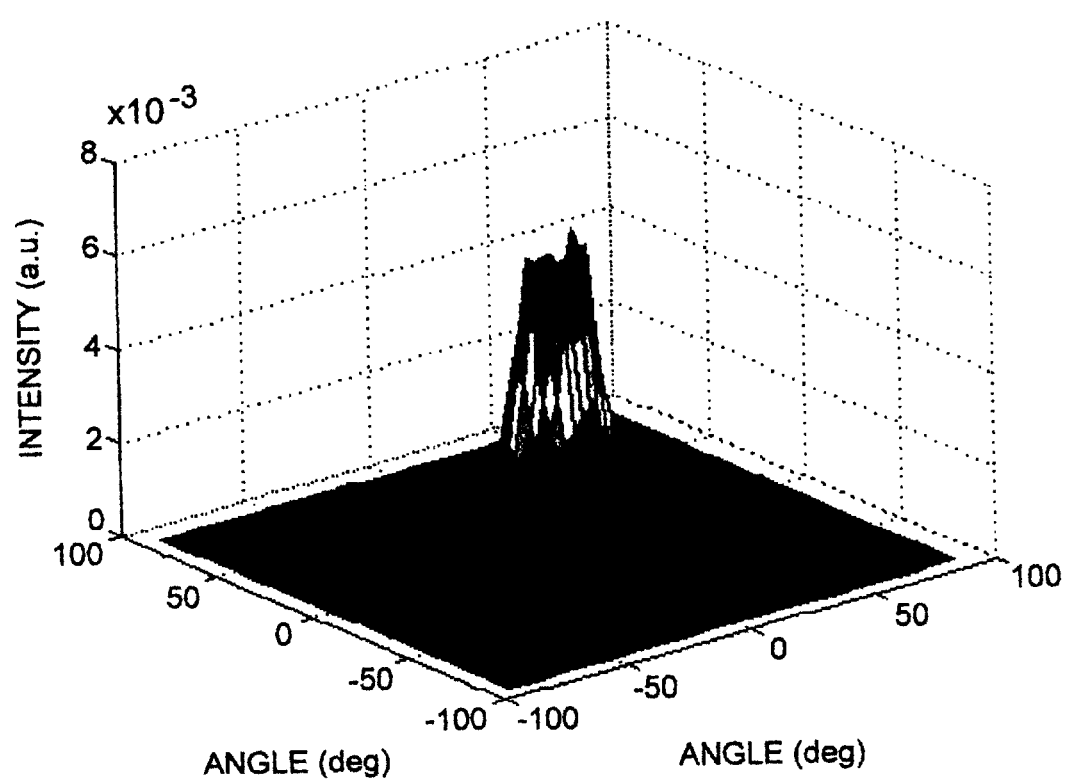

FIG. 44 shows a calculated three-dimensional scattering pattern obtained with the structured screen shown in FIG. 43.

Figure 45:
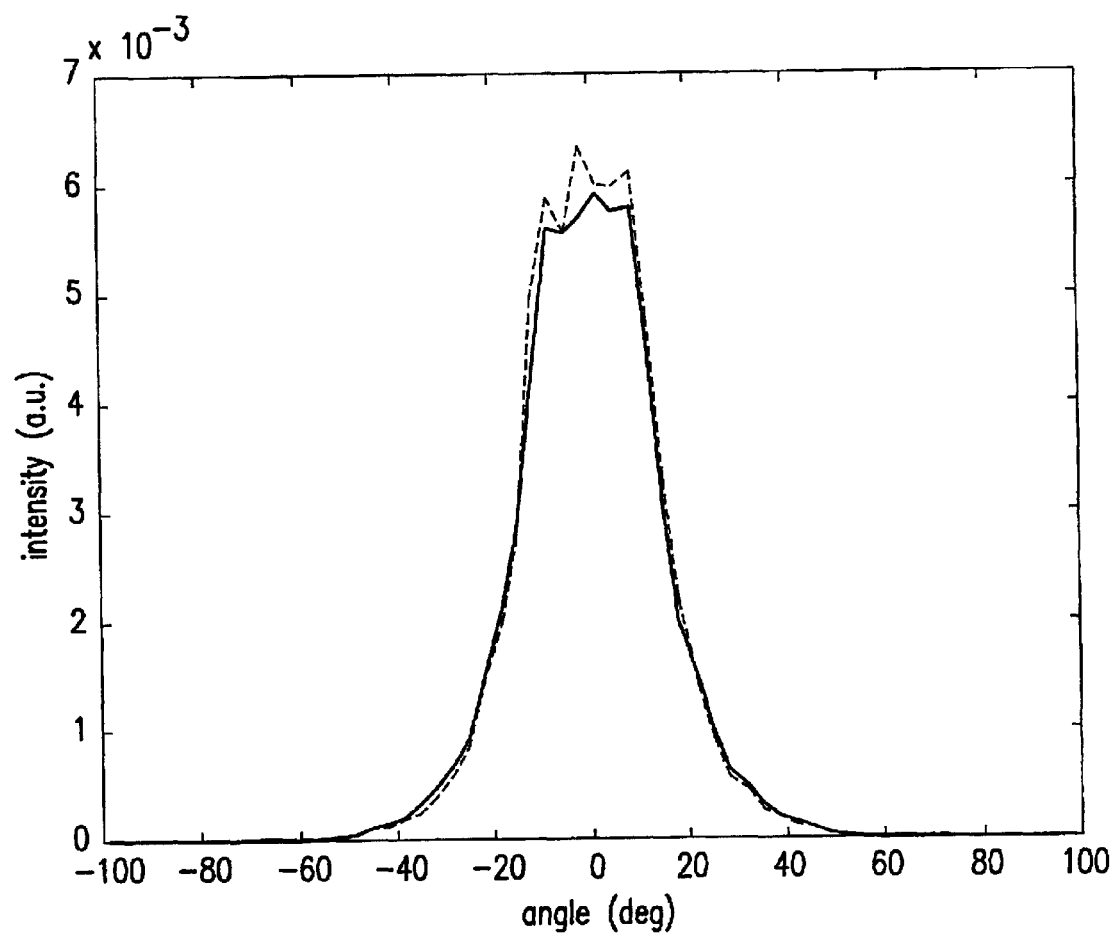

FIG. 45 shows cross-sections of the scattering pattern of FIG. 44 along two perpendicular directions.

Figure 46:
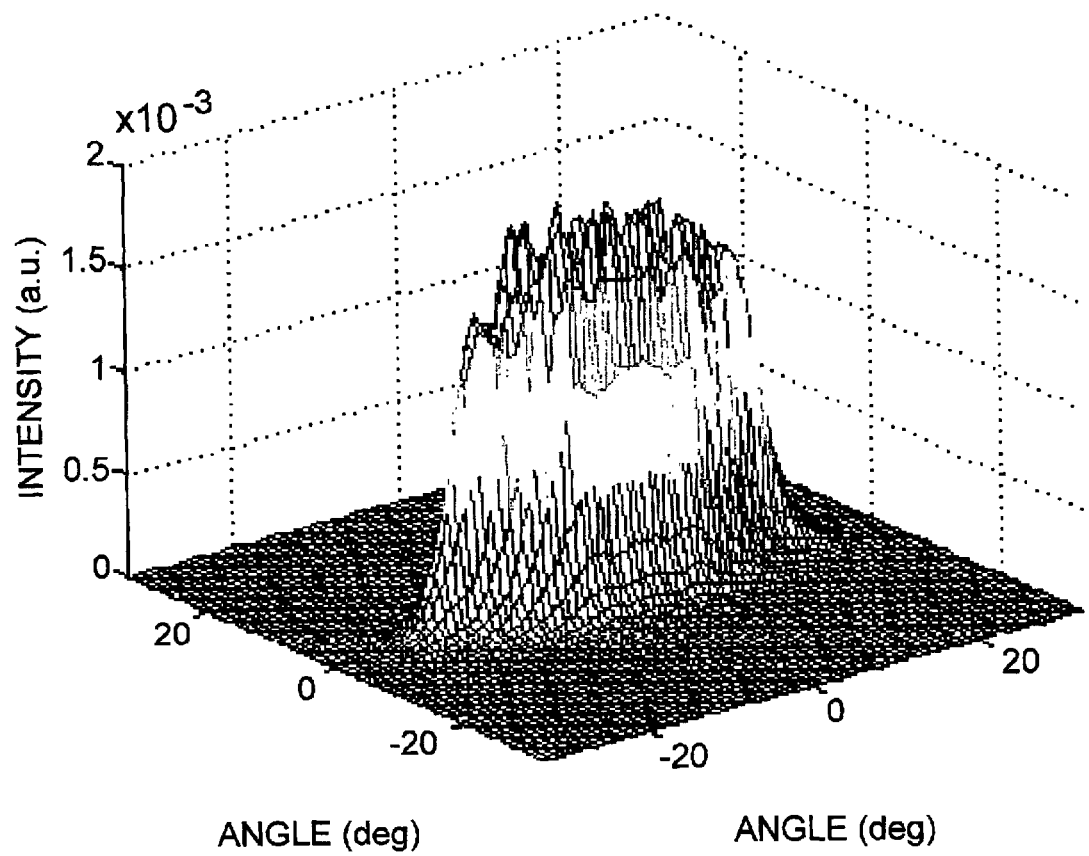

FIG. 46 is a calculated scattering pattern for a hexagonal display screen.

Figure 47:
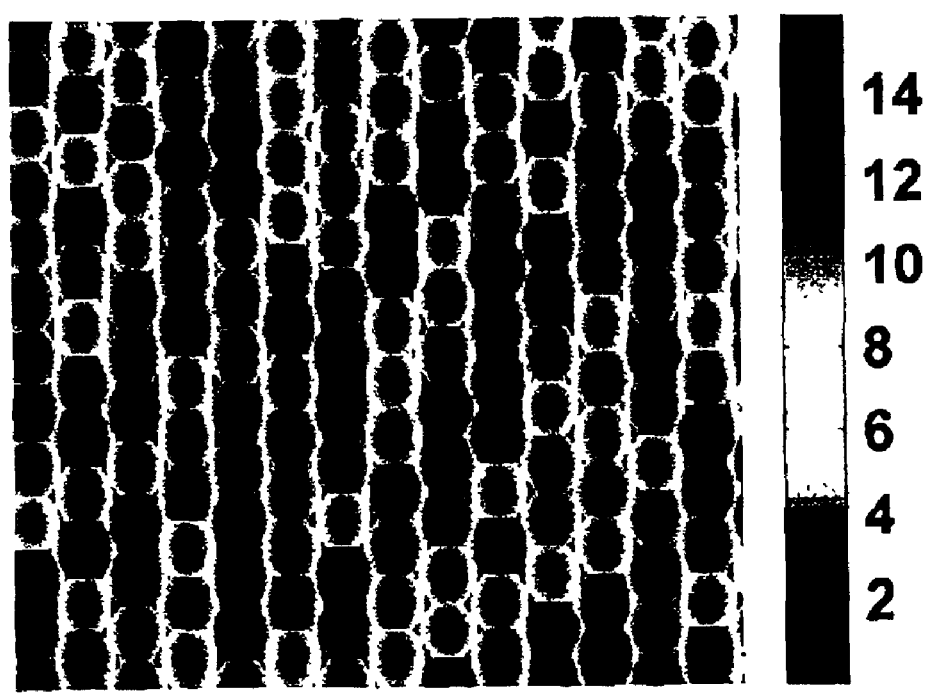

FIG. 47 shows a hexagonal array of anamorphic microlenses (average diameter 50 μm). The bar indicates microlens depth.

Figure 48:
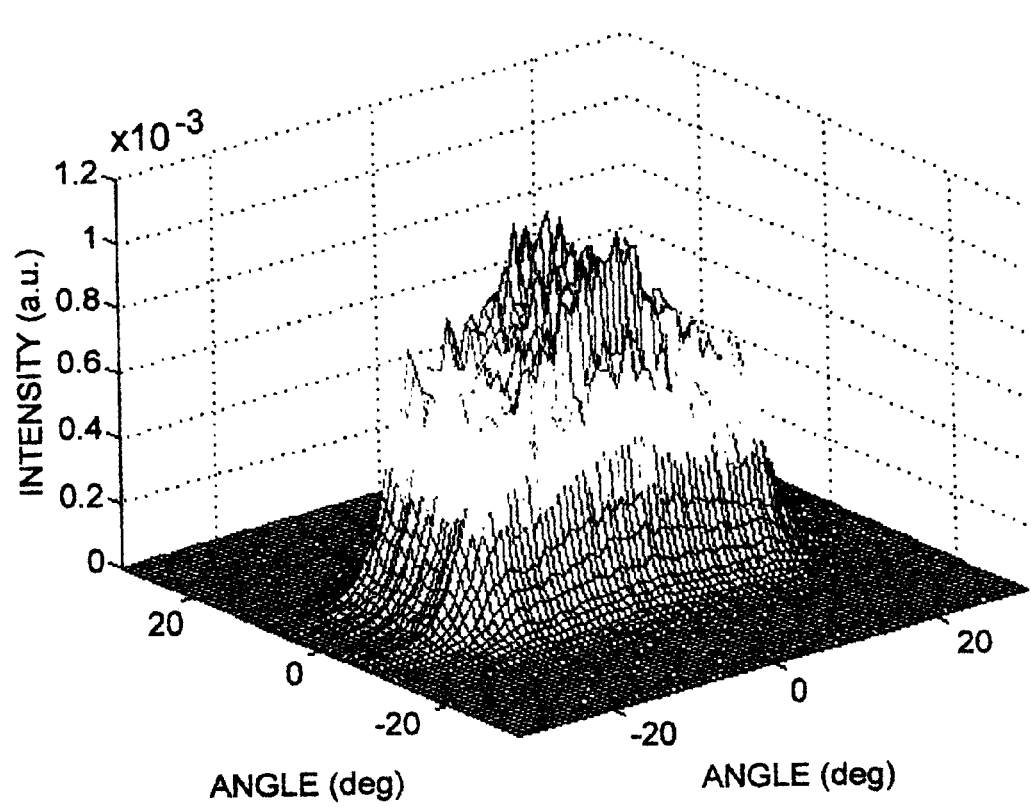

FIG. 48 shows a calculated scattering pattern for an anamorphic mosaic array.

Figure 49:
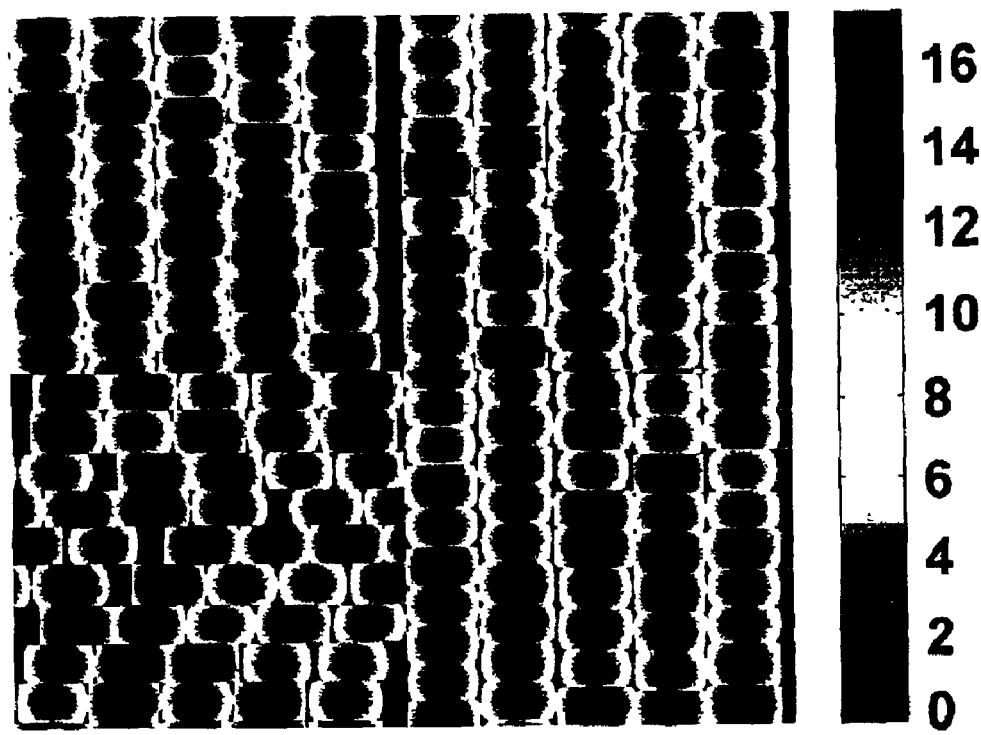

FIG. 49 shows a mosaic array of anamorphic microlenses. The bar indicates microlens depth.

V. DETAILED DESCRIPTION OF THE INVENTION

A. Diffraction Equation The structured screens of the invention are designed using diffraction equations appropriate to the conditions under which the finished screen is to be used (near field, far field, with or without focusing lenses, etc.).

For illustration purposes consider a structured screen which is to operate in the far field under illumination of wavelength $\lambda$. The field f at a point (u,v) at the observation plane is given by the Fourier transform of the surface-relief structure or shape of the structured screen s(x,y), given by (*Introduction to Fourier Optics*, J. W. Goodman, McGraw-Hill Publishing Company, New York, 1968)

$$f(u, v) = \frac{\exp(ikz)}{i\lambda z} \int_{-\infty}^{\infty} \int_{-\infty}^{\infty} \exp\left[ik[n(\lambda) - 1]s(x, y) - i\frac{2\pi}{\lambda z}(xu + yv)\right] dx\, dy, \quad (1)$$

where $k = 2\pi/\lambda$ defines the magnitude of the wavevector and $n(\lambda)$ gives the index of refraction at wavelength $\lambda$. The coordinates (x,y) define a point in the plane of the screen.

The integral over the whole surface can be broken into integrals over N cells $D_j$, j=1, ..., N, that completely cover the substrate surface. In its most general form, the shape of a microstructure contained in each cell is expressed as a local surface shape $s_j$, j=1, ..., N, where in general $s_p \neq s_q$, for p≠q. The field f can now be written as $$f(u, v) = \frac{\exp(ikz)}{i\lambda z} \sum_j \int_{D_j} \int \exp\left[ik[n(\lambda) - 1]s_j(x, y) - i\frac{2\pi}{\lambda z}(xu + yv)\right] dx\, dy. \quad (2)$$

The above expression illustrates the significant elements involved in the design of the structured screens of the invention. The first element is the shape of individual elements $s_j(x,y)$. The second is the cell $D_j$, where the individual element is contained. The prior art has had limited control over the elementary functions $s_j(x,y)$ except to guarantee some amount of focusing power, and the cells have usually been square or hexagonal.

The present invention improves upon previous approaches by (i) allowing exact definition of the shape $s_j(x,y)$ to, for example, a sub-micron accuracy; (ii) allowing precise definition of the spatial localization of the domain of each cell $D_j$ relative to any other cell; and (iii) allowing precise definition of the cell shape $D_j$, not limited to only square or hexagonal arrays, but assuming any contour necessary to implement the desired spreading pattern.

B. Surface Definition (1) Microstructures Per Se

The surface-relief pattern on any one side or on both sides of the structured screen is responsible for the spreading of the incident illumination. This pattern achieves the goal of shaping the diffused illumination by a specified arrangement and choice of elementary units, which are generally different from each other and are displaced at specific distances from each other, according to the requirements of the desired beam shaping.

In a general form, the shape of each elementary unit can be defined in terms of segments characterized by piecewise functions. The general shape can assume either a continuous or discontinuous form and can also impart focusing power to the incident illumination. The particular shape of each individual element is of fundamental importance in shaping the diffused light. Thus, in accordance with the invention, the elementary shape is precisely control to tailor the diffusion profile.

Figure 1:
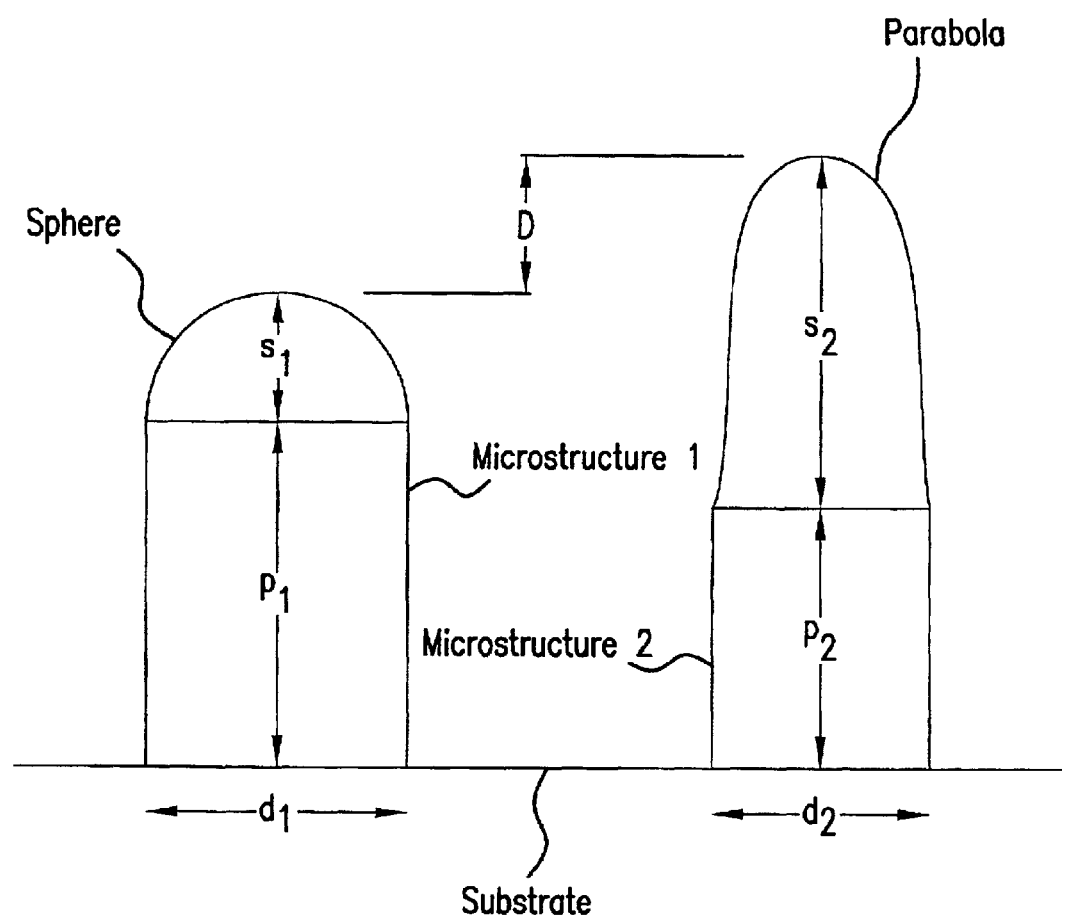
Figure 2:
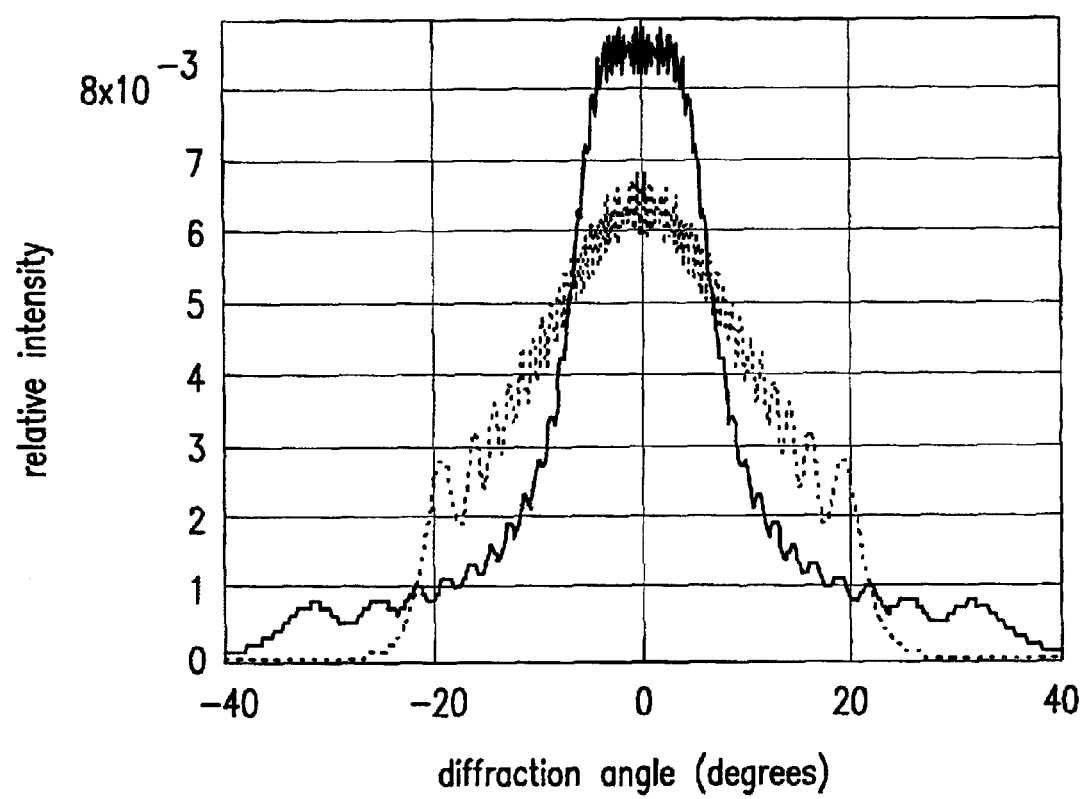

As an illustration, FIG. 2 shows diffusion patterns for of two regular arrays of identical relief depth but with the shape of each elementary unit in one array being different from the shape of each unit in the other array. In both cases the total relief depth is the same. The difference in the patterns is evident in this figure.

Figure 3:
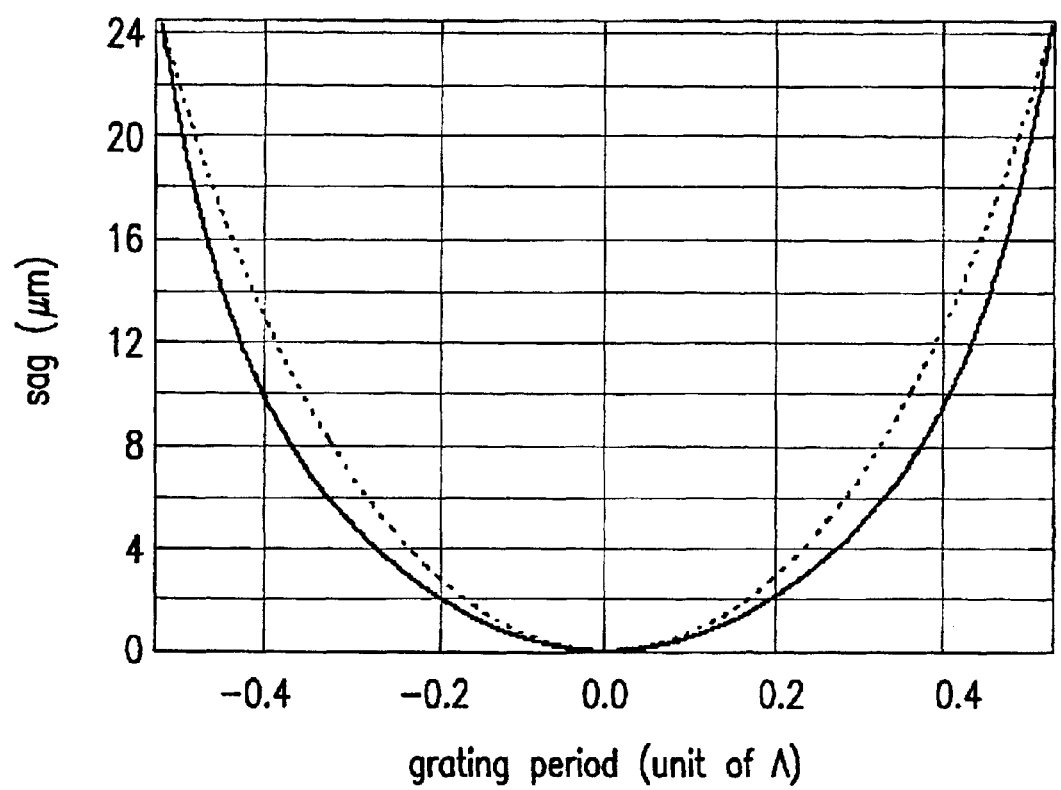
FIG. 3 is a comparison of the elementary units of the arrays used to calculate the diffraction patterns shown in FIG. 1. The solid line refers to the aspherical surface with nonzero conic while the dashed line refers to the spherical surface.
Figure 4:
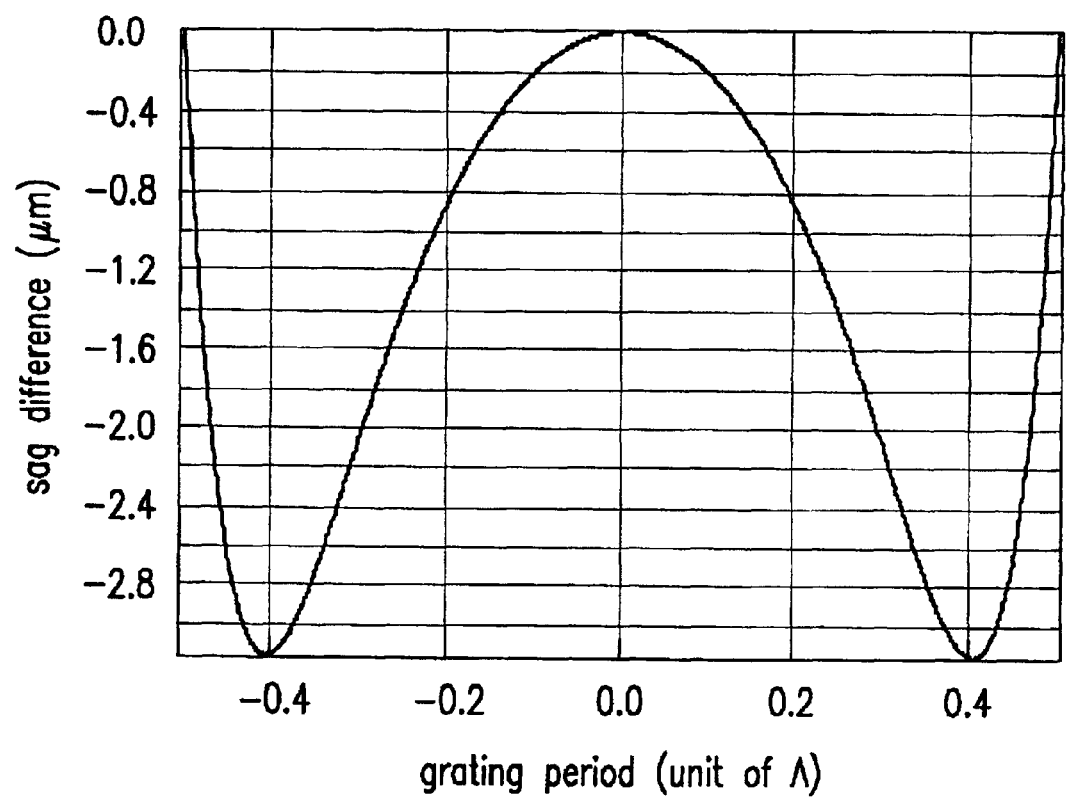
FIG. 4 shows the difference between the spherical and aspherical profile necessary to generate the diffraction pattern shown in FIG. 1.

A comparison between the profiles of each individual shape for the two arrays is shown in FIG. 3, while the difference between the two profiles is shown in FIG. 4. Note that to achieve the kind of diffusion control illustrated by the two curves of FIG. 2, it is necessary to ensure microstructure relief control on the order of, for example, a few microns.

To further emphasize the importance of the shape of the elementary units, we note from grating theory that, while the grating period and wavelength determines the divergence angles of diffracted orders, the grating profile determines the distribution of power among orders. For example, a triangular blazed grating can be designed for 100% theoretical efficiency at a single order. On the other hand, custom shapes can be obtained that spread the incident illumination over many orders. Such control of the light spread is only possible with proper choice of the elementary shape of the grating.

As discussed above, the prior art commonly relies on elementary units of spherical shape to accomplish light diffusion. The spherical shape can be expressed according to the following equation $$s(x, y) = \frac{1}{c} - \sqrt{\frac{1}{c^2} - [(x - x_c)^2 + (y - y_c)^2]}, \quad (3)$$

where c denotes the curvature of the surface and $(x_c, y_c)$ is the center point. As can be seen in this equation, the only degree of freedom available to control the diffusion is the curvature or the focusing power.

To introduce additional degrees of freedom and to allow for a wider class of surfaces, the surface shape can be written as follows:

$$s(x, y) = \frac{c[(x - x_c)^2 + (y - y_c)^2]}{1 + \sqrt{1 - (\kappa + 1)c^2[(x - x_c)^2 + (y - y_c)^2]}} + \sum_p A_p[(x - x_c)^2 + (y - y_c)^2]^{p/2}, \quad (4)$$

where one finds the conic constant $\kappa$ and the aspheric terms $\{A_p\}$ as new degrees of freedom, as compared to Eq. (3). The spherical shape is obtained in the particular case of $\kappa = 0$ and $A_p = 0$, for all p. With more degrees of freedom, it becomes possible to control the diffusion pattern better so as to satisfy specific system requirements.

Although Eq. (4) allows a wide variety of shapes to be implemented, it is limited to conic surfaces with aspheric corrections. However, in accordance with the invention, any surface that can be defined by a mathematical relation can be implemented, including mathematical relations based on algorithmic processes. In general, the surface can be specified as a piecewise function over the boundary of the microstructure such that within each interval the surface can be expanded in a power series of the form:

$$s(x, y) = \sum_{p=1}^{\infty} B_p(x - x_c)^p + C_p(y - y_c)^p, \quad (5)$$

where $(x_c, y_c)$ is the center point and $s(x,y)$ is defined over a limited area of the microstructure. The total function over the complete area of the microstructure would then be defined in a piecewise manner.

In addition to the foregoing, the present invention also allows the profile of each micro structure to vary across all or part of an array with each microstructure still being controlled to, for example, sub-micron accuracy. In this way it is possible to homogenize the diffused light and avoid the visual artifacts caused by a periodic array.

The implementation of regular arrays has some advantages from a fabrication point of view but the performance of the screen may not be satisfactory due to the introduction of image artifacts such as high-frequency intensity variations. Furthermore, the control of light diffusion is limited because an array in general will not meet all types of system criteria. In some broadband applications, regular arrays may be acceptable because the smoothing by spectral dispersion helps to minimize the image artifacts due to the grating structure.

Figure 5:
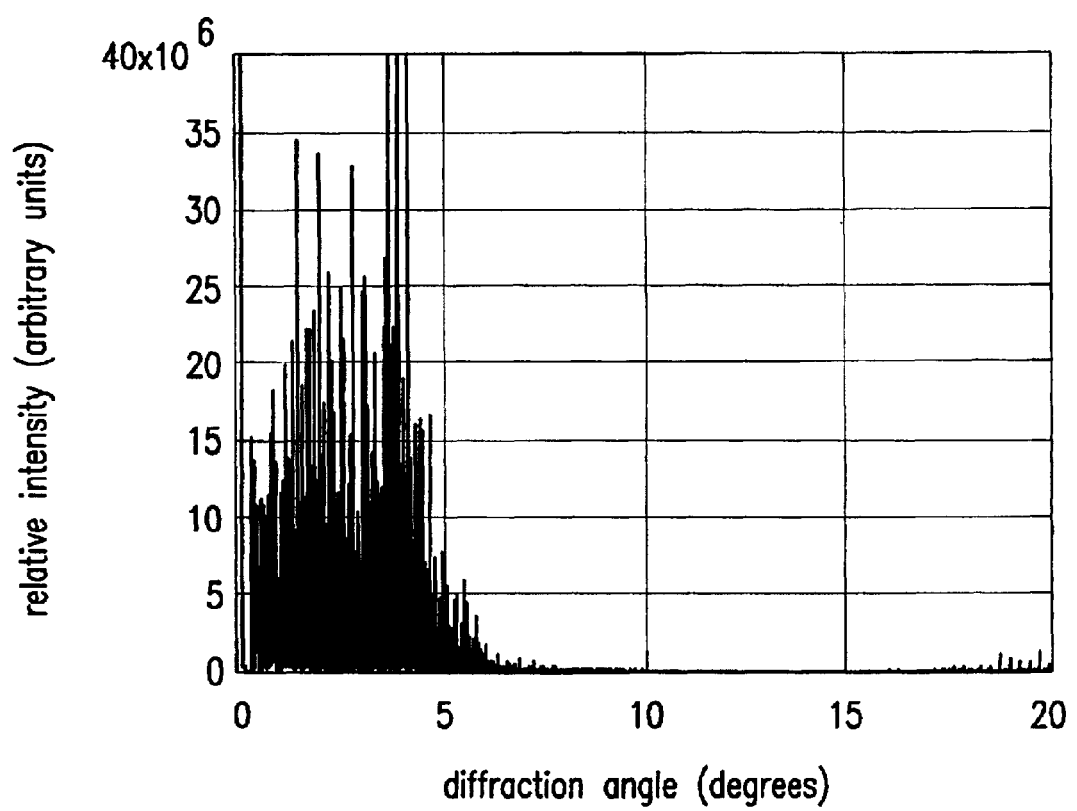
FIG. 5 is a calculated diffusion pattern for a regular array of parabolic units.

The behavior of a regular array is shown in FIG. 5 for parabolic microlenses of diameter equal to 100 µm and depth 5 µm. The incident illumination belongs to the 400–700 nm spectral band. One observes that although diffusion is accomplished, high-frequency intensity variations are present and higher-order components are noticeable.

Figure 6:
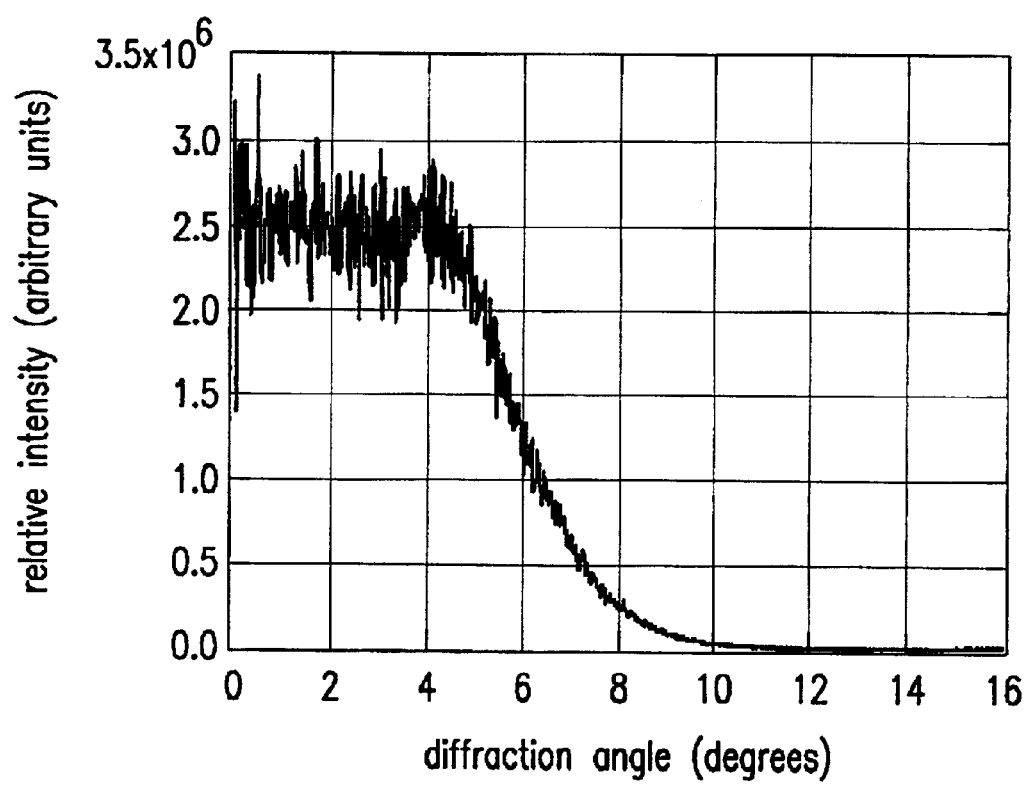
FIG. 6 is a calculated diffusion pattern for a random array of parabolic units with variable depth and constant pitch.

FIG. 6 shows the diffusion obtained by a regular parabolic array of diameter 100 µm but with depth randomly chosen in the range 5–10 µm, averaged over several statistically identical screen configurations. The intensity diffusion can be well-described by a fourth-order supergaussian with an angular spread of about 7.7 degrees measured at the $1/e^2$ intensity point. The randomization avoids the high-frequency structure as well as high order diffraction angles. Note that these calculations assume a spatially coherent beam incident on the aperture. In practice, partial coherence effects would further reduce the intensity fluctuations.

Figure 7:
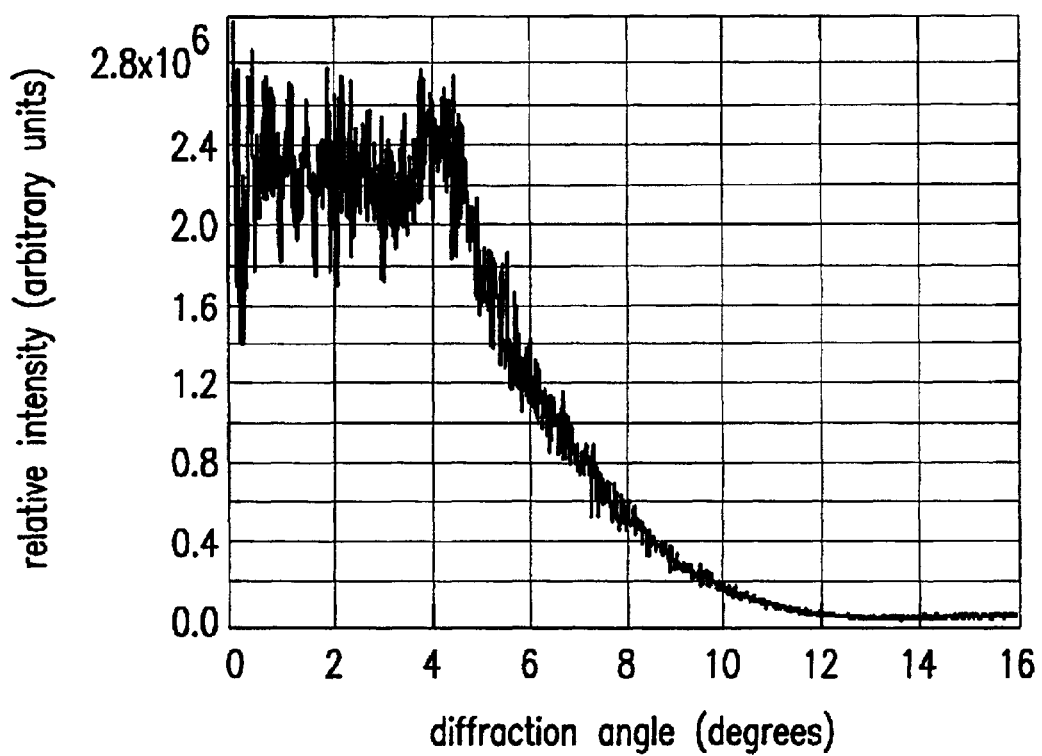
FIG. 7 is a calculated diffusion pattern for a random array of parabolic units with variable depth and variable pitch.

FIG. 7 shows another diffusion pattern of parabolic units with random depth in the range 5–10 µm and with the diameter sizes of each unit randomly chosen with a variation in the range ±20% with respect to the nominal diameter of 100 µm. The main difference with respect to the pattern of FIG. 6 is the elongated tail of Lorentzian shape.

Control of the diffusion process depends on the particular way microstructures differ from each other. In general, this variability can be expressed in terms of a probability distribution function (PDF) for a particular parameter(s) of choice. For instance, if the array presents microlens structures with random radii of curvature, then there exists a PDF that defines how the radius of curvature varies across the array. Similarly, the PDF might refer to a conic constant, the depth of a given microstructure, the location of a given microstructure, the size of a given microstructure, any combination of these parameters, or any other relevant parameters or combinations thereof.

In all cases, the PDF can be arbitrarily defined and an array can be accordingly built. The exact correspondence between the actual array and the PDF that describes it requires that each elementary microstructure be fabricated with, for example, sub-micron accuracy. Methods for specifying a PDF depend largely on the desired properties of the diffusion pattern but can be of either a deterministic or statistical nature.

Figure 8:
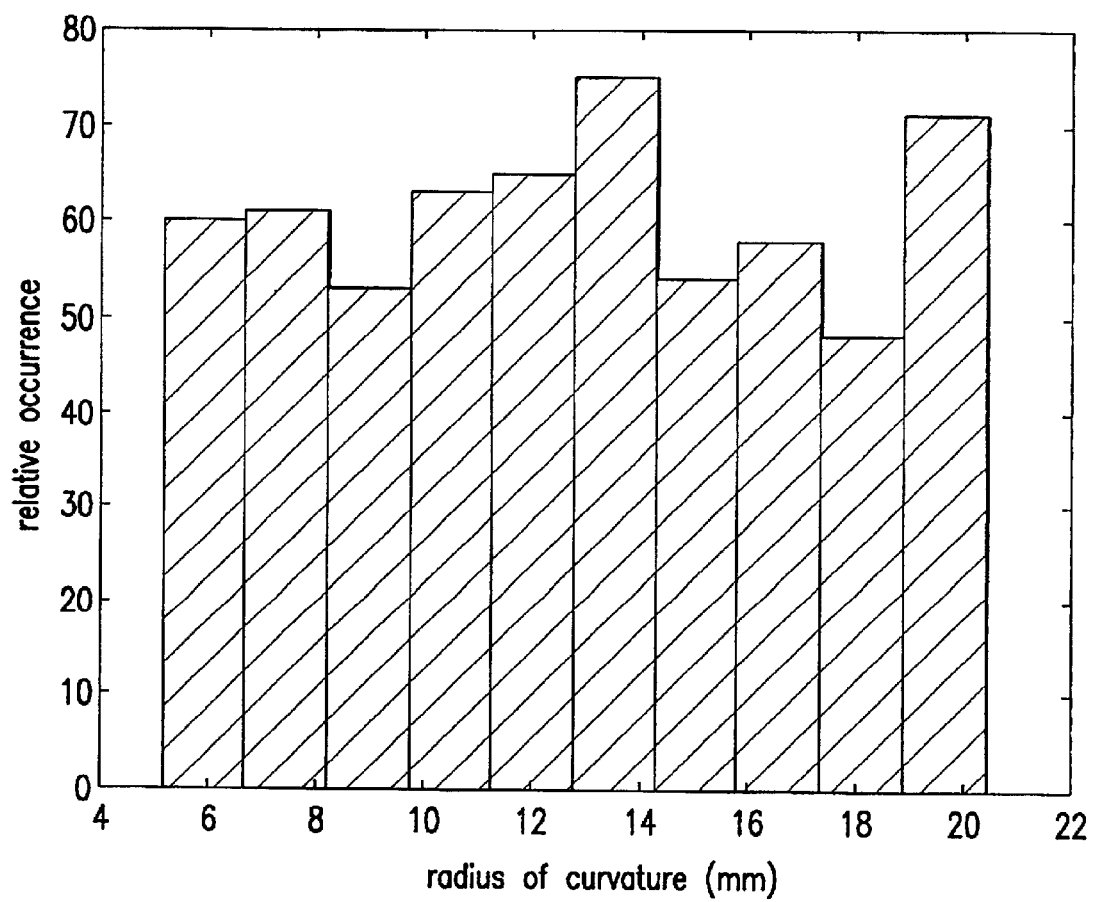
FIG. 8 is a histogram of radii of curvature for a single realization of a random microlens array having a uniform probability density function for radius of curvature.
Figure 9:
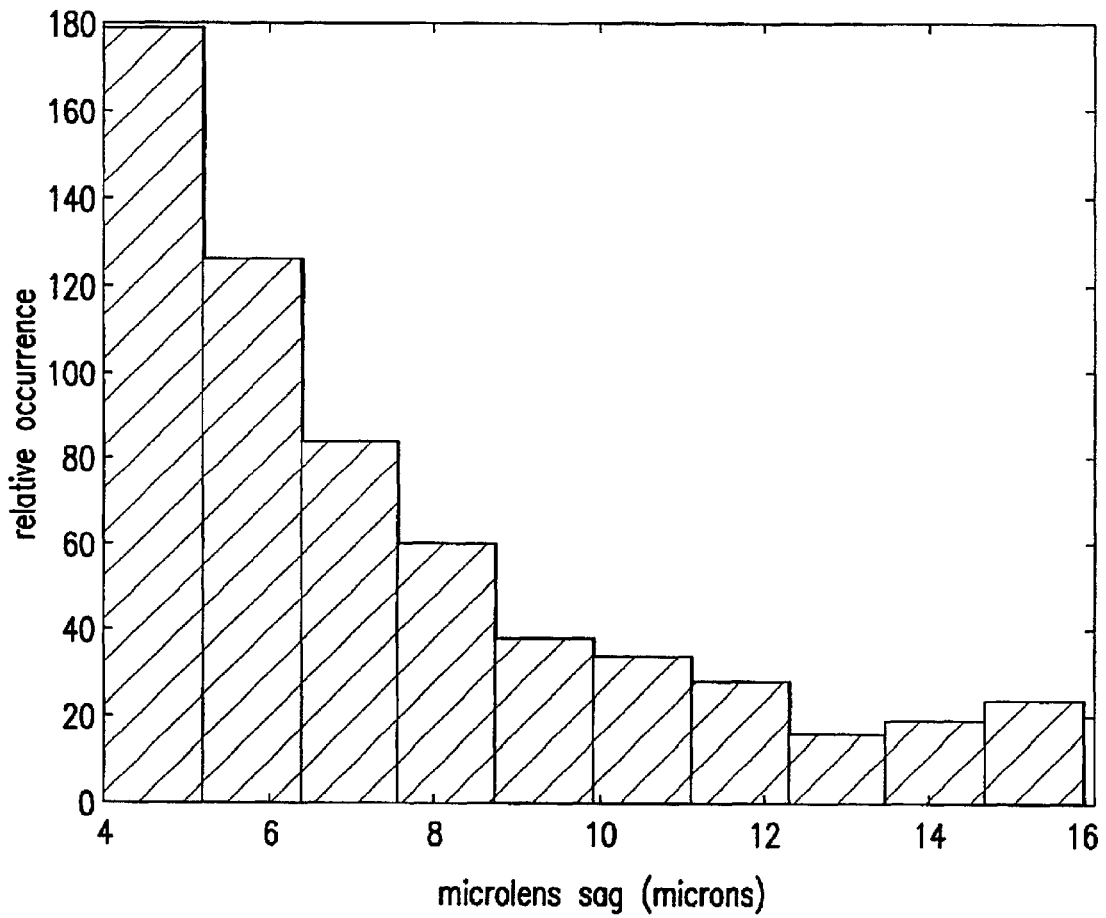
FIG. 9 is a histogram of depth for a single realization of a random microlens array having a uniform probability density function for radius of curvature.
Figure 10:
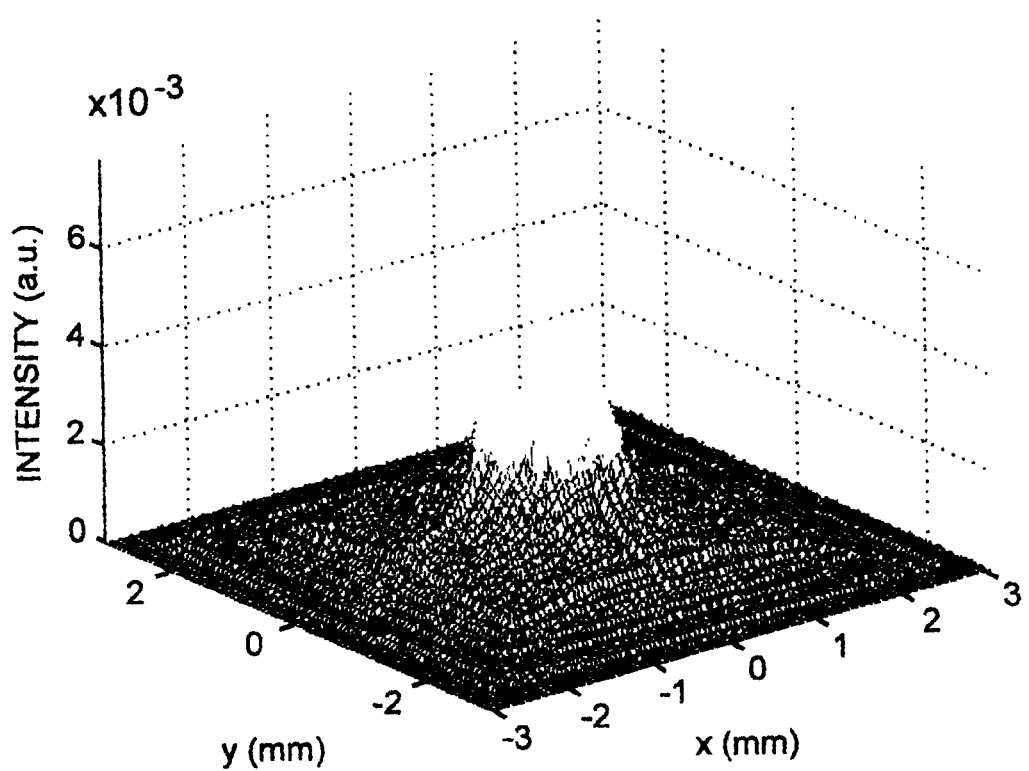
FIG. 10 is a calculated three-dimensional scattering pattern due to a random microlens array with a hexagonal unit cell structure. The probability density function is uniform for radius of curvature.

To illustrate the effect of the particular choice of a PDF consider a two-dimensional array of spherical microlenses with a hexagonal arrangement. Each microlens has an external circumference whose diameter is 750 µm and a total sag in the range 4–16 µm. First consider the case where the PDF is uniform in radius of curvature. For a given realization of the array, the histograms of radii and microlens sag are shown in FIGS. 8 and 9, respectively. The corresponding diffusion pattern is shown in FIG. 10.

Figure 11:
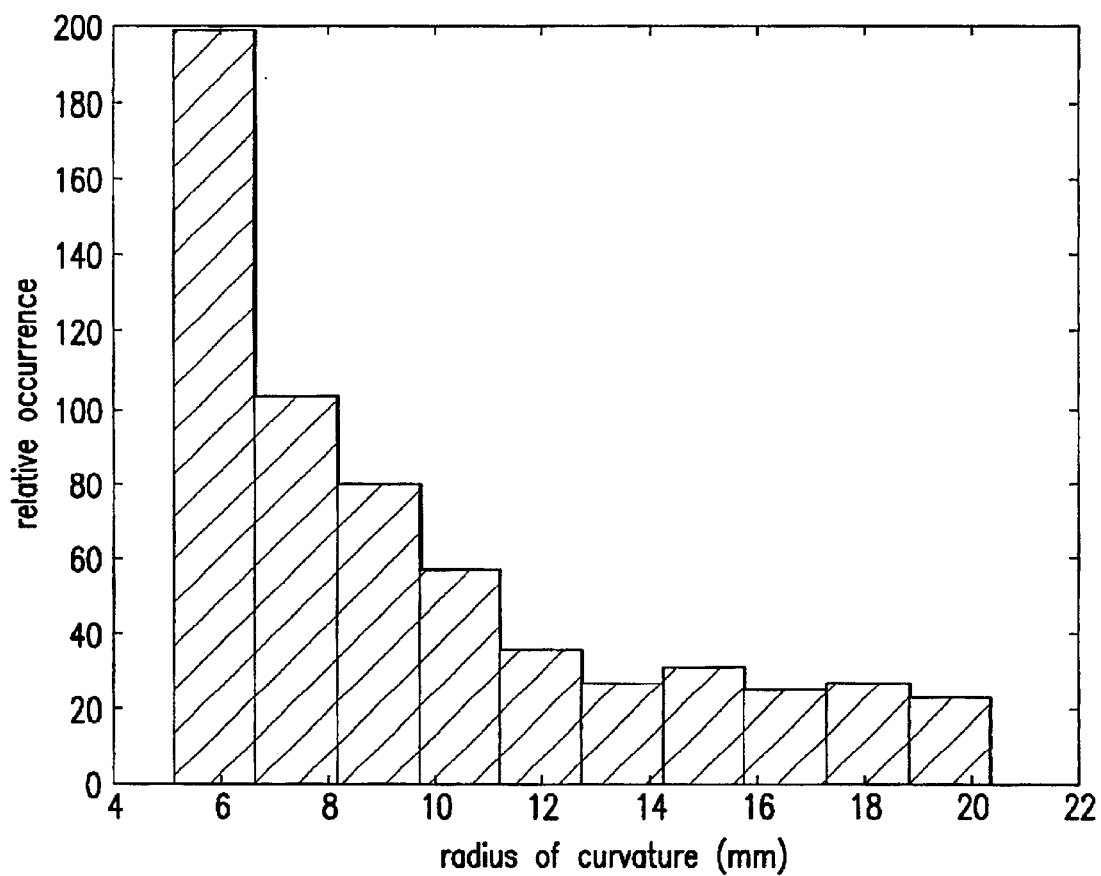
FIG. 11 is a histogram of radii of curvature for a single realization of a random microlens array with a uniform probability density function for microlens depth.
Figure 12:
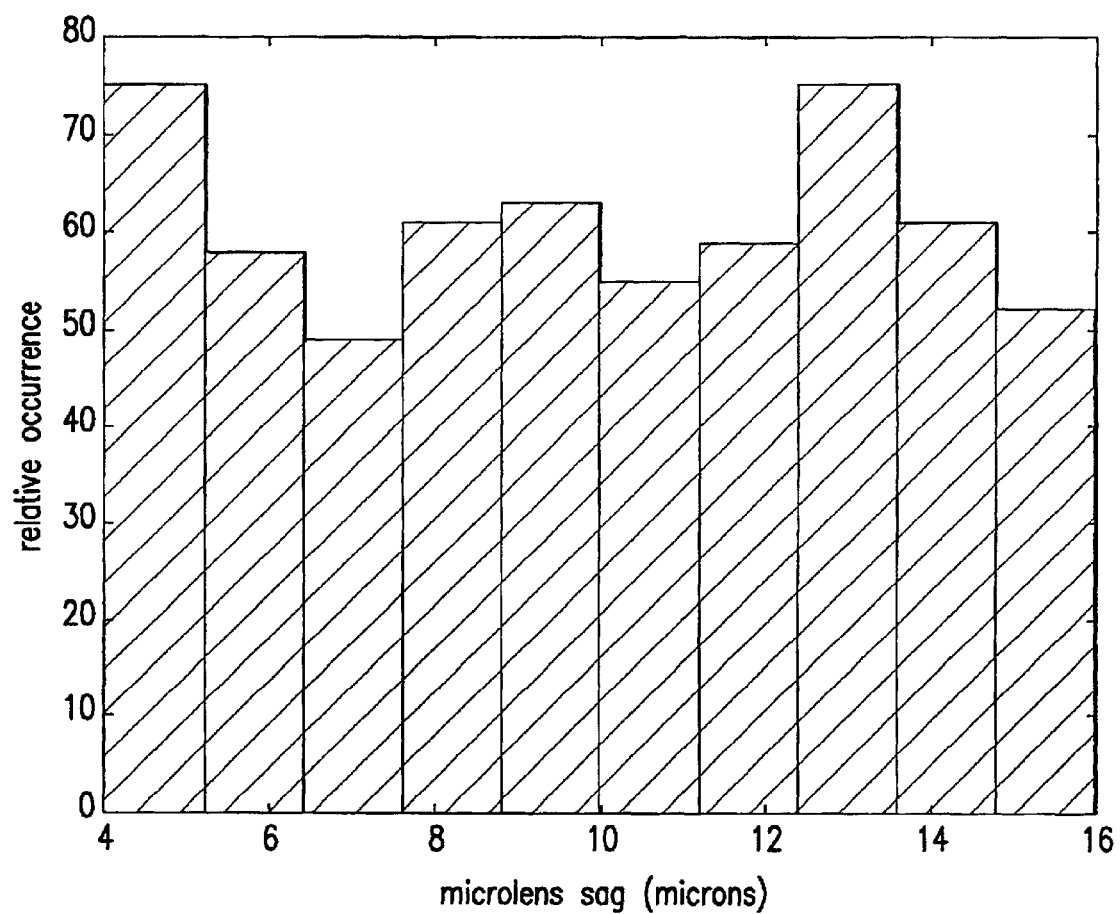
FIG. 12 is a histogram of depth for a single realization of a random microlens array with a uniform probability density function for microlens depth.
Figure 13:
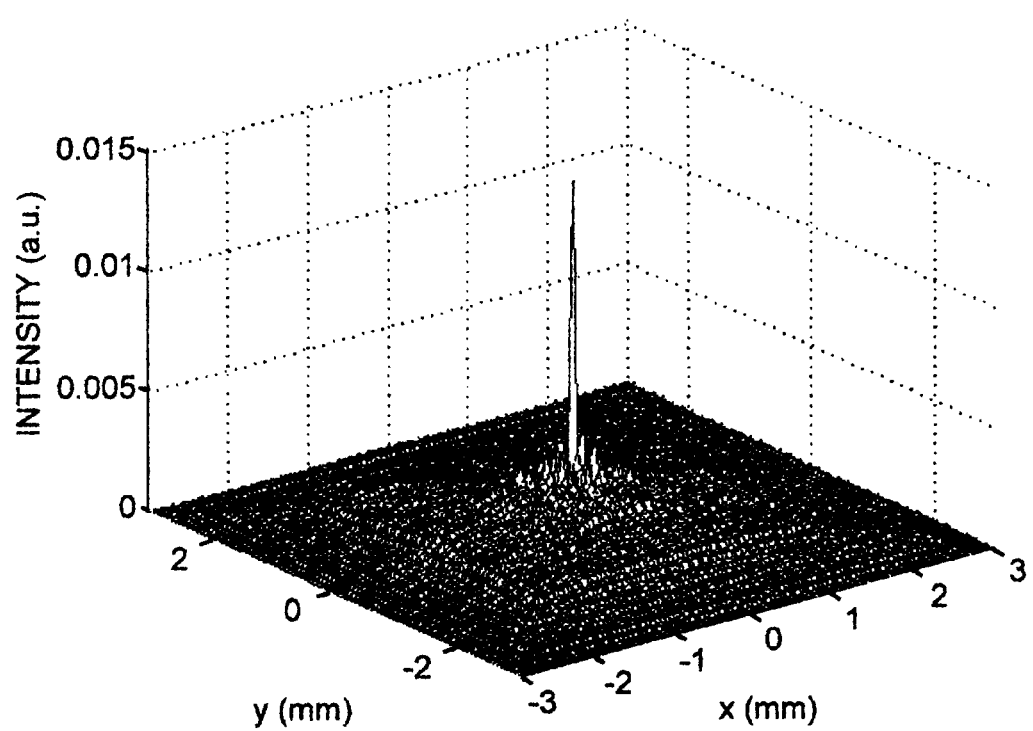
FIG. 13 is a calculated three-dimensional scattering pattern due to a random microlens array with a hexagonal unit cell structure. The probability density function is uniform for microlens depth.

Now consider a random array with the same sag range but with a uniform PDF in sag instead of radius of curvature. For a given realization of the array, the histograms of radii and sag are shown in FIGS. 11 and 12, respectively. The corresponding diffusion pattern is shown in FIG. 13. The difference in the PDF for these two cases leads to fundamentally distinct arrays and the difference is reflected in the resulting diffusion, as can be readily seen by comparing FIG. 10 with FIG. 13.

(2) Distribution of Microstructures

As described above, an accurate description of the screen surface or surfaces requires two basic elements. The first element is the microstructure itself, which can be of any particular shape, as discussed immediately above. The second element is the relative spatial placement of the individual microstructures where each microstructure is spatially placed with respect to each other arbitrarily and with, for example, sub-micron accuracy. These two elements, together with the properties of the light that illuminates the screen, determine in a unique way the diffusive features of the screen. While the shape of each microstructure has a predominant effect over the functional properties of the diffusion, the spatial placement of microstructures determines the spatial symmetry, or lack thereof, of the diffusion.

To define precisely the spatial placement of the microstructures on the surfaces of the screen, we define two basic sets of coordinate systems in relation to the screen. The global coordinate system can be located arbitrarily with respect to the screen and defines a reference frame from which each microstructure can be localized with respect to some arbitrary reference point such as the vertex, tip, or any other element of the microstructure.

A local coordinate system is next associated with each microstructure. In the local reference frame the surface shape of the microstructure can be defined according to a function of the form $s(x - X_k, y - Y_k)$, where s denotes the functional form of the microstructure, (x,y) denotes a point in the local coordinate system, and $(X_k, Y_k)$ is the position of the $k^{th}$ local coordinate system with respect to the global reference frame where k runs from 1 to the total number of microstructures present on the screen. A schematic illustration of the two reference frames is shown in FIG. 14, where for simplicity, the two dimensional case is shown, it being understood that the general case is three dimensional.

In relation to the global coordinate system one may distinguish microstructure positioning along the surface of the screen or perpendicular to it. Along the surface, various realizations of this embodiment include regular periodic arrays, random arrays with the distance between neighbor microstructures varying as a function of position, microstructures with well-defined boundaries such as in a square or hexagonal array, microstructures with random boundaries where the size and shape of each microstructure varies as a function of position across the screen, or structures positioned on both surfaces of the screen.

Examples of possible arrangements are illustrated in FIGS. 15 through 21. For cases which include a random component, such component will be defined in terms of a probability density function (PDF).

In the direction perpendicular to the screen surface, there can be a vertical offset of each microstructure with respect to each other, also called piston. The presence of piston is relevant in the reduction of high-frequency intensity variations in the diffusion pattern (speckle), as well as in avoiding the presence of hot spots, which are isolated regions of the diffusion pattern that exhibit much higher intensity than the average of the whole pattern.

The amount of piston used in any particular application will depend on the characteristics of the illumination on the screen but, in general, should be equivalent to a few optical wavelengths of the illumination. Also, the magnitude of the piston component for neighbor microstructures will typically vary randomly according to a PDF, unless it is desirable to introduce some bias in the diffusion pattern.

FIG. 22 illustrates the effect of a vertical offset on a diffraction pattern for an elementary unit having a triangular shape. For a regular array having a grating period of 200 μm and a depth of 5 μm, light of wavelength 0.5 μm is focused at a diffracted order centered at the angular distance of −0.14 degrees with an angular divergence of 0.006 degrees. The corresponding diffraction pattern is shown in FIG. 22 by the dashed curve. The solid curve, on the other hand, is the result of an ensemble average over statistically identical arrays of triangular units with a maximum offset (piston) of 2 μm. The offset obeys a uniform probability distribution function.

The diffusion attained through the introduction of the offset is more that one order of magnitude. Note however that this level of diffusion is peculiar to the blazed grating that was analyzed. In general, the degree of diffusion is shape-dependent. However, as a general rule, the offset helps in the smoothing of the diffusion pattern, since it helps eliminate artifacts due to the periodic grating structure.

(3) Fresnel Function

In addition to their diffusion function, the distributed microstructures of the invention can be used in combination with or, indeed, can constitute a Fresnel lens, whose purpose is to collimate an otherwise divergent beam of light.

In the prior art, the use of a Fresnel lens is generally assumed and the general setup is as shown in FIG. 23. There has been some attempts to incorporate the Fresnel capability on one side of a substrate with the diffusive feature associated with the second surface as illustrated in FIG. 24. The screens of the present invention can be used with Fresnel lenses of the type shown in either of these figures.

However, these approaches require several processing steps to provide the final screen with both capabilities at different surfaces. According to the present invention, a reduction in such processing steps can be achieved by incorporating both a diffusing function and a Fresnel function on one screen surface.

As discussed above, in accordance with the invention, one is allowed precise control of each microstructure and its spatial localization in the frames of reference that define the structured screen. In addition to translations and piston as components of the spatial placement, one can also rotate individual elements. Significantly, such rotation allows one to achieve the function of a Fresnel lens.

In particular, as illustrated in FIG. 25, the function of a Fresnel lens in a structured screen simply requires rotation of individual microstructures having focusing power. As can be seen in this figure, the individual microlenses have optical axes which are not parallel to the optical axis of the overall screen. Although not explicitly shown in this figure, the optical axis of the screen is typically the optical axis of the screen's substrate. By orienting the microstructures in this way, the diffusive and Fresnel-collimation features can not only be integrated on a single substrate but on a single surface, thereby reducing the number of processing steps required to generate the screen and allowing large volume replication in a single step.

C. Fabrication

The ability to produce highly reproducible and accurate screen surfaces of the type described above requires a fabrication method that allows screens to be manufactured consistently and with point-by-point accuracy. Although other techniques can be used, the most suitable method for such a task is direct laser writing where a laser beam scans a properly prepared substrate with variable intensity.

In such a method, a substrate such as glass is covered with, for example, a low-contrast photosensitive polymer (photoresist) that is exposed and records in a latent image the exposure pattern defined by the laser beam. Typically, the photosensitive material is positive, in which case, when the substrate is developed, the exposed material is eliminated leaving a surface relief structure.

This surface relief structure basically defines the desired screen surface or, in some cases, its complement. See commonly assigned U.S. Patent Application No. 60/222,032 which was filed on Jul. 31, 2000 in the names of Geoffrey B. Gretton, G. Michael Morris, and Tasso R. M. Sales, and is entitled "Microlens Arrays Having High Focusing Efficiency," the contents of which in its entirety is incorporated herein by reference.

The surface relief structure obtained upon development of the photoresist may not be precisely the desired structure depending on specific performance characteristics of the fabrication process. That is, the fabrication process itself can introduce features that may be undesirable in the final product and need to be accounted for in using the process. For example, since a writing laser beam has a finite size, the final surface after development represents the profile defined by the laser exposure system convolved with the shape of the laser beam used. In some instances the presence of convolution may not be detrimental to the performance of the screen but in other cases it must be avoided. Of course, the performance requirements and operating conditions dictate the fabrication tolerances and limitations.

The surface relief profile left on the surface of the substrate can serve as a master mold that can be used to obtain a large number of replicas according to several possible techniques including casting on a UV-curable material, injection or compression molding, and reactive ion etching into a substrate.

A particularly preferred technique for forming the structured screens of the present invention is described in commonly assigned U.S. patent application Ser. No. 09/094,340, filed Jun. 9, 1998, and entitled "Method for Making Optical Micro-Structures Which Can Have Profile Heights Exceeding 15 Microns," which was published on Dec. 16, 1999 as PCT Patent Publication No. WO 99/64929, the contents of which in their entireties are incorporated herein by reference. Using these techniques, microstructure shape accuracy and location to within, for example, fractions of a micron can be achieved. Moreover, by using these techniques to produce durable tools, the structured screens of the present invention can be produced inexpensively and in large volumes.

VI. EXAMPLES

The following, non-limiting, examples illustrate the design of structured screens using the techniques discussed above. In each example, the features of the screen surface or surfaces are controlled with enough precision at each individual location so as to allow the accurate shaping (control) of the light spreading (scattering) pattern in the far field, which is the typical location for an observer. In particular, since the scattering surface is known in detail, it is possible to reliably model its optical behavior using diffraction equations and thus determine the expected performance of the screen as well as the tolerances involved in fabricating the screen.

As discussed above, to properly tailor the scattering pattern one needs to make use of several degrees of freedom, which can be basically separated into local and global components. The screen itself is composed of microelements (microstructures) that act collectively to generate the desired scattering. Each microstructure can be defined by a set of parameters. These are the local components. For example, in the case of microlenses, the local parameters could be radii of curvature, conic constants, diameters, and so on. The global parameters define the laws that must be obeyed by the local parameters (such as probability distribution functions) and the spatial location of each microstructure with respect to each other.

As also discussed above, to define the spatial arrangement and positioning of the microstructures, one can employ a conveniently placed coordinate system that defines the center of each microstructure and a global origin. Global components are defined with respect to this coordinate system. At the origin of each microstructure one can also associate a local coordinate system that provides the reference necessary to mathematically define the microstructure. It is through the use of local and global components that one can shape to a virtually unlimited degree the scattering pattern produced by the screen.

The examples which follow illustrate the effects of various global and local parameters on the scattering pattern of a screen. In particular, Example 1 illustrates the importance of local degrees of freedom in the shape of the scattering pattern, Examples 2 and 3 deal with vertical offset and the general spatial placement of microstructures on the screen surface or surfaces, respectively, and Example 4 addresses randomization of screen parameters. Finally, Examples 5 and 6 present illustrative applications of the invention to the production of diffusing and display screens.

Prescriptions for the structured screens of the various examples, with reference to the figures to which the prescriptions correspond, are set forth the Screen Design Table which appears at the end of the examples.

Example 1

Effect of Microstructure Shape

This example illustrates the importance of the shape of each microstructure in tailoring the light spreading pattern.

Initially we consider a regular array of identical microstructures with a shape that can be expressed as function of one or more parameters, some of which are random variables. For instance, a microstructure of spherical shape has a sag function that is given by $R-(R^2-r^2)^{1/2}$, where R denotes the radius of curvature and r denotes the radial position from the origin. According to this definition, the array consists of spherical microlenses with possibly variable radii of curvature. The size of each microstructure is identical throughout the screen surface, so that the presence of randomness is confined to a particular parameter, namely, the radii of curvature of the spherical microlenses.

Consider initially a screen made of silicon to operate in the infrared in a wavelength range from 2 to 4 microns. FIG. 26 shows the far-field scattering profile for an array of spherical microlenses of diameter 100 microns. The microlens sag is fixed at 10 microns.

If we now replace the spherical microlenses by another microstructure of a distinctively different shape, triangular for instance, the scattering pattern shown in FIG. 27 is found. Note that each microstructure is an isosceles triangle of base 100 microns and depth 10 microns, i.e., the basic dimensions are the same as for the spherical array. Since the array is more akin to a triangular grating one observes the two separated intensity peaks corresponding to the two main diffraction orders.

As a further example, consider a hyperbolic profile with radius of curvature R=120 microns and conic constant κ=−2. With these parameters the microlens sag is again 10 microns for a diameter of 100 microns. As shown in FIG. 28, although the general scattering profile is similar to that observed with spherical microlenses (see FIG. 26), one notes the increased peak intensity at the extremes of the pattern.

The effect of microstructure shape illustrated in FIG. 26 to FIG. 28 can be even more dramatic as the numerical aperture increases.

As a further example of the effect of microstructure shape, consider a screen in acrylic designed to operate between 400 nm and 700 nm. The screen is composed of a regular array of spherical microlenses of diameter 50 microns. FIG. 29 and FIG. 30 illustrate the scattering profile for such an array for two microlens depths, namely, 12 microns in FIG. 29 and 20 microns in FIG. 30. As can be seen in these figures, microlens depth provides another parameter for shaping the scattering pattern of a screen.

The case of a parabolic microlens shape with 20 microns total sag (total depth) is shown in FIG. 31. The parabolic profile allows the generation of scattering profiles of considerable flatness (and, as a result, high gain) in comparison with spherical or any other profiles. In the low sag limit there is little distinction between spherical and parabolic profiles and the scattering is virtually identical. However, as the microlens sag increases the difference between these two profiles becomes no longer negligible and this reflects directly on the scattering.

The important lesson to be learned here is that the shape of the microstructure can be used to control the shape of the scattering profile. We have presented some examples that show the variability of the scattering as a function of the shape used. It is possible to take the inverse path and define some scattering pattern of interest and, by means of optimization algorithms, calculate the sag profile that best approximates the desired scattering pattern.

As a final note we mention that, while the above examples have been confined to regular arrays, it is generally desirable to consider random arrays to avoid effects due to the periodicity of the array. With randomization, large intensity fluctuations tend to be minimized in the scattering pattern. Furthermore, it tends to eliminate undesirable visual effects such as aliasing or moiré fringes due to the superposition of two locally periodic patterns. Randomization, however, does not significantly alter the basic shape observed with the regular array. It just makes it more homogeneous and robust.

Example 2

Effect of Vertical Offset

As illustrated in Example 1, the microstructure profile basically determines the shape and the divergence span of the scattering pattern. Randomizing the profile helps reduce the high-frequency oscillations and attain a smoother pattern. Depending on the spectral band of operation, hot spots may occur that are detrimental to the performance of the screen (see, for example, FIG. 26).

An important element useful in homogenizing the scattering pattern and providing a further parameter to help decrease the influence of hot spots is the vertical offset or piston of the microlens. Its effect is basically to displace a microlens along its axis of symmetry by a definite quantity. The net result is that the relative position of the vertex or origin of a microstructure varies as a function of its position on the screen.

To illustrate the effect, we again consider the array used to generate FIG. 26, that is, spherical microlenses of diameter 100 microns and sag 10 microns. Cross-sections of the screen profile without and with piston are shown in FIG. 32 and FIG. 33, respectively. The effect of the offset on the scattering pattern is shown in FIG. 34 which should be compared with the pattern of FIG. 26. The disappearance of the central hot spot is evident in FIG. 34.

As a illustration of the homogenizing effect of a vertical offset, consider the same array of spherical microlenses shown in FIG. 33, but now operating in the visible, between 400 nm and 700 nm, instead of the infrared range. The scattering patterns with and without the vertical offset are shown in FIG. 35 by the solid and dashed lines, respectively.

The above results make clear the effect of a vertical offset in reducing hot spots and homogenizing a scattering pattern. By using this effect alone or in combination with other randomizations, one can achieve smooth scattering patterns with a minimum of visual artifacts or strong intensity fluctuations.

Example 3

Spatial Arrangement of Microstructures

A defining global parameter of great relevance to the scattering pattern is the spatial arrangement of the microstructures on the screen. The main influence of the spatial arrangement is reflected in the overall symmetry of the scattering pattern.

For instance, the regular square array of FIG. 36 generates a three-dimensional pattern that resembles a rectangle, depending on the divergence angles introduced by the local configuration of the microlenses. The hexagonal array of FIG. 37, on the other hand, generates a scattering pattern in the form of a hexagon which can be stretched along one direction more than another depending on the divergence angles introduced by the configuration of the microlenses.

Apart from geometrical considerations, the overall symmetry is important in many aspects, but mainly because it affects how energy is concentrated in the observation plane. For instance, for a pattern of similar spatial extension, the hexagonal arrangement of FIG. 37 concentrates more light than the square array of FIG. 36. As a result, the scattering pattern due to a hexagonal array exhibits more gain, i.e., scattering over a specified angular range, than an equivalent square array.

In addition to gain there are also important manufacturing issues which come into play when considering the implementation of a particular spatial arrangement. For example, because of the corners, square arrays are generally deeper than hexagonal arrays and thus more difficult to manufacture.

From the perspective of the scattering pattern, the two factors of primary relevance are the shape of the intensity profile and the divergence angle. The shape is controlled by the profile of the microstructures (sag function) while the divergence angle is controlled by the slope of the profile (first derivative of the sag function).

Therefore, it would seem that the particular size and distribution of microstructures should not matter, as long as the individual profiles are randomized for a smooth pattern properly defined to provide the desired divergence angles. In visual systems, however, there are additional effects associated with the spatial arrangement of microstructures that are not apparent in the scattering pattern and reflect the interaction between the projected image and the sampling effect caused by the existence of discrete individual microstructures.

A simple example of this interaction is aliasing, easily observed in pictures of high-frequency features taken with commercial digital cameras. Another effect is the appearance of color bands that arise again as a result of finite sampling and the color distribution in projected images. Independent of the screen performance in the far field, unless the scattering elements are sufficiently small, effects due to sampling may arise and need to be addressed.

One way to eliminate these effects completely is to use a screen design that renounces a regular spatial arrangement of microstructures. This can be done by employing a screen design where microstructures are characterized by both local parameters and a spatial boundary, where the spatial boundary is the closed line that surrounds the microstructure. For example, for a square array, the boundary is a square, while for a honeycomb, the boundary is a hexagon.

In one dimension, a regular spatial arrangement can be avoided by using cylinders of variable diameter. In two dimensions, the boundary can be, in most general form, a polygonal curve. The complete set of polygonal curves that defines the boundaries of the microstructures in the whole screen would generally (but not necessarily always) be arranged in close-packed form, as shown in FIG. 38. Another possible arrangement, that also avoids a regular spatial arrangement and is simpler to implement, employs rectangular or other shaped cells to compose a mosaic distribution of microlenses as shown in FIG. 39. A particular advantage of a mosaic, or a general polygonal boundary, is that it reduces the influence of defects caused by the tiling of two or more screen arrays to form a larger screen.

Example 4

Randomization Process

A particularly effective way to avoid the presence of artifacts due to the periodic repetition of microstructures on a screen is to use randomization, which can be applied to either local parameters or global parameters or to both local and global parameters, as desired.

Any set of random numbers satisfy a probability distribution function (PDF), which basically defines the probability of choosing a given value in an allowed range of parameters. Because of its simplicity, and availability in most computers, a preferred PDF is the uniform PDF. In this case, equal probability is assigned to each value in the range of the parameter. With the ability to accurately shape each individual microstructure in the screen, the particular PDF to be used in the randomization need not be confined to a few specific types but can assume an arbitrary form. Furthermore, distinct parameters can be subjected to different PDF's, depending on the desired properties for the scattering pattern.

As a simple illustration of the effect of a particular PDF assignment, consider the case of a random array of 100-micron diameter spherical microlenses with maximum sag in the range from 5 to 15 microns and with a vertical offset equal to a randomized ±2 microns with a uniform PDF.

The only available parameters for randomization for the microlenses themselves are then the radius of curvature and the maximum sag of each microlens. However, in addition to the specific functional shape of the PDF to be adopted, there are two distinct procedures to attain the randomization, depending on whether the PDF refers to the radius of curvature or the maximum lens sag. Since the sag is directly related to the radius of curvature the PDF's will be likewise related.

An illustration of this effect is shown in FIG. 40 and FIG. 41. The result of changing the parameter to which the uniform PDF is applied is shown in the scattering patterns of FIG. 42, where the pattern for a uniform PDF in sag is represented by the solid line and that for a uniform PDF in radius of curvature is represented by the dashed line. As can be seen in this figure, with the uniform distribution on sag, the scattering pattern tends to spread over a larger angular range. This larger angle scattering results from an increased number of deep-sag lens units for the uniform distribution on sag.

Depending on the specifications of the scattering it may be desirable to use other probability distribution functions besides a uniform distribution. A Gaussian distribution, for instance, allows the concentration of a parameter (e.g., sag or radius) around a given average value. There is no limitation on the types of PDF's that can be utilized, the only restrictions being imposed by the desired performance of the system. The uniform distribution tends to be the distribution of choice for most applications, mainly due to its simplicity. In many cases of interest this is sufficient to meet the system requirements. However, the option to implement an arbitrary PDF provides an important degree of freedom for tailoring the scattering pattern.

Example 5

Diffusing Screen

As discussed above, in general terms, screens can be divided into two categories, i.e., diffusing screens and display screens, based on the different requirements involved in these two applications.

Although both types of screens are intended to spread the incident illumination homogeneously over an area larger than the area it would have been spread over without the screen, display applications typically involve a number of additional requirements related to the visual interaction with an external user. A diffusing screen, on the other hand, does not necessarily need to be used visually.

For instance, an optical detection system might require a larger, homogeneous focal spot for a given spectral band than would be provided without a screen. The absence of visual performance requirements typically makes the design of diffusing screens somewhat easier since one must concentrate only on the size and shape of the diffusing pattern. Also, the required angular spread tends to be small, which implies the use of shallow microstructures which are easier to fabricate.

As an example, consider an input beam equal to 4 mm in the spectral range of 2 to 4 microns which is being focused at a distance equal to 10 mm. With these parameters, the full divergence angle is approximately 0.14 degrees. However, let us assume that a beam with full divergence at half-maximum of 26 degrees is required. This task can be accomplished with the microlens array shown in FIG. 43.

The resulting diffraction pattern, averaged over the spectral range is shown in FIG. 44 and cross-sections of the scattering pattern are shown on FIG. 45.

Example 6

Display Screen

As mentioned above, screens for display applications generally present a number of challenges in addition to spreading the illumination into a specific angular range with a certain scattering profile. Here we will be concerned only with those requirements that pertain to the properties of the scattering pattern. Visual requirements, e.g., color, contrast, and various subjective variables, involve issues that cannot be easily modeled by diffraction calculations. These are better evaluated by direct observation of a test image on a screen sample.

A first immediate distinction from diffusive screens is that display screens are confined to the visual part of the spectrum. Another main difference is that displays generally require a larger angular range, typically spanning a total of 100 degrees useful field. In addition, the angular divergence may be different in the vertical and horizontal directions.

An example of a scattering pattern for a display screen is shown in FIG. 46. The divergence along the fast axis is 36 degrees (estimated gain 4.9) while along the slow axis it is about 17 degrees (estimated gain 16.9). This pattern was generated with the hexagonal array of anamorphic microlenses illustrated in FIG. 47.

Another example, obtained with an anamorphic mosaic array is shown in FIG. 48, with a portion of the array itself being shown in FIG. 49. For this mosaic design, randomness was introduced for both the individual microlens elements as well as for the sizes of the rectangular boundaries (25 to 30 microns in one direction and 45 to 50 microns in the other). The divergence along the fast axis is 33 degrees (estimated gain 5.5) while that along the slow axis is about 15 degrees (estimated gain 9.6).

Although specific embodiments of the invention have been described and illustrated, it will be apparent to those skilled in the art that modifications and variations can be made without departing from the invention's spirit and scope. The following claims are thus intended to cover the specific embodiments set forth herein as well as such modifications, variations, and equivalents.

| Screen Design Tables |  |
|---|---|
| FIG. 26 |  |
| Array type | Cylindrical |
| Spatial arrangement | Close-packed |
| Microstructure diameter | 100 μm |
| Microstructure profile | Spherical |
| Microstructure sag range | 10–10 μm |
| Total array depth range | 10 μm |
| Microstructure randomization PDF | Regular array |
| Vertical offset | 0 μm |
| Offset randomization PDF | Not applicable |
| Wavelength range | 2–4 μm |
| FIG. 27 |  |
| Array type | Cylindrical |
| Spatial arrangement | Close-packed |
| Microstructure diameter | 100 μm |
| Microstructure profile | Triangular |
| Microstructure sag range | 10–10 μm |
| Total array depth range | 10 μm |
| Microstructure randomization PDF | Regular array |

-continued

Screen Design Tables

| | |
|---|---|
| Vertical offset | 0 μm |
| Offset randomization PDF | Not applicable |
| Wavelength range | 2–4 μm |

FIG. 28

| | |
|---|---|
| Array type | Cylindrical |
| Spatial arrangement | Close-packed |
| Microstructure diameter | 100 μm |
| Microstructure profile | Aspheric |
| Microstructure sag range | 10–10 μm |
| Total array depth range | 10 μm |
| Microstructure randomization PDF | Regular array |
| Vertical offset | 0 μm |
| Offset randomization PDF | Not applicable |
| Wavelength range | 2–4 μm |

FIG. 29

| | |
|---|---|
| Array type | Cylindrical |
| Spatial arrangement | Close-packed |
| Microstructure diameter | 50 μm |
| Microstructure profile | Spherical |
| Microstructure sag range | 12–12 μm |
| Total array depth range | 12 μm |
| Microstructure randomization PDF | Regular array |
| Vertical offset | 0 μm |
| Offset randomization PDF | Not applicable |
| Wavelength range | 0.4–0.7 μm |

FIG. 30

| | |
|---|---|
| Array type | Cylindrical |
| Spatial arrangement | Close-packed |
| Microstructure diameter | 50 μm |
| Microstructure profile | Spherical |
| Microstructure sag range | 20–20 μm |
| Total array depth range | 20 μm |
| Microstructure randomization PDF | Regular array |
| Vertical offset | 0 μm |
| Offset randomization PDF | Not applicable |
| Wavelength range | 0.4–0.7 μm |

FIG. 31

| | |
|---|---|
| Array type | Cylindrical |
| Spatial arrangement | Close-packed |
| Microstructure diameter | 50 μm |
| Microstructure profile | Parabolic |
| Microstructure sag range | 20–20 μm |
| Total array depth range | 20 μm |
| Microstructure randomization PDF | Regular array |
| Vertical offset | 0 μm |
| Offset randomization PDF | Not applicable |
| Wavelength range | 0.4–0.7 μm |

FIG. 32

| | |
|---|---|
| Array type | Cylindrical |
| Spatial arrangement | Close-packed |
| Microstructure diameter | 100 μm |
| Microstructure profile | Spherical |
| Microstructure sag range | 10–10 μm |
| Total array depth range | 10 μm |
| Microstructure randomization PDF | Regular array |
| Vertical offset | 0 μm |
| Offset randomization PDF | Not applicable |
| Wavelength range | 0.4–0.7 μm |

FIG. 33

| | |
|---|---|
| Array type | Cylindrical |
| Spatial arrangement | Close-packed |
| Microstructure diameter | 100 μm |
| Microstructure profile | Spherical |
| Microstructure sag range | 10–10 μm |
| Total array depth range | 10 μm |
| Microstructure randomization PDF | Regular array |
| Vertical offset | ±2 μm |
| Offset randomization PDF | Uniform |
| Wavelength range | 0.4–0.7 μm |

-continued

Screen Design Tables

FIG. 34

| | |
|---|---|
| Array type | Cylindrical |
| Spatial arrangement | Close-packed |
| Microstructure diameter | 100 μm |
| Microstructure profile | Spherical |
| Microstructure sag range | 10–10 μm |
| Total array depth range | 10 μm |
| Microstructure randomization PDF | Regular array |
| Vertical offset | ±2 μm |
| Offset randomization PDF | Uniform |
| Wavelength range | 0.4–0.7 μm |

FIG. 36

| | |
|---|---|
| Array type | Two-dimensional |
| Spatial arrangement | Square close-packed |
| Microstructure diameter | 100 μm |
| Microstructure profile | Spherical |
| Microstructure sag range | 10–10 μm |
| Total array depth range | 10 μm |
| Microstructure randomization PDF | Regular array |
| Vertical offset | 0 μm |
| Offset randomization PDF | Not applicable |
| Wavelength range | 0.4–0.7 μm |

FIG. 37

| | |
|---|---|
| Array type | Two-dimensional |
| Spatial arrangement | Hexagonal |
| Microstructure diameter | 100 μm |
| Microstructure profile | Spherical |
| Microstructure sag range | 10–10 μm |
| Total array depth range | 10 μm |
| Microstructure randomization PDF | Regular array |
| Vertical offset | 0 μm |
| Offset randomization PDF | Not applicable |
| Wavelength range | 0.4–0.7 μm |

FIG. 38

| | |
|---|---|
| Array type | Two-dimensional |
| Spatial arrangement | Random polygonal boundaries |
| Microstructure diameter | 50 μm (Average) |
| Microstructure profile | Spherical |
| Microstructure sag range | 2–10 μm |
| Total array depth range | 10 μm |
| Microstructure randomization PDF | Uniform |
| Vertical offset | 0 μm |
| Offset randomization PDF | Not applicable |
| Wavelength range | 0.4–0.7 μm |

FIG. 39

| | |
|---|---|
| Array type | Two-dimensional |
| Spatial arrangement | Mosaic |
| Microstructure diameter | 50 μm (Average) |
| Microstructure profile | Spherical (Anamorphic) |
| Microstructure sag range | 2–10 μm |
| Total array depth range | 10 μm |
| Microstructure randomization PDF | Uniform |
| Vertical offset | 0 μm |
| Offset randomization PDF | Not applicable |
| Wavelength range | 0.4–0.7 μm |

FIG. 43

| | |
|---|---|
| Array type | Two-dimensional |
| Spatial arrangement | Hexagonal |
| Microstructure diameter | 500 μm (Average) |
| Microstructure profile | Spherical (Anamorphic) |
| Microstructure sag range | 2–8 μm |
| Total array depth range | 14 μm |
| Microstructure randomization PDF | Uniform |
| Vertical offset | ±2 μm |
| Offset randomization PDF | Uniform |
| Wavelength range | 0.4–0.7 μm |

FIG. 47

| | |
|---|---|
| Array type | Two-dimensional |
| Spatial arrangement | Hexagonal |
| Microstructure diameter | 50 μm (Average) |

-continued

Screen Design Tables

| | |
|---|---|
| Microstructure profile | Spherical (Anamorphic) |
| Microstructure sag range | 2.5–4 µm (slow axis) |
| | 9–11 µm (fast axis) |
| Total array depth range | 16 µm |
| Microstructure randomization PDF | Uniform |
| Vertical offset | ±2 µm |
| Offset randomization PDF | Uniform |
| Wavelength range | 0.4–0.7 µm |

FIG. 49

| | |
|---|---|
| Array type | Two-dimensional |
| Spatial arrangement | Mosaic |
| Microstructure diameter | 25–30 mm (slow axis) |
| | 45–50 mm (fast axis) |
| Microstructure profile | Spherical |
| Microstructure sag range | 1.9–3.5 µm (slow axis) |
| | 8.8–10 µm (fast axis) |
| Total array depth range | 17.4 µm |
| Microstructure randomization PDF | Uniform |
| Vertical offset | ±2 µm |
| Offset randomization PDF | Uniform |
| Wavelength range | 0.4–0.7 µm |

What is claimed is:

1. A method for making a structured screen that provides a desired spread of incident light, said structured screen comprising a substrate and a plurality of microstructures distributed over at least one surface of said substrate, said method comprising:
   (a) selecting a location on said at least one surface of the substrate for each of said plurality of microstructures;
   (b) selecting a configuration for each of said plurality of microstructures;
   (c) calculating the spread of the incident light for the selected locations and the selected configurations of steps (a) and (b);
   (d) comparing the calculated spread of step (c) with the desired spread and, if necessary, repeating at least one of steps (a) and (b), and step (c) until the comparison between the calculated spread and desired spread satisfies a specified criterion; and
   (e) producing a plurality of microstructures having, to an accuracy of better than $10 \cdot \lambda_n$, the locations and the configurations which, in step (d), resulted in the satisfaction of the specified criterion, where $\lambda n$ is the nominal operating wavelength for the screens,
   wherein at least some of the microstructures comprise a curved microlens portion or a triangular portion or a pyramidal portion.

2. The method of claim 1 wherein the locations selected in step (a) form a regular array.

3. The method of claim 1 wherein in step (b) at least a portion of at least some of the microstructures is selected to have a configuration given by:

$$s(x, y) = \frac{c[(x - x_c)^2 + (y - y_c)^2]}{1 + \sqrt{1 - (\kappa + 1)c^2[(x - x_c)^2 + (y - y_c)^2]}} + \sum_p A_p[(x - x_c)^2 + (y - y_c)^2]^{p/2}$$

where s(x,y) is the sag of said portion, c is its curvature, $(x_c, y_c)$ is its center point, $\kappa$ is a conic constant, and $A_p$ are aspheric coefficients.

4. The method of claim 3 wherein $A_p \neq 0$ for at least one p.

5. The method of claim 3 wherein $\kappa \neq 0$.

6. The method of claim 3 wherein:
   $\kappa = -1$; and
   $A_p = 0$ for all p.

7. The method of claim 1 wherein in step (b) at least a portion of at least some of the microstructures is selected to have a configuration given by:

$$s(x, y) = \sum_{p=1}^{\infty} B_p (x - x_c)^p + C_p (y - y_c)^p$$

where s(x,y) is the sag of said portion, $(x_c, y_c)$ is its center point, and $B_p$ and $C_p$ are power series coefficients.

8. The method of claim 1 wherein at least some of the microstructures comprise an anamorphic microlens.

9. The method of claim 1 wherein in step (b) at least a portion of at least some of the microstructures is selected to have a configuration given by:

$$s(x, y) = \frac{c_x(x - x_c)^2 + c_y(y - y_c)^2}{1 + \sqrt{1 - (1 + \kappa_x)c_x(x - x_c)^2 + (1 + \kappa_y)c_y(y - y_c)^2}}$$

where s(x,y) is the sag of said portion, $(x_c, y_c)$ is its center point, $c_x$ and $c_y$ are curvatures along x and y, respectively, and $\kappa_x$ and $\kappa_y$ are conic constants along x and y, respectively.

10. The method of claim 1 wherein in step (b) at least a portion of at least some of the microstructures is selected to have a configuration given by:

$$s(x, y) = \frac{c_x(x - x_c)^2}{1 + \sqrt{1 - (1 + \kappa_x)(x - x_c)^2}} + \frac{c_y(y - y_c)^2}{1 + \sqrt{1 - (1 + \kappa_y)(y - y_c)^2}} + \sum_p A_{xp}(x - x_c)^p + A_{yp}(y - y_c)^p$$

where s(x,y) is the sag of said portion, $(x_c, y_c)$ is its center point, $c_x$ and $c_y$ are curvatures along x and y, respectively, $\kappa_x$ and $\kappa_y$ are conic constants along x and y, respectively, and $A_{xp}$ and $A_{yp}$ are aspheric coefficients along x and y, respectively.

11. The method of claim 1 wherein:
   (a) at least a portion of at least some of the microstructures is selected to have a configuration characterized by at least one parameter; and
   (b) said at least one parameter is randomly distributed in accordance with a predetermined probability density function.

12. The method of claim 11 wherein the at least one randomly distributed parameter has a uniform probability density function over a predetermined range for the parameter.

13. The method of claim 11 wherein the at least one randomly distributed parameter is radius of curvature.

14. The method of claim 11 wherein the at least one randomly distributed parameter is maximum surface sag.

15. The method of claim 1 wherein:
   (a) at least some of the microstructures comprise (i) a curved, microlens portion and (ii) a straight-sided, piston portion; and
   (b) the heights of the straight-sided, piston portions are randomly distributed in accordance with a predetermined probability density function.

16. The method of claim 15 wherein the heights of the straight-sided, piston portions have a uniform probability density function over a predetermined range for said heights.

17. The method of claim 1 wherein:
(a) at least some of the microstructures have an apex, said apex being separated from the substrate by a distance; and
(b) at least some of said distances are randomly distributed in accordance with a predetermined probability density function.

18. The method of claim 17 wherein said randomly distributed distances have a maximum value and the difference between said maximum value and said randomly distributed distances has a uniform probability density function over a predetermined range for said difference.

19. The method of claim 1 wherein the substrate defines a first optical axis and the configuration of at least some of the microstructures comprises a microlens which defines a second optical axis which is not parallel to the first optical axis.

20. The method of claim 1 wherein as produced in step (e), the plurality of microstructures have, to an accuracy of better than $5 \cdot \lambda_n$, the locations and the configurations which, in step (d), resulted in the satisfaction of the specified criterion.

21. The method of claim 1 wherein step (e) comprises direct laser writing in a photoresist.

22. A method for making a structured screen that provides a desired spread of incident light, said structured screen comprising a substrate and a plurality of microstructures distributed over at least one surface of said substrate, said method comprising:
(a) selecting a location on said at least one surface of the substrate for each of said plurality of microstructures;
(b) selecting a configuration for each of said plurality of microstructures;
(c) calculating the spread of the incident light for the selected locations and the selected configurations of steps (a) and (b);
(d) comparing the calculated spread of step (c) with the desired spread and, if necessary, repeating at least one of steps (a) and (b), and step (c) until the comparison between the calculated spread and desired spread satisfies a specified criterion; and
(e) producing a plurality of microstructures having, to an accuracy of better than $10 \cdot \lambda_n$, the locations and the configurations which, in step (d), resulted in the satisfaction of the specified criterion, where $\lambda_n$ is the nominal operating wavelength for the screen;
wherein the locations selected in step (a) form a hexagonal array.

23. A method for making a structured screen that provides a desired spread of incident light, said structured screen comprising a substrate and a plurality of microstructures distributed over at least one surface of said substrate, said method comprising:
(a) selecting a location on said at least one surface of the substrate for each of said plurality of microstructures;
(b) selecting a configuration for each of said plurality of microstructures;
(c) calculating the spread of the incident light for the selected locations and the selected configurations of steps (a) and (b);
(d) comparing the calculated spread of step (c) with the desired spread and, if necessary, repeating at least one of steps (a) and (b), and step (c) until the comparison between the calculated spread and desired spread satisfies a specified criterion; and
(e) producing a plurality of microstructures having, to an accuracy of better than $10 \cdot \lambda_n$, the locations and the configurations which, in step (d), resulted in the satisfaction of the specified criterion, where $\lambda_n$ is the nominal operating wavelength for the screen;
wherein the locations selected in step (a) are based on a set of unit cells which form a mosaic at least a portion of which is not a regular array.

24. The method of claim 23 wherein the mosaic is random.

25. The method of claim 23 wherein the structured screen has internal microstructures and edge microstructures and the mosaic provides at least some junctions between internal microstructures that correspond, in terms of light spreading, to at least some junctions between edge microstructures resulting from the tiling of two structured screens to one another.

26. A method for making a structured screen that provides a desired spread of incident light, said structured screen comprising a substrate and a plurality of microstructures distributed over at least one surface of said substrate, said method comprising:
(a) selecting a location on said at least one surface of the substrate for each of said plurality of microstructures;
(b) selecting a configuration for each of said plurality of microstructures;
(c) calculating the spread of the incident light for the selected locations and the selected configurations of steps (a) and (b);
(d) comparing the calculated spread of step (c) with the desired spread and, if necessary, repeating at least one of steps (a) and (b), and step (c) until the comparison between the calculated spread and desired spread satisfies a specified criterion; and
(e) producing a plurality of microstructures having, to an accuracy of better than $10 \cdot \lambda_n$, the locations and the configurations which, in step (d), resulted in the satisfaction of the specified criterion, where $\lambda_n$ is the nominal operating wavelength for the screen;
wherein at least some of the locations selected in step (a) are randomly distributed in accordance with a predetermined probability density function.

27. A method for making a structured screen that provides a desired spread of incident light, said structured screen comprising a substrate and a plurality of microstructures distributed over at least one surface of said substrate, said method comprising:
(a) selecting a location on said at least one surface of the substrate for each of said plurality of microstructures;
(b) selecting a configuration for each of said plurality of microstructures;
(c) calculating the spread of the incident light for the selected locations and the selected configurations of steps (a) and (b);
(d) comparing the calculated spread of step (c) with the desired spread and, if necessary, repeating at least one of steps (a) and (b), and step (c) until the comparison between the calculated spread and desired spread satisfies a specified criterion; and
(e) producing a plurality of microstructures having, to an accuracy of better than $10 \cdot \lambda_n$, the locations and the configurations which, in step (d), resulted in the satisfaction of the specified criterion, where $\lambda_n$ is the nominal operating wavelength for the screen;

wherein the locations of the microstructures are based on a random set of polygonal shaped boundaries.

28. A method for making a structured screen that provides a desired spread of incident light, said structured screen comprising a substrate and a plurality of microstructures distributed over at least one surface of said substrate, said method comprising:
  (a) selecting a location on said at least one surface of the substrate for each of said plurality of microstructures;
  (b) selecting a configuration for each of said plurality of microstructures;
  (c) calculating the spread of the incident light for the selected locations and the selected configurations of steps (a) and (b);
  (d) comparing the calculated spread of step (c) with the desired spread and, if necessary, repeating at least one of steps (a) and (b), and step (c) until the comparison between the calculated spread and desired spread satisfies a specified criterion; and
  (e) producing a plurality of microstructures having, to an accuracy of better than $10 \cdot \lambda_n$, the locations and the configurations which, in step (d), resulted in the satisfaction of the specified criterion, where $\lambda_n$ is the nominal operating wavelength for the screen;
  wherein at least some of the microstructures comprise (i) a curved, microlens portion and (ii) a straight-sided, piston portion.

29. A method for making a structured screen that provides a desired spread of incident light, said structured screen comprising a substrate and a plurality of microstructures distributed over at least one surface of said substrate, said method comprising:
  (a) selecting a location on said at least one surface of the substrate for each of said plurality of microstructures;
  (b) selecting a configuration for each of said plurality of microstructures;
  (c) calculating the spread of the incident light for the selected locations and the selected configurations of steps (a) and (b);
  (d) comparing the calculated spread of step (c) with the desired spread and, if necessary, repeating at least one of steps (a) and (b), and step (c) until the comparison between the calculated spread and desired spread satisfies a specified criterion; and
  (e) producing a plurality of microstructures having, to an accuracy of better than $10 \cdot \lambda_n$, the locations and the configurations which, in step (d), resulted in the satisfaction of the specified criterion, where $\lambda_n$ is the nominal operating wavelength for the screen;
  wherein:
    (i) at least a portion of at least some of the microstructures is selected to have a configuration characterized by at least one parameter;
    (ii) said at least one parameter is randomly distributed in accordance with a predetermined probability density function; and
    (iii) the at least one randomly distributed parameter is characteristic of the transverse size of a microstructure.

30. The method of claim 29 wherein the parameter is diameter.

31. A method for making a structured screen that provides a desired spread of incident light, said structured screen comprising a substrate and a plurality of microstructures distributed over at least one surface of said substrate, said method comprising:
  (a) selecting a location on said at least one surface of the substrate for each of said plurality of microstructures;
  (b) selecting a configuration for each of said plurality of microstructures;
  (c) calculating the spread of the incident light for the selected locations and the selected configurations of steps (a) and (b);
  (d) comparing the calculated spread of step (c) with the desired spread and, if necessary, repeating at least one of steps (a) and (b), and step (c) until the comparison between the calculated spread and desired spread satisfies a specified criterion; and
  (e) producing a plurality of microstructures having, to an accuracy of better than $10 \cdot \lambda_n$, the locations and the configurations which, in step (d), resulted in the satisfaction of the specified criterion, where $\lambda_n$ is the nominal operating wavelength for the screen;
  wherein microstructures are distributed over two of the substrate's surfaces.

32. Apparatus for controlled spreading of light comprising a plurality of microstructures, at least some of which comprise a curved microlens portion or a triangular portion or a pyramidal portion, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus.

33. The apparatus of claim 32 wherein the predetermined locations form a regular array.

34. The apparatus of claim 32 wherein at least a portion of the configuration of at least some of the microstructures corresponds with better than $10 \cdot \lambda_n$ accuracy to the mathematical relation:

$$s(x,y) = \frac{c[(x-x_c)^2 + (y-y_c)^2]}{1 + \sqrt{1-(\kappa+1)c^2[(x-x_c)^2 + (y-y_c)^2]}} + \sum_p A_p[(x-x_c)^2 + (y-y_c)^2]^{p/2}$$

where $s(x,y)$ is the sag of said portion, c is its curvature, $(x_c, y_c)$ is its center point, $\kappa$ a conic constant, and $A_p$ are aspheric coefficients.

35. The apparatus of claim 34 wherein $A_p \neq 0$ for at least one p.

36. The apparatus of claim 34 wherein $\kappa \neq 0$.

37. The apparatus of claim 34 wherein:
  (a) $\kappa = -1$; and
  (b) $A_p = 0$ for all p.

38. A The apparatus of claim 32 wherein at least some of the microstructures comprise an anamorphic microlens.

39. The apparatus of claim 32 wherein at least a portion of the configuration of at least some of the microstructures corresponds with better than $10 \cdot \lambda_n$ accuracy to the mathematical relation:

$$s(x,y) = \frac{c_x(x-x_c)^2 + c_y(y-y_c)^2}{1 + \sqrt{1-(1+\kappa_x)c_x(x-x_c)^2 + (1+\kappa_y)c_y(y-y_c)^2}}$$

where $s(x,y)$ is the sag of said portion, $(x_c, y_c)$ is its center point, $c_x$ and $c_y$ are curvatures along x and y, respectively, and $\kappa_x$ and $\kappa_y$ are conic constants along x and y, respectively.

40. The apparatus of claim 32 wherein at least a portion of the configuration of at least some of the microstructures corresponds with better than $10 \cdot \lambda_n$ accuracy to the mathematical relation:

$$s(x, y) = \frac{c_x(x-x_c)^2}{1+\sqrt{1-(1+\kappa_x)(x-x_c)^2}} + \frac{c_y(y-y_c)^2}{1+\sqrt{1-(1+\kappa_y)(y-y_c)^2}} + \sum_p A_{xp}(x-x_c)^p + A_{yp}(y-y_c)^p$$

where s(x,y) is the sag of said portion, $(x_c, y_c)$ is its center point, $c_x$ and $c_y$ are curvatures along x and y, respectively, $\kappa_x$ and $\kappa_y$ are conic constants along x and y, respectively, and $A_{xp}$ and $A_{yp}$ are aspheric coefficients along x and y, respectively.

41. The apparatus of claim 32 wherein:
 (a) at least some of the predetermined mathematical relations include at least one common parameter; and
 (b) said at least one common parameter is randomly distributed in accordance with a predetermined probability density function.

42. The apparatus of claim 41 wherein the at least one randomly distributed common parameter has a uniform probability density function over a predetermined range for said common parameter.

43. The apparatus of claim 41 wherein the at least one randomly distributed common parameter is radius of curvature.

44. The apparatus of claim 41 wherein the at least one randomly distributed common parameter is maximum surface sag.

45. The apparatus of claim 32 wherein:
 (a) at least some of the microstructures comprise (i) a curved, microlens portion, and (ii) a straight-sided, piston portion; and
 (b) the heights of the straight-sided, piston portions are randomly distributed in accordance with a predetermined probability density function.

46. The apparatus of claim 45 wherein the heights of the straight-sided, piston portions have a uniform probability density function over a predetermined range for said heights.

47. The apparatus of claim 32 wherein:
 (a) at least some of the microstructures have an apex; and
 (b) the heights of at least some of said apexes are randomly distributed in accordance with a predetermined probability density function.

48. The apparatus of claim 47 wherein said randomly distributed heights have a maximum value and the difference between said maximum value and said randomly distributed heights has a uniform probability density function over a predetermined range for said difference.

49. The apparatus of claim 32 wherein the apparatus defines a first optical axis and the configuration of at least some of the microstructures comprises a microlens which defines a second optical axis which is not parallel to the first optical axis.

50. The apparatus of claim 32 wherein each microstructure is located with better than $5 \cdot \lambda_n$ accuracy at a predetermined location with respect to all other microstructures and each microstructure has a configuration that with better than $5 \cdot \lambda_n$ accuracy corresponds to a predetermined mathematical relation.

51. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein the predetermined locations form a hexagonal array.

52. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein the predetermined locations are based on a set of unit cells which form a mosaic at least a portion of which is not a regular array.

53. The apparatus of claim 52 wherein the mosaic is random.

54. The apparatus of claim 52 wherein the apparatus has internal microstructures and edge microstructures and the mosaic provides at least some junctions between internal microstructures that correspond, in terms of light spreading, to at least some junctions between edge microstructures resulting from the tiling of two samples of the apparatus to one another.

55. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein at least some of the predetermined locations are randomly distributed in accordance with a predetermined probability density function.

56. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein the predetermined locations are based on a random set of polygonal shaped boundaries.

57. The apparatus of claim 32 wherein at least a portion of the configuration of at least some of the microstructures corresponds with better than $10 \cdot \lambda_n$ accuracy to the mathematical relation:

$$s(x, y) = \sum_{p=1}^{\infty} B_p(x-x_c)^p + C_p(y-y_c)^p$$

where s(x,y) is the sag of said portion, $(x_c, y_c)$ is its center point, and $B_p$ and $C_p$ are power series coefficients.

58. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein at least some of the microstructures comprise (i) a curved, microlens portion and (ii) a straight-sided, piston portion.

59. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein:
(a) at least some of the predetermined mathematical relations include at least one common parameter;
(b) said at least one common parameter is randomly distributed in accordance with a predetermined probability density function; and
(c) the at least one randomly distributed common parameter is a parameter characteristic of the transverse size of a microstructure.

60. The apparatus of claim 59 wherein the parameter is diameter.

61. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein the apparatus comprises two spaced-apart surfaces and the plurality of microstructures is distributed over both said surfaces.

62. Apparatus for controlled spreading of light comprising a plurality of microstructures, each microstructure being located with better than $10 \cdot \lambda_n$ accuracy at a predetermined location with respect to all other microstructures and each microstructure having a configuration that corresponds, with better than $10 \cdot \lambda_n$ accuracy, to a predetermined mathematical relation, where $\lambda_n$ is the nominal operating wavelength of the apparatus and said predetermined locations and predetermined mathematical relations allow an a priori calculation of the spreading of incident light by the apparatus, wherein:
(a) the apparatus comprises two spaced-apart surfaces,
(b) the plurality of microstructures is distributed over one of said surfaces; and
(c) the other surface is a Fresnel lens.

63. An array of microstructures for use in an optical device wherein the array is close packed and at least some of the microstructures comprise (i) a curved, microlens portion and (ii) a straight-sided, piston portion.

64. The array of claim 63 wherein the curved, microlens portion has a spherical shape.

65. A microstructure for use in an optical device comprising (i) a curved, microlens portion and (ii) a straight-sided, piston portion wherein the curved, microlens portion has a parabolic shape.

66. Apparatus for controlled spreading of light comprising a plurality of microstructures wherein at least a portion of each microstructure is described by the equation:

$$s(x, y) = \frac{c[(x - x_c)^2 + (y - y_c)^2]}{1 + \sqrt{1 - (\kappa + 1)c^2[(x - x_c)^2 + (y - y_c)^2]}} + \sum_p A_p[(x - x_c)^2 + (y - y_c)^2]^{p/2}$$

where $s(x,y)$ is the sag of said portion, c is a predetermined curvature, $(x_c, y_c)$ is a predetermined center point, $\kappa$ is a predetermined conic constant, $A_p$ are predetermined aspheric coefficients, and at least $\kappa$ is not equal to zero.

67. The apparatus of claim 66 wherein:
(a) $\kappa = -1$; and
(b) $A_p = 0$ for all p.

68. Apparatus for controlled spreading of light comprising a plurality of microstructures wherein at least a portion of each microstructure is described by the equation:

$$s(x, y) = \frac{c_x(x - x_c)^2 + c_y(y - y_c)^2}{1 + \sqrt{1 - (1 + \kappa_x)c_x(x - x_c)^2 + (1 + \kappa_y)c_y(y - y_c)^2}}$$

where $s(x,y)$ is the sag of said portion, $(x_c, y_c)$ is a predetermined center point, $c_x$ and $c_y$ are predetermined, non-equal, non-zero curvatures along x and y, respectively, and $\kappa_x$ and $\kappa_y$ are predetermined conic constants along x and y, respectively.

69. Apparatus for controlled spreading of light comprising a plurality of microstructures wherein at least a portion of each microstructure is described by the equation:

$$s(x, y) = \frac{c_x(x - x_c)^2}{1 + \sqrt{1 - (1 + \kappa_x)(x - x_c)^2}} + \frac{c_y(y - y_c)^2}{1 + \sqrt{1 - (1 + \kappa_y)(y - y_c)^2}} + \sum_p A_{xp}(x - x_c)^p + A_{yp}(y - y_c)^p$$

where $s(x,y)$ is the sag of said portion, $(x_c, y_c)$ is a predetermined center point, $c_x$ and $c_y$ are predetermined, non-equal, non-zero curvatures along x and y, respectively, $\kappa_x$ and $\kappa_y$ are predetermined conic constants along x and y, respectively, and $A_{xp}$ and $A_{yp}$ are predetermined aspheric coefficients along x and y, respectively.

70. Apparatus for controlled spreading of light comprising a plurality of microstructures, each microstructure having a configuration that is characterized by at least one predetermined parameter which is randomly distributed in accordance with a predetermined probability density function, wherein said microstructures form an array having a total array depth range of at least 10 microns.

71. The apparatus of claim 70 wherein the at least one randomly-distributed parameter has a uniform probability density function.

72. Apparatus for controlled spreading of light comprising a plurality of microstructures, each microstructure having a configuration that is characterized by at least one predetermined parameter which is randomly distributed in accordance with a predetermined probability density function, wherein:
(a) each microstructure comprises (i) a curved, microlens portion and (ii) a straight-sided, piston portion; and (b) the randomly-distributed parameter characterizes the straight-sided, piston portion.

73. The apparatus of claim 70 wherein each microstructure is characterized by two predetermined parameters, each of which is randomly distributed in accordance with a predetermined probability density function which may be the same or different for the two parameters.

74. The apparatus of claim 73 wherein each of the randomly-distributed parameters has a uniform probability density function over a predetermined range for the parameter.

75. Apparatus for controlled spreading of light comprising a plurality of microstructures, each microstructure having a configuration that is characterized by at least one predetermined parameter which is randomly distributed in accordance with a predetermined probability density function, wherein:
  (a) each microstructure is characterized by two predetermined parameters, each of which is randomly distributed in accordance with a predetermined probability density function which may be the same or different for the two parameters;
  (b) each microstructure comprises (i) a curved, microlens portion and (ii) a straight-sided, piston portion; and
  (c) one of the two randomly-distributed parameters characterizes the curved, microlens portion and the other randomly-distributed parameter characterizes the straight-sided, piston portion.

76. The apparatus of claim 70 wherein the locations of the microstructures is randomized in accordance with a predetermined probability density function.

77. A structured screen comprising a plurality of predetermined microstructures, wherein:
  (a) said microstructures comprise (i) a curved, microlens portion and (ii) a straight-sided, piston portion which has a predetermined height which for at least some of said microstructures is not zero;
  (b) said curved, microlens portions have predetermined diameters and predetermined maximum sags; and
  (c) for at least some of said microstructures, the sum of the predetermined maximum sag and the predetermined height is greater than the predetermined diameter.

78. A structured screen comprising a plurality of predetermined microstructures, wherein:
  (a) said microstructures comprise (i) a curved, microlens portion and (ii) a straight-sided, piston portion which has a predetermined height which can be zero;
  (b) said curved, microlens portions have predetermined diameters and predetermined maximum sags; and
  (c) for at least some of said microstructures, the sum of the predetermined maximum sag and the predetermined height is greater than the predetermined diameter;
wherein at least one of the predetermined diameters, the predetermined maximum sags, and the predetermined heights is randomly distributed in accordance with a predetermined probability density function.

79. The structured screen of claim 78 wherein the predetermined diameters have a uniform probability density function over a predetermined range for said diameters.

80. The structured screen of claim 78 wherein the predetermined maximum sags have a uniform probability density function over a predetermined range for said maximum sags.

81. The structured screen of claim 78 wherein the predetermined heights have a uniform probability density function over a predetermined range for said heights.

82. A structured screen comprising a plurality of predetermined aspherical microlenses, wherein said microlenses:
  (a) have predetermined diameters and predetermined maximum sags; and
  (b) produce a spread of incident light which has a flatter intensity distribution than that produced by a plurality of spherical microlenses having the same predetermined diameters and predetermined sags.

83. The structured screen of claim 82 wherein at least one of the predetermined diameters and the predetermined maximum sags is randomly distributed in accordance with a predetermined probability density function.

84. The structured screen of claim 83 wherein the predetermined diameters have a uniform probability density function over a predetermined range for said diameters.

85. The structured screen of claim 83 wherein the predetermined maximum sags have a uniform probability density function over a predetermined range for said maximum sags.

86. The structured screen of claim 82 wherein at least some of the microlenses are parabolic.

87. A structured screen which defines an optical axis and comprises a plurality of microstructures at least some of which comprise a non-cylindrical microlens having an optical axis which is not parallel to the optical axis of the structured screen.

88. A structured screen comprising:
  (a) a Fresnel lens which comprises a plurality of surfaces in the form of concentric rings; and
  (b) a plurality of microstructures distributed over at least some of said plurality of surfaces, said plurality of microstructures serving to control the spread of light incident on the structured screen.

89. A structured screen comprising a plurality of unit cells and a plurality of microstructures, one microstructure associated with each unit cell, wherein the perimeters of the unit cells are non-regular polygons distributed so as to form a Voronoi tessellation.

90. The structured screen of claim 89 wherein the perimeters are defined by a predetermined probability density function.

91. A structured screen comprising a plurality of microstructures at least some of which comprise a microlens having a first curvature in a first direction and a second curvature in a second direction orthogonal to the first direction, at least one of said first and second curvatures being randomly distributed in accordance with a predetermined probability density function.

92. The structured screen of claim 91 where both the first and second curvatures are randomly distributed in accordance with a predetermined probability density function which may be the same or different for the two curvatures.

93. A structured screen comprising:
  (a) a first sub-screen comprising a plurality of internal microstructures and a plurality of edge microstructures, each microstructure being located at a predetermined location with respect to all other microstructures, said predetermined locations being based on a first set of unit cells which form a first mosaic;
  (b) a second sub-screen comprising a plurality of internal microstructures and a plurality of edge microstructures, each microstructure being located at a predetermined location with respect to all other microstructures, said predetermined locations being based on a second set of unit cells which form a second mosaic;
wherein:
  (i) the first and second sub-screens are tiled to one another, said tiling producing edge junctions between edge microstructures of the first sub-screen and edge microstructures of the second sub-screen; and (ii) each of the first and second mosaics provides at least some internal junctions between internal microstructures that correspond, in terms of light spreading, to at least some of the edge junctions.

94. The structured screen of claim 93 wherein each of the first and second mosaics is random.

95. The structured screen of claim 93 wherein the first and second sub-screens are identical.

96. Apparatus for controlled spreading of light comprising a plurality of microstructures, each microstructure having a configuration that is characterized by at least one predetermined parameter which is randomly distributed in accordance with a predetermined probability density function, wherein:

(a) each microstructure comprises (i) a curved, microlens portion and (ii) a straight-sided, piston portion; and (b) the randomly-distributed parameter characterizes the curved, microlens portion.

* * * * *